United States Patent
Hwang et al.

(10) Patent No.: US 11,388,565 B2
(45) Date of Patent: Jul. 12, 2022

(54) APPARATUS AND METHOD FOR V2X COMMUNICATION

(71) Applicant: LG ELECTRONICS INC., Seoul (KR)

(72) Inventors: Jaeho Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/962,214

(22) PCT Filed: Jun. 26, 2018

(86) PCT No.: PCT/KR2018/007221
§ 371 (c)(1),
(2) Date: Jul. 14, 2020

(87) PCT Pub. No.: WO2019/139206
PCT Pub. Date: Jul. 18, 2019

(65) Prior Publication Data
US 2021/0067926 A1    Mar. 4, 2021

Related U.S. Application Data

(60) Provisional application No. 62/617,568, filed on Jan. 15, 2018.

(51) Int. Cl.
*H04W 4/40* (2018.01)
*H04L 67/12* (2022.01)
(Continued)

(52) U.S. Cl.
CPC .............. *H04W 4/40* (2018.02); *H04L 67/12* (2013.01); *H04W 28/06* (2013.01); *H04W 74/0833* (2013.01)

(58) Field of Classification Search
CPC ..... H04W 4/44; H04W 28/065; H04W 4/023; H04W 28/06; H04W 4/40; H04W 28/02; H04W 74/0833; H04W 4/90; H04L 67/12
See application file for complete search history.

(56) References Cited

U.S. PATENT DOCUMENTS

2010/0049819 A1 *   2/2010  Hamada ................ H04L 67/322
                                                                709/207

FOREIGN PATENT DOCUMENTS

WO        2017051863         3/2017

OTHER PUBLICATIONS

PCT International Application No. PCT/KR2018/007221, International Search Report dated Oct. 16, 2018, 2 pages.
(Continued)

*Primary Examiner* — Mandish K Randhawa
(74) *Attorney, Agent, or Firm* — Lee Hong Degerman Kang Waimey

(57) ABSTRACT

Disclosed herein is a method of transmitting a collective perception message (CPM) at a vehicle-to-everything (V2X) communication apparatus of a vehicle. A method of transmitting V2X message of a vehicle includes generating a collective perception (CP) message including information on a plurality of objects detected by the vehicle, determining whether to fragment the CP message depending on whether a size of the CP message is greater than a predefined size, fragmenting the CP message based on the plurality of detected objects, upon determining that the CP message is fragmented, and transmitting the fragmented CP messages. Each of the fragmented CP messages comprises at least one of header information, information on the vehicle or sensor information used to detect the plurality of objects, which is included in the CP message.

6 Claims, 58 Drawing Sheets

(51) Int. Cl.
*H04W 28/06* (2009.01)
*H04W 74/08* (2009.01)

(56) References Cited

OTHER PUBLICATIONS

3GPP TR 22.886 V15.1.0. 3GPP; TSG SA; Study on enhancement of 3GPP Support for 5G V2X Services (Release 15), (Mar. 2017), 60 pages.
Jerome Harri, "Communications for Autonomous Driving-Roadmap for Wif-V2X and Cellular-V2X," Vehicular Networking Conference, Nov. 27, 2017, 25 pages.
Manabu Tsukada, Roadside-assisted V2V Messaging for Connected Autonomous Vehicle, The 13th International Conference on Wireless and Mobile Communications, Nice, France, Jul. 2017, 8 pages.
Gunther et al., "Realizing collective perception in a vehicle," 2016 IEEE Vehicular Networking Conference (VNC), Jan. 30, 2017, 10 pages.

\* cited by examiner

FIG. 12

| Header | Originating Station Container | | Sensor Information Container | | | | Perceived Object Container | | | | |
|---|---|---|---|---|---|---|---|---|---|---|---|
| | Basic Container | Originating Vehicle Container | vehicle sensor 1 | vehicle sensor 2 | ... | vehicle sensor m | Object data 2 | Object data 3 | Object data 5 | Object data 7 | Object data 10 |

(a)

| Header | Originating Station Container | | Sensor Information Container | | | | Perceived Object Container | | | | | |
|---|---|---|---|---|---|---|---|---|---|---|---|---|
| | Basic Container | Originating Vehicle Container | vehicle sensor 1 | vehicle sensor 2 | ... | vehicle sensor m | Object data 1 | Object data 4 | Object data 6 | Object data 8 | Object data 9 | Object data 11 |

(b)

FIG. 13
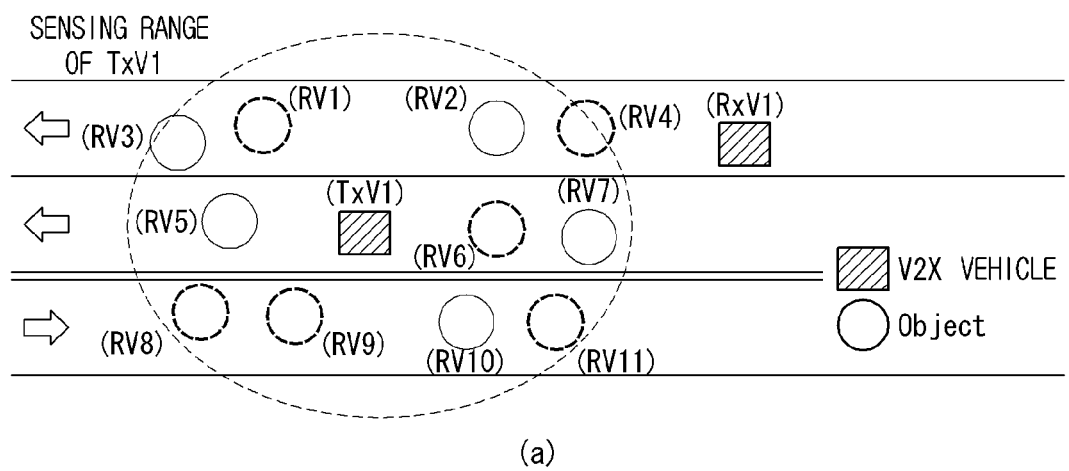
(a)
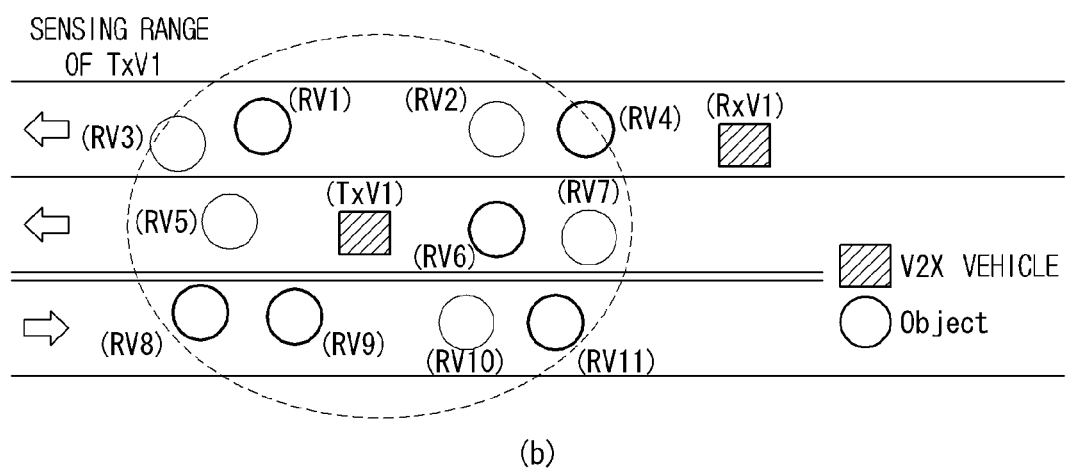
(b)

FIG. 15

| Header | Originating Station Container || SIC || Perceived Object Container |||||
|---|---|---|---|---|---|---|---|---|---|
| | Basic Container | Originating Vehicle Container | vehicle sensor 1 | vehicle sensor 2 | Object data 1 | Object data 3 | Object data 5 | Object data 8 | Object data 9 |

(a)

| Header | Originating Station Container || SIC || Perceived Object Container ||||||
|---|---|---|---|---|---|---|---|---|---|---|
| | Basic Container | Originating Vehicle Container | vehicle sensor 3 | vehicle sensor 4 | Object data 2 | Object data 4 | Object data 6 | Object data 7 | Object data 10 | Object data 11 |

| Header | Originating Station Container | | Sensor Information Container | | | | Perceived Object Container | | | | | |
|---|---|---|---|---|---|---|---|---|---|---|---|---|
| | Basic Container | Originating Vehicle Container | vehicle sensor 1 | vehicle sensor 2 | ... | vehicle sensor m | Object data 1 | Object data 2 | Object data 5 | Object data 6 | Object data 9 | Object data 10 |

(a)

| Header | Originating Station Container | | Sensor Information Container | | | | Perceived Object Container | | | | |
|---|---|---|---|---|---|---|---|---|---|---|---|
| | Basic Container | Originating Vehicle Container | vehicle sensor 1 | vehicle sensor 2 | ... | vehicle sensor m | Object data 3 | Object data 4 | Object data 7 | Object data 8 | Object data 11 |

| Header | Originating Station Container | | Sensor Information Container | | | | Perceived Object Container | | | | | | |
|---|---|---|---|---|---|---|---|---|---|---|---|---|---|
| | Basic Container | Originating Vehicle Container | vehicle sensor 1 | vehicle sensor 2 | ... | vehicle sensor m | Object data 1 | Object data 2 | Object data 3 | Object data 4 | Object data 5 | Object data 6 | Object data 7 |

(a)

| Header | Originating Station Container | | Sensor Information Container | | | | Perceived Object Container | | | |
|---|---|---|---|---|---|---|---|---|---|---|
| | Basic Container | Originating Vehicle Container | vehicle sensor 1 | vehicle sensor 2 | ... | vehicle sensor m | Object data 8 | Object data 9 | Object data 10 | Object data 11 |

| ASN.1 Representation | | | |
|---|---|---|---|
| DF_Header | ::= SEQUENCE{ | | |
|   protocolVersion | INTEGER | | |
|   messageID | INTEGER | | |
|   stationID | INTEGER | | |
|   generationDeltaTime | INTEGER | | |
|   fragmentationID | INTEGER | , OPTIONAL | |
|   fragmentationNumber | INTEGER | , OPTIONAL | |
|   fragmentationIndex | INTEGER | , OPTIONAL | |
|   fragmentationType | INTEGER | , OPTIONAL | |
|   threshold_x | INTEGER | , OPTIONAL | -- unit 0.1 meter |
|   threshold_y | INTEGER | , OPTIONAL | -- unit 0.1 meter |
|   threshold_z | INTEGER | , OPTIONAL | -- unit 0.1 meter |
|   threshold_radius1 | INTEGER | , OPTIONAL | -- unit 0.1 meter |
|   threshold_radius2 | INTEGER | , OPTIONAL | -- unit 0.1 meter |
|   threshold_direction | INTEGER | , OPTIONAL | |

FIG. 25

| ASN.1 Representation | | | |
|---|---|---|---|
| DF_fragmentationContainer | ::= SEQUENCE{ | | |
|   fragmentationNumber | INTEGER | | |
|   fragmentationIndex | INTEGER | | |
|   threshold_x | INTEGER | , OPTIONAL | -- unit 0.1 meter |
|   threshold_y | INTEGER | , OPTIONAL | -- unit 0.1 meter |
|   threshold_radius1 | INTEGER | , OPTIONAL | -- unit 0.1 meter |
|   threshold_radius2 | INTEGER | , OPTIONAL | -- unit 0.1 meter |
|   threshold_direction | INTEGER | , OPTIONAL | |

(a)

| Field | t1 | t2 | t3 | t4 |
|---|---|---|---|---|
| fragmentationID | 211 | 211 | 32 | 32 |
| fragmentationNumber | 2 | 2 | 2 | 2 |
| fragmentationIndex | 1 | 2 | 1 | 2 |
| fragmentationType | 1 (Position) | 1 (Position) | 2 (Distance) | 2 (Distance) |
| threshold_y | 20 | 20 | | |
| threshold_radius1 | | | 60 | 60 |

(b)

(a) STATE-MACHINE STRUCTURE FOR EFFICIENT
TRANSMISSION OF FRAGMENTED CPM PACKETS

|  | Start | State 1 | State 2 | ··· | State n | ··· | State Max |
|---|---|---|---|---|---|---|---|
| CBR ratio | < 30% | 30~39% | 40~49% | ··· | 50~59% | ··· | > 60% |
| FragmentationRatio | 1:1 | 2:1 | 3:1 | ··· | 4:1 | ··· | 1:0 |

(b) EXAMPLE OF PARAMETERS OF EACH STATE

FIG. 32
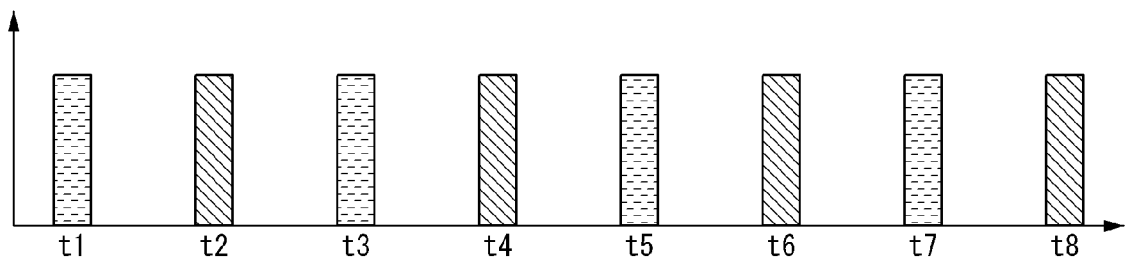
(a) FRAGMENTATION MESSAGE TRANSMISSION METHOD 1, fragmentationRatio (1:1)
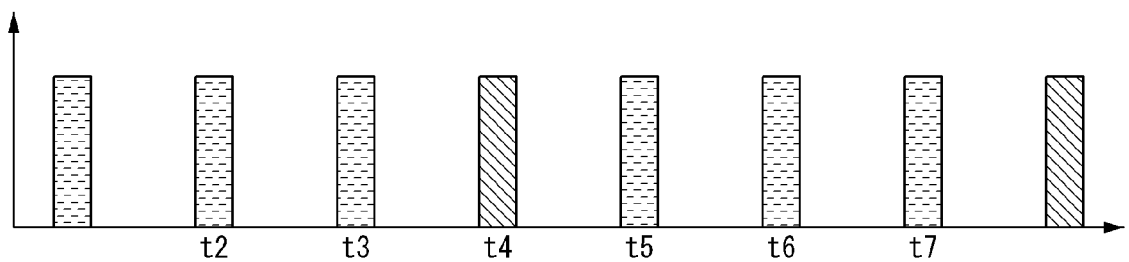
(b) FRAGMENTATION MESSAGE TRANSMISSION METHOD 2, fragmentationRatio (3:1)
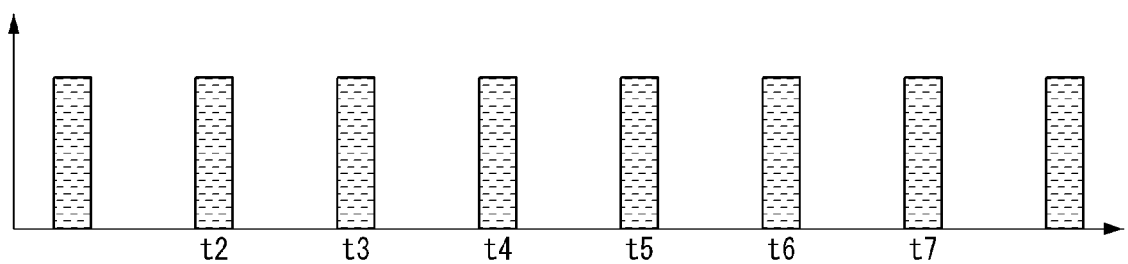
(c) FRAGMENTATION MESSAGE TRANSMISSION METHOD 3, fragmentationRatio (1:0)

FIG. 33

| Header | Originating Station Container | | Sensor Information Container | | | | Perceived Object Container | | | | | | |
|---|---|---|---|---|---|---|---|---|---|---|---|---|---|
| | Basic Container | Originating Vehicle Container | vehicle sensor 1 | vehicle sensor 2 | ... | vehicle sensor m | Object data 1 | Object data 2 | Object data 3 | Object data 4 | Object data 5 | Object data 6 | Object data 7 |

(a)

| Header | Originating Station Container | | Sensor Information Container | | | | Perceived Object Container | | | |
|---|---|---|---|---|---|---|---|---|---|---|
| | Basic Container | Originating Vehicle Container | vehicle sensor 1 | vehicle sensor 2 | ... | vehicle sensor m | Object data 8 | Object data 9 | Object data 10 | Object data 11 |

(b)

| Header | Originating Station Container | | Sensor Information Container | | | | Perceived Object Container | | | | | | |
|---|---|---|---|---|---|---|---|---|---|---|---|---|---|
| | Basic Container | Originating Vehicle Container | vehicle sensor 1 | vehicle sensor 2 | ... | vehicle sensor m | Object data 1 | Object data 2 | Object data 3 | Object data 4 | Object data 5 | Object data 6 | Object data 7 |

(c)

| Header | Originating Station Container | | Perceived Object Container | | | | Perceived Object Container | | | |
|---|---|---|---|---|---|---|---|---|---|---|
| | Basic Container | Originating Vehicle Container | vehicle sensor 8 | vehicle sensor 9 | vehicle sensor 10 | vehicle sensor 11 | Object data 1 | Object data 2 | Object data 3 | Object data 4 |

| Header | Originating Station Container | | SIC | | Perceived Object Container | | | | | |
|---|---|---|---|---|---|---|---|---|---|---|
| | Basic Container | Originating Vehicle Container | vehicle sensor 1 | vehicle sensor 2 | Object data 1 | Object data 3 | Object data 5 | Object data 8 | Object data 9 | Object data 4 |

(a) FIRST CPM MESSAGE OF SECOND FRAGMENTED CPM MESSAGES

| Header | Originating Station Container | | SIC | | Perceived Object Container | | | | | |
|---|---|---|---|---|---|---|---|---|---|---|
| | Basic Container | Originating Vehicle Container | vehicle sensor 3 | vehicle sensor 4 | Object data 2 | Object data 4 | Object data 6 | Object data 7 | Object data 10 | Object data 11 |

(b) SECOND CPM MESSAGE OF SECOND FRAGMENTED CPM MESSAGES

FIG. 38

| ASN.1 Representation | | | |
|---|---|---|---|
| DF_fragmentationContainer | ::= SEQUENCE{ | | |
| fragmentationID | INTEGER | , OPTIONAL | |
| fragmentationNumber | INTEGER | , OPTIONAL | |
| fragmentationIndex | INTEGER | , OPTIONAL | |
| fragmentationType | INTEGER | , OPTIONAL | |
| threshold_x | INTEGER | , OPTIONAL | -- unit 0.1 meter |
| threshold_y | INTEGER | , OPTIONAL | -- unit 0.1 meter |
| threshold_z | INTEGER | , OPTIONAL | -- unit 0.1 meter |
| threshold_radius1 | INTEGER | , OPTIONAL | -- unit 0.1 meter |
| threshold_radius2 | INTEGER | , OPTIONAL | -- unit 0.1 meter |
| threshold_direction | INTEGER | , OPTIONAL | |
| emergencyObjectIDList | DE_EmergencyObjectIDList | | |
| emergencyObjectCodeList | DE_EmergencyObjectCodeList | | |
| } | | | |
| DE_EmergencyObjectIDList ::= SEQUENCE(SIZE(1:10)) of ObjectID | | | |
| DE_EmergencyObjectCodeList ::= SEQUENCE(SIZE(1:10)) of CauseCode | | | |

FIG. 41
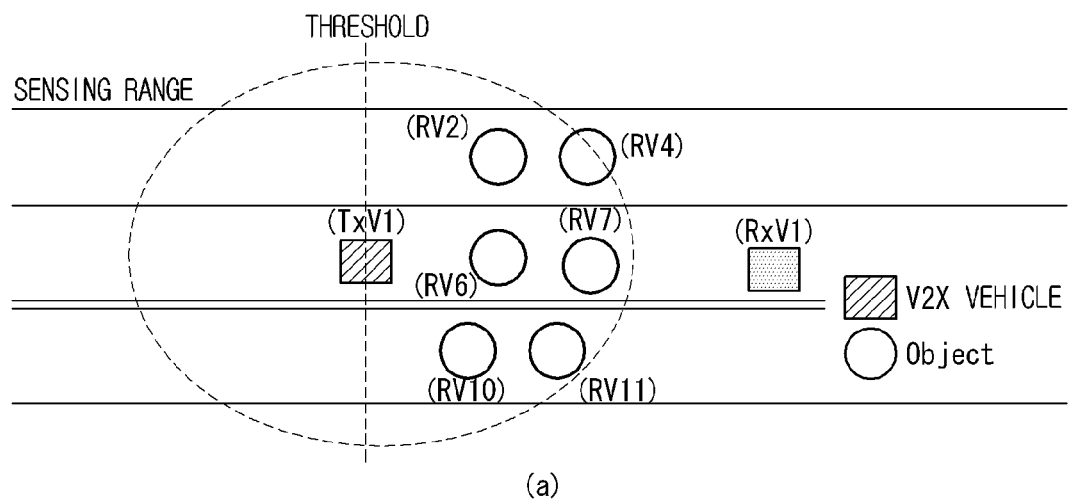
(a)
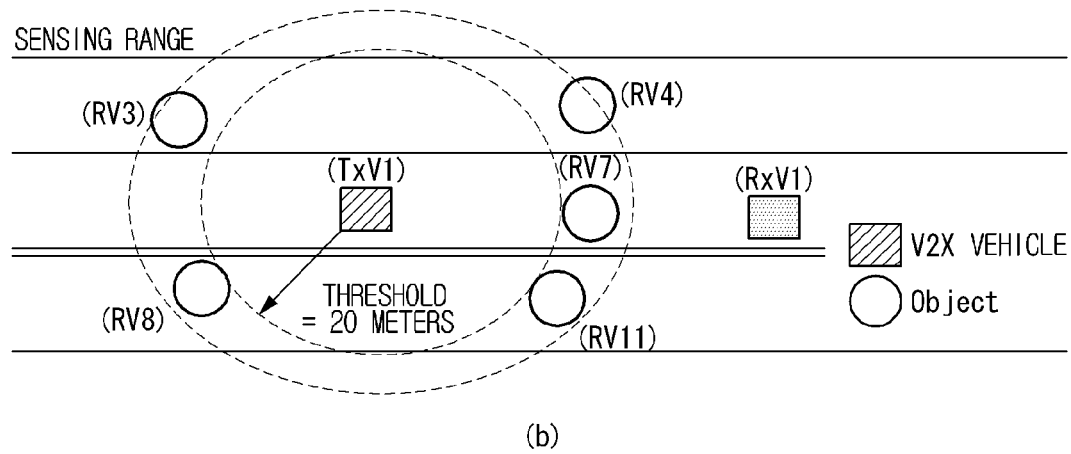
(b)

FIG. 50
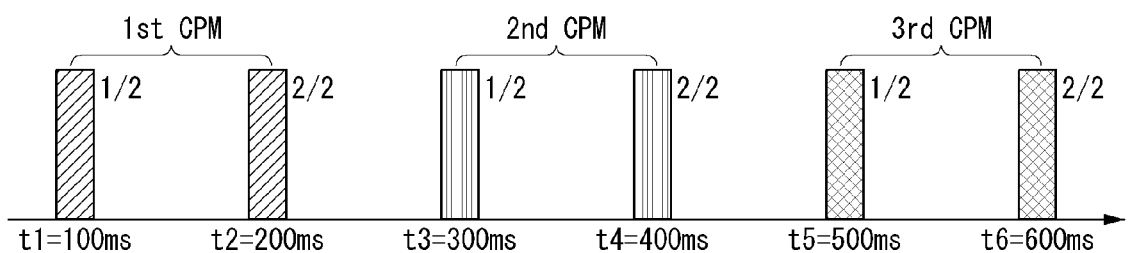
(a) TRANSMISSION OF TWO FRAGMENTED CPM
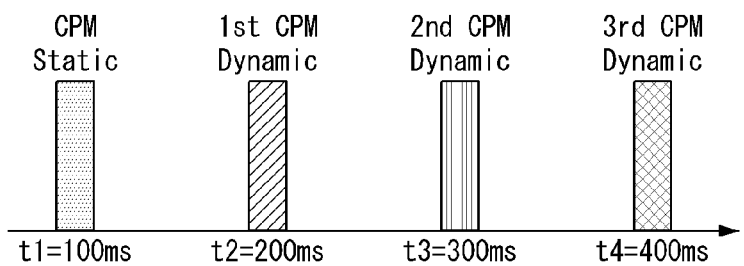
(b) TRANSMISSION OF CPM USING STATIC/DYNAMIC METHOD FIG. 51
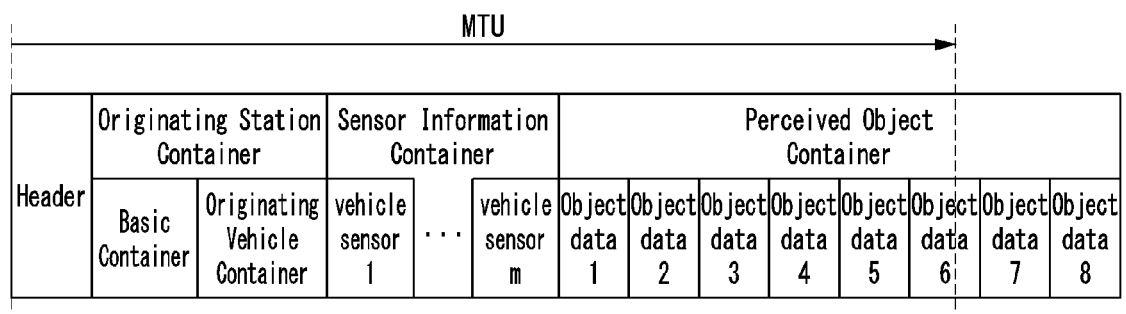
(a) Original CPM DATA
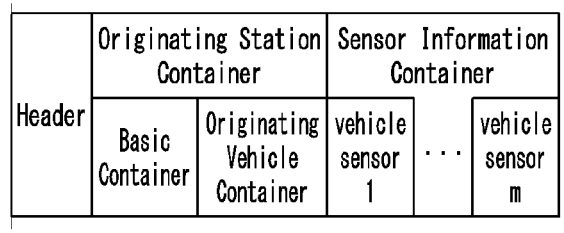
(b_1) Static CPM MESSAGE
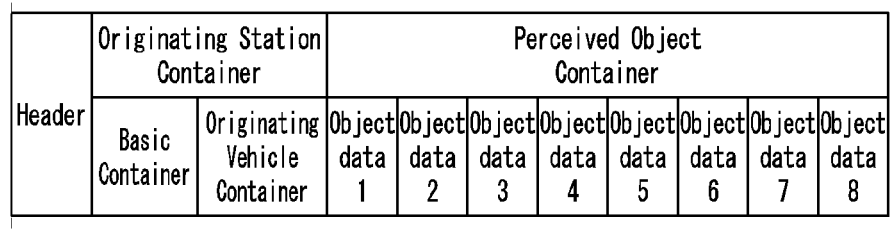
(b_2) Dynamic CPM 메시지

FIG. 52

| Header | Originating Station Container | | Sensor Information Container | | Perceived Object Container | | | | | | | |
|---|---|---|---|---|---|---|---|---|---|---|---|---|
| | Basic Container | Originating Vehicle Container | vehicle sensor 1 | ··· vehicle sensor m | Object data 1 | Object data 2 | Object data 3 | Object data 4 | Object data 5 | Object data 6 | Object data 7 | Object data 8 |

|← MTU →|

(a) Original CPM DATA

| Header | Originating Station Container | | Sensor Information Container | | Perceived Object Container | | | | |
|---|---|---|---|---|---|---|---|---|---|
| | Basic Container | Originating Vehicle Container | vehicle sensor 1 | ··· vehicle sensor m | Object data 1 | Object data 2 | Object data 3 | Object data 4 | Object data 5 |

(b_1) Static CPM MESSAGE

| Header | Originating Station Container | | Perceived Object Container | | | | | | | |
|---|---|---|---|---|---|---|---|---|---|---|
| | Basic Container | Originating Vehicle Container | Object data 1 | Object data 2 | Object data 3 | Object data 4 | Object data 5 | Object data 6 | Object data 7 | Object data 8 |

(b_2) Dynamic CPM 메시지

FIG. 53

|← MTU →|

| Header | Originating Station Container | | Sensor Information Container | | Perceived Object Container | | | | | | | |
|---|---|---|---|---|---|---|---|---|---|---|---|---|
| | Basic Container | Originating Vehicle Container | vehicle sensor 1 | ... vehicle sensor m | Object data 1 | Object data 2 | Object data 3 | Object data 4 | Object data 5 | Object data 6 | Object data 7 | Object data 8 |

(a) Original CPM DATA

| Header | Originating Station Container | | Sensor Information Container | | Perceived Object Container (Static) | | | | | | | |
|---|---|---|---|---|---|---|---|---|---|---|---|
| | Basic Container | Originating Vehicle Container | vehicle sensor 1 | ... vehicle sensor m | #1 | #2 | #3 | #4 | #5 | #6 | #7 | #8 |

(b_1) Static CPM MESSAGE

| Header | Originating Station Container | | Perceived Object Container (Dynamic) | | | | | | | |
|---|---|---|---|---|---|---|---|---|---|---|
| | Basic Container | Originating Vehicle Container | Object data 1 | Object data 2 | Object data 3 | Object data 4 | Object data 5 | Object data 6 | Object data 7 | Object data 8 |

(b_2) Dynamic CPM 메시지

FIG. 54

| ASN.1 Representation | |
|---|---|
| DF_Header | ::= SEQUENCE{ |
|   protocolVersion | INTEGER |
|   messageID | INTEGER |
|   stationID | INTEGER |
|   generationDeltaTime | INTEGER |
|   StaticDynamicType | INTEGER |
|   } | |

(a) SPLIT MESSAGE TRANSMISSION

| Field | t1 | t2 | t3 | t4 |
|---|---|---|---|---|
| StaticDynamicType | 1(Static) | 2(Dynamic) | 2(Dynamic) | 2(Dynamic) |

(b) Parameter of Fragmentation field

APPARATUS AND METHOD FOR V2X COMMUNICATION

CROSS-REFERENCE TO RELATED APPLICATIONS

This application is the National Stage filing under 35 U.S.C. 371 of International Application No. PCT/KR2018/007221, filed on Jun. 26, 2018, which claims the benefit of U.S. Provisional Application No. 62/617,568, filed on Jan. 15, 2018, the contents of which are all hereby incorporated by reference herein in their entirety.

BACKGROUND OF THE INVENTION

Field of the Invention

The present disclosure relates to a device and method for vehicle-to-everything (V2X) communication and, more particularly, to a method of transmitting or receiving, by a V2X communication device, a collective perception message (CPM).

Description of the Related Art

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

Various services may be provided through V2X communication. An intelligent transport system (ITS) of a vehicle for performing V2X communication may provide various services for traffic safety and efficiency. Among them, a cooperative awareness (CA) service is provided. CA in road traffic means that road users and roadside infrastructure may be aware of positions, dynamics and attributes of each other. Such mutual awareness is the basis of various road safety and traffic efficiency applications.

As such, the CA service may support traffic safety by periodically providing the position and status of a V2X communication apparatus to neighboring V2X communication apparatuses. However, in this CA service, only information on the V2X communication apparatus may be shared. In order to solve this, it is necessary to develop new types of services.

SUMMARY OF THE INVENTION

An object of the present disclosure devised to solve the problem lies in a V2X communication apparatus and method.

A method of transmitting a vehicle-to-everything (V2X) message of a vehicle according to an embodiment of the present disclosure includes generating a collective perception (CP) message including information on a plurality of objects detected by the vehicle, determining whether to fragment the CP message depending on whether a size of the CP message is greater than a predefined size, fragmenting the CP message based on the plurality of detected objects, upon determining that the CP message is fragmented, and transmitting the fragmented CP messages. Each of the fragmented CP messages may include at least one of header information, information on the vehicle or sensor information used to detect the plurality of objects, which is included in the CP message.

In an embodiment, the fragmenting of the CP message may be performed by fragmenting the CP message based on positions or distances of the plurality of objects.

In an embodiment, the fragmenting of the CP message may be performed by fragmenting the CP message according to a latitudinal or longitudinal directions of the plurality of objects determined based on a specific position of the vehicle.

In an embodiment, the fragmenting of the CP message may be performed by comparing distances between the vehicle and the plurality of objects with a specific threshold and fragmenting the CP message.

In an embodiment, the fragmenting of the CP message may be performed by comparing movement directions of the vehicle and the plurality of objects and fragmenting the CP message.

In an embodiment, the fragmenting of the CP message may include determining a fragmentation type of the CP message, and the fragmentation type may include sequential fragmentation in which fragmentation is performed in order of indices assigned for each object within an object sequence of the CP message, random fragmentation in which fragmentation is performed in a random manner within the object sequence, position based fragmentation in which fragmentation is performed based on the positions of the objects or direction fragmentation in which fragmentation is performed based on the movement directions of the objects.

In an embodiment, each of the fragmented CP messages may include information related to fragmentation, and the information related to fragmentation may include at least one of fragmentation ID information indicating fragmentation from the same CP message, fragmentation number information indicating the number of fragmented messages, fragmentation index information indicating a specific fragmented CP message, or fragmentation type information.

A vehicle-to-everything (V2X) communication apparatus of a vehicle according to an embodiment of the present disclosure includes a memory configured to store data, a communication unit configured to transmit and receive a radio frequency signal including a collective perception (CP) message, and a processor configured to control the memory and the communication unit. The processor is configured to generate a collective perception (CP) message including information on a plurality of objects detected by the vehicle, determine whether to fragment the CP message depending on whether a size of the CP message is greater than a predefined size, fragment the CP message based on the plurality of detected objects, upon determining that the CP message is fragmented, and transmit the fragmented CP messages. Each of the fragmented CP messages comprises at least one of header information, information on the vehicle or sensor information used to detect the plurality of objects, which is included in the CP message.

BRIEF DESCRIPTION OF THE DRAWINGS

The accompany drawings which are included for further understanding of the disclosure and included in this disclosure and which form part of the disclosure illustrate embodiments of the disclosure along with the detailed description that describes the principle of the disclosure.

FIG. 12 is a view illustrating a random fragmentation method of a CPM according to an embodiment of the present disclosure.

FIG. 13 is a view illustrating problems of a random fragmentation method according to an embodiment of the present disclosure.

FIGS. 14 and 15 are views illustrating a method of fragmenting a CPM based on a position according to an embodiment of the present disclosure.

FIG. 19 is a view illustrating a method of fragmenting a CPM based on a distance according to an embodiment, to which the present disclosure is applied.

FIG. 22 is a view illustrating a method of fragmenting a CPM based on a direction according to an embodiment, to which the present disclosure is applied.

FIGS. 24 and 25 are views illustrating a data format including fragmentation information, as an embodiment, to which the present disclosure is applied.

FIG. 32 is a view illustrating a method of transmitting a fragmented CPM according to an embodiment of the present disclosure.

FIG. 33 is a view illustrating a method of compressing and transmitting a fragmented CPM according to an embodiment of the present disclosure.

FIGS. 36 and 37 are views illustrating a repeated transmission method of an object, in which emergency has occurred, according to an embodiment of the present disclosure.

FIG. 38 is a view illustrating a data format of an object, in which emergency has occurred, according to an embodiment of the present disclosure.

FIG. 41 is a view illustrating a method of using fragmentation information and threshold information according to an embodiment, to which the present disclosure is applied.

FIG. 50 is a view illustrating a method of transmitting fragmented CPMs according to an embodiment of the present disclosure.

FIGS. 51 to 53 are views illustrating a CPM fragmentation structure according to an embodiment of the present disclosure.

FIG. 54 is a view illustrating the data format of a header according to an embodiment of the present disclosure.

DESCRIPTION OF THE PREFERRED EMBODIMENTS

Figure 1:
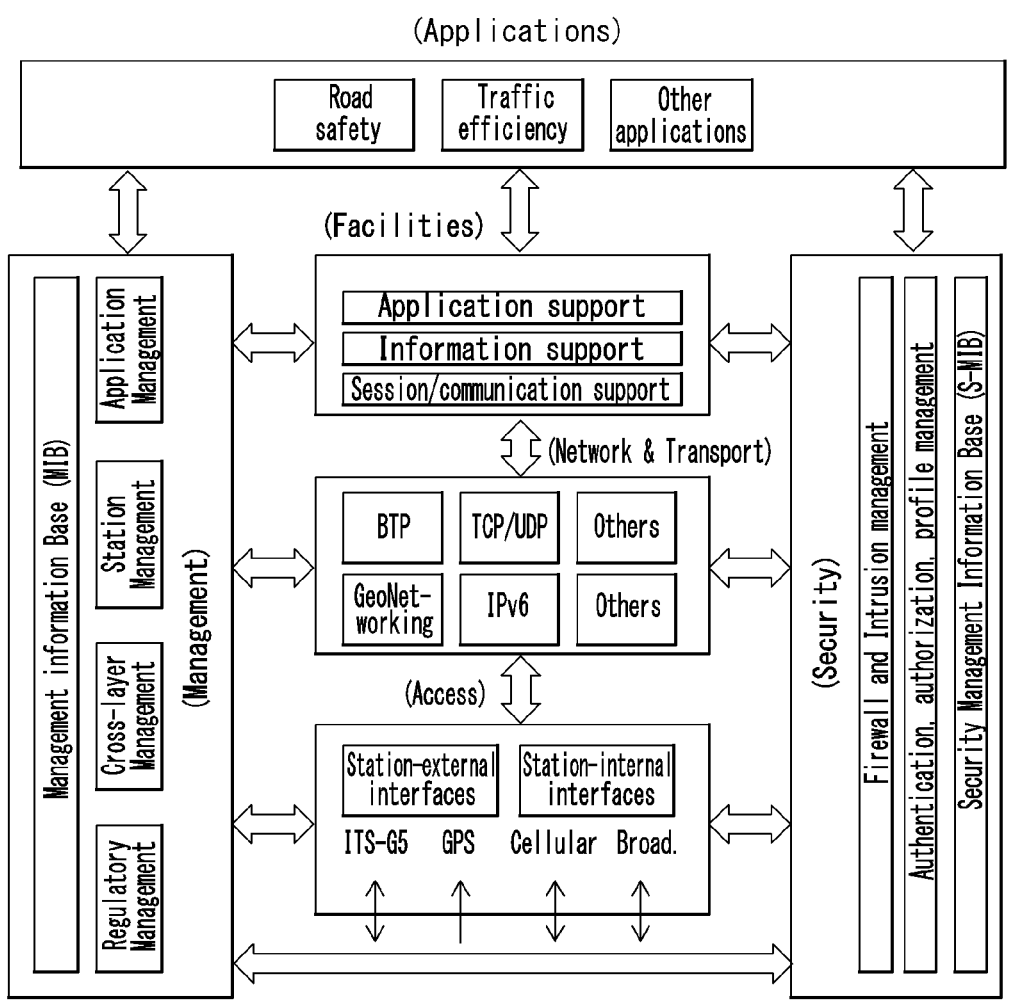
FIG. 1 illustrates exemplary architecture of a V2X communication device according to an embodiment of the disclosure.

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

Hereinafter, first, a collective perception (CP) service (Hereinafter, it may be referred to as "CPS") provided by the V2X communication device and a basic structure of a CP message (CPM) for the CP service are described. Furthermore, various embodiments of the CPM structure for performance improvements of the CP service are described. Meanwhile, in the present disclosure, various embodiments are described, assuming that the V2X communication device generating a CPM is called a V2X communication device of a vehicle. However, the embodiments may be applied to the V2X communication device of an RSU or a personal V2X communication device to be described later in the same or similar manner according to circumstances. In the present disclosure, a CPM may also be referred to as a CPM message.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

Figure 2:
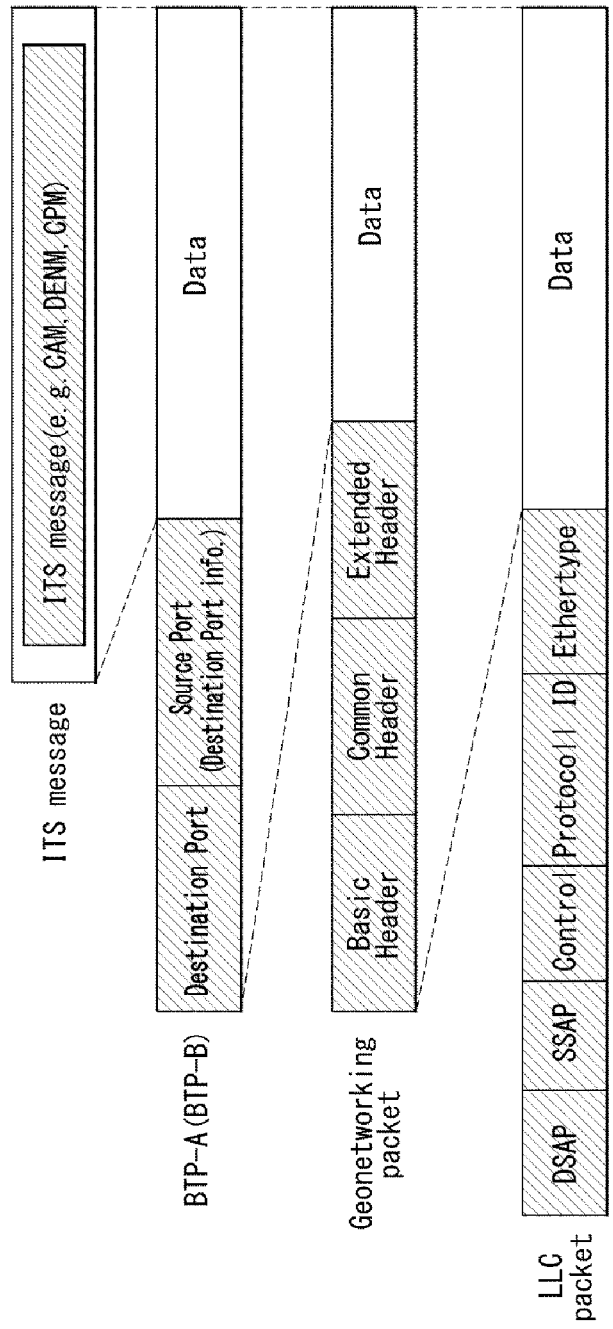
FIG. 2 illustrates a method of processing a V2X message according to an embodiment of the disclosure.

FIG. 2 is a view illustrating a method of processing a V2X message according to an embodiment of the disclosure. The V2X message may also be referred to as an ITS message.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

Figure 3:
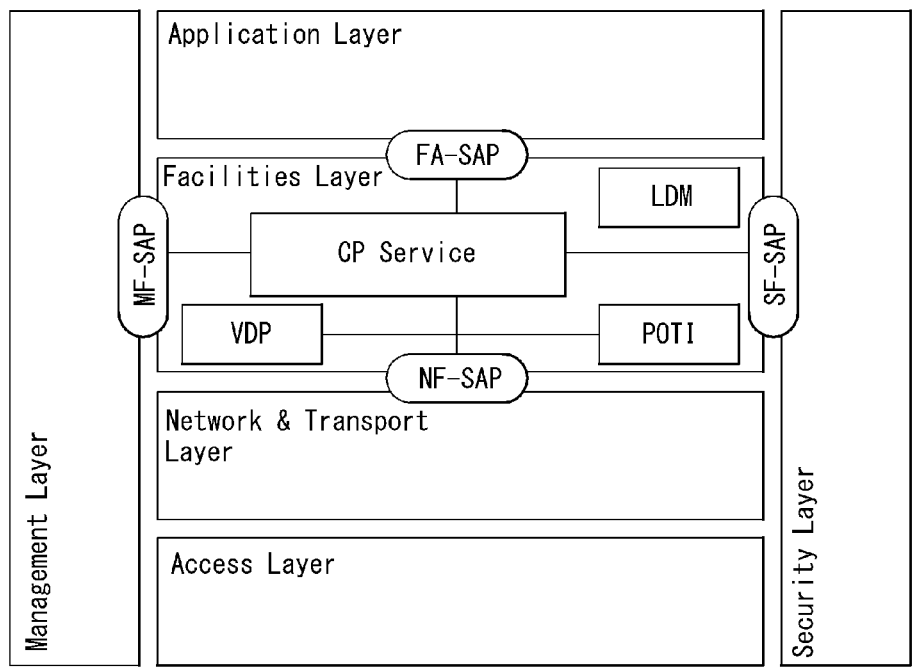
FIG. 3 illustrates architecture of the V2X communication device providing CP services according to an embodiment of the disclosure.

FIG. 3 is a view illustrating an exemplary architecture of an V2X communication device providing a CP service according to an embodiment of the disclosure.

The V2X communication device may provide various services for traffic safety and efficiency. One of the services may be a Cooperative Awareness (CA) service. The Cooperative Awareness in road traffic means that road users and roadside infrastructures can know mutual positions, dynamics and attributes. Here, the road users may be all kinds of users on a road or near a road, which act as traffic safety and control, such as a vehicle, a truck, a motorcycle, a bicycle or a pedestrian, and the roadside infrastructures may be equipment including a road sign, a traffic light or a bather and an entrance.

This awareness of each other becomes basics of many road safety and traffic efficiency applications. This can be performed by regular exchange of information between road users at vehicle to vehicle (V2V), vehicle to infrastructure (V2I), infrastructure to vehicle (I2V) or everything to everything (X2X) which are based on a wireless network called a V2X network.

On this other hand, the cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices. In this case, the CA service may specify how the V2X communication device can inform its own position, dynamics and attributes by sending a Cooperative Awareness Message (CAM).

Thus, in regard to the CA service, the V2X communication device may periodically provide its own position and state to surrounding V2X communication devices, thereby supporting traffic safety. However, the CA service has a limitation in that only information of the corresponding V2X communication device itself can be shared. In order to overcome this limitation, it is necessary to develop services such as a collective perception (CP) service.

The CP service may specify how the V2X communication device can inform other V2X communication devices about the position, dynamics, and attributes of surrounding road users and other objects that are detected. For example, the CP service may share this information with other V2X communication devices through the transmission of Collective Perception Messages (CPM). This CP service may be an optional facility for all types of V2X communication devices (vehicle V2X communication device, road side V2X communication device, personal V2X communication device, etc.) participating in road traffic.

Hereinafter, a CPM transmitted by an V2X communication device participating in a V2X network and a CP service for transmitting the CPM will be described in detail with reference to FIG. 3. In this disclosure, the CPM may be a message exchanged between V2X communication devices via a V2X network, and may be used to generate collective perception for road users and other objects detected and/or recognized by the V2X communication device. In this case, the detected road user or object may be, but not limited to, a road user or an object which is not equipped with an V2X communication device.

As described above, the V2X communication device sharing information through the CAM shares only information about the state recognition of the V2X communication device itself with other V2X communication devices in order to generate cooperative awareness. In this case, since the road user or other objects unequipped with the V2X communication device are not a part of the system, a view about safety and traffic management related situations may be limited.

One method for improving this is that a system/device equipped with the V2X communication device and capable of recognizing road users and objects unequipped with the V2X communication device informs other V2X communication devices of the presence and state of these road users and objects unequipped with V2X device (or ITS-S). In order to easily improve the safety and traffic management performance, the CP service may recognize the cooperative awareness of the presence of the road user and the object unequipped with V2X device, and thereby may improve the safety and traffic management performance of the system equipped with the V2X communication device.

As shown in FIG. 3, the CP service may be a facilities layer entity that operates a CPM protocol. For example, the CP service may be a part of the application support domain of the facilities layer. FIG. 3 illustrates a logical interface for the CP service and other layers in the exemplary architecture of V2X communication device and a potential logical interface for entities in a facilities layer.

This CP service may provide two services, for example, sending and receiving of CPM. On the other hand, the CP service may be fundamentally different from the CA service in that the CP service cannot receive input data on a host V2X communication device, for example, from a VDP or POTI unit.

The sending of the CPM includes generation and transmission of the CPM. In the generation process of the CPM, the originating V2X communication device configures a CPM, and then the CPM is delivered to the networking and transport layer for dissemination. In this disclosure, the originating V2X communication device may be referred to as a sending V2X communication device, a transmitting V2X communication device, a host V2X communication device, and the like.

On the other hand, in order to collect relevant information for CPM generation and to deliver the received CPM content for additional processing, the CP service may interface with other entities in the facilities layer and V2X applications in the facilities layer. In an embodiment, at the V2X communication device, the entity for data collection may be a facility that provides object detection at a host object detector.

Also, in order to disseminate (or send) the CPM, the CP service may use services provided by protocol entities of the transport layer and the networking. For example, the CP service may interface with the network and the transport layer (N&T) through NF-SAP to exchange CPM messages with other V2X communication devices. Also, the CP service may interface with the secure entities through SF-SAP to access the security service for CPM dissemination and CPM reception, may interface with the management entities through MF-SAP, and may interface with the application layer through FA-SAP if the received CPM data are directly provided to the application.

The dissemination of the CPM may vary according to the applied communication system. For example, in the ITS-G5 network (defined in ETSI EN 302 663), the CPM may be transmitted to all V2X communication devices within the direct communication range by the originating V2X communication device. The communication range may be particularly affected by the originating V2X communication device by changing the transmission power according to a relevant region.

Also, the CPM may be periodically generated at a rate controlled by the CP service in the originating V2X communication device. The generation frequency may be determined in consideration of a radio channel load determined by the Decentralized Congestion Control (DCC), and may be determined in consideration of the state of the detected non-ITS object, for example, dynamic behavior of position, velocity or direction, and transmission of the CPM for the same (perceived) object by other V2X communication devices.

Also, when the receiving V2X communication device receives the CPM, the CP service enables the contents of the CP to be used in facilities inside the receiving V2X communication device, such as an ITS application and/or a Local Dynamic Map (LDM). For example, the Local Dynamic Map (LDM) may be updated with the received CPM data. The V2X application may retrieve this information from the LDM for additional processing.

Figure 4:
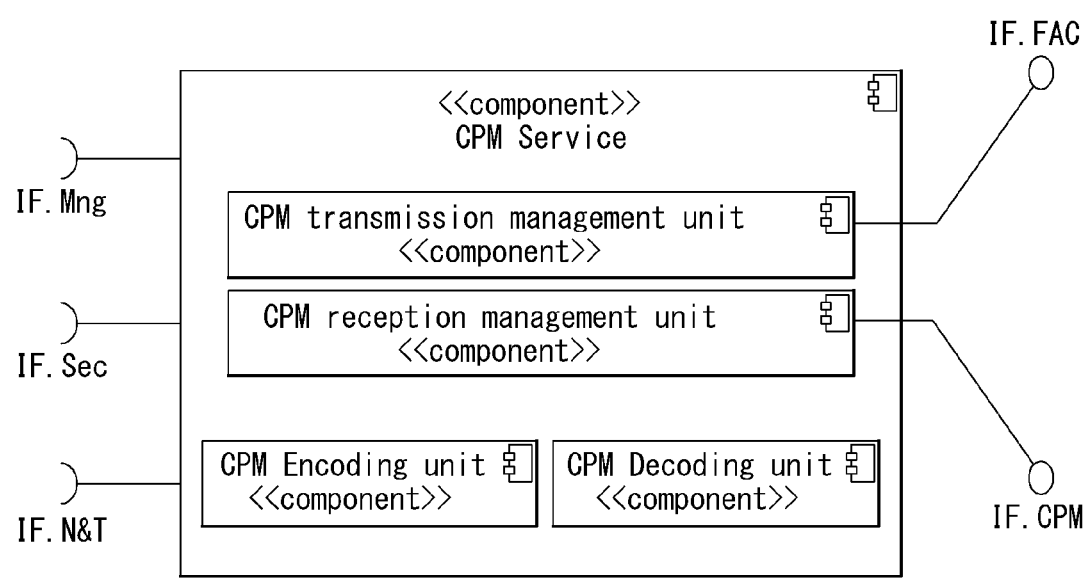
FIG. 4 illustrates a function block diagram CP services according to an embodiment of the disclosure.

FIG. 4 is a view illustrating a function blocks of a CP service according to an embodiment of the disclosure. Specifically, FIG. 4 illustrates functional blocks of the CP service according to an embodiment and functional blocks having interfaces for other facilities and layers.

As shown in FIG. 4, the CP service may provide the following subfunctions for CPM transmission and reception.

CPM encoding: This subfunction may configure or generate a CPM according to a predefined format. In this case, the latest in-vehicle data may be included in the CPM.

CPM decoding: This subfunction may decode the received CPM.

CPM transmission management: This subfunction may implement the protocol operation of the originating V2X communication device. In particular, this may include activation and termination of the CPM transmission operation, determination of the CPM generation frequency, and trigger of the CPM generation.

CP reception management: This subfunction may implement the protocol operation of the receiving V2X communication device. In particular, this may include trigger of "CPM decoding" function in the CPM reception, provision of the received CPM data to the LDM or the V2X application of the receiving V2X communication device, and checking of the information of the optionally received CPM.

Hereinafter, the CPM dissemination will be described in detail. Specifically, the requirements for CPM dissemination, CP service activation and termination, CPM trigger conditions, CPM generation cycle, and constraints are described.

In an embodiment, point-to-multipoint communication may be used for CPM transmission. For example, when ITS-G5 is used for CPM dissemination, a control channel (G5-CCH) may be used. In an embodiment, the CPM generation may be triggered and managed by the CP service while the CP service is being activated. For example, the CP service may be activated together with V2X communication device activation, and may be terminated when the V2X communication device is terminated.

In an embodiment, the host V2X communication device may send a CPM whenever at least one object having a sufficient level of confidence that needs to be exchanged with the surrounding V2X communication device is detected. In regard to the inclusion of the detected object, the CP service needs to consider a trade-off between the object age and the channel utilization. For example, in terms of an application using information received by the CPM, updated information needs to be provided as frequently as possible. However, in terms of the ITS-G5 stack, the channel utilization needs to be minimized, and thus a low transmission period is required. Accordingly, in consideration of this, the V2X communication device needs to appropriately include the detected object or object information in the CPM. On the other hand, in order to reduce the resulting message size, the object needs to be evaluated before transmission thereof.

Figure 5:
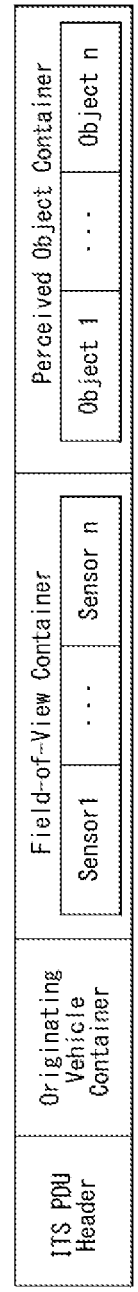
FIG. 5 illustrates a CPM structure according to an embodiment of the disclosure.

FIG. 5 is a view illustrating a CPM structure according to an embodiment of the disclosure. In the embodiment of FIG. 5, the CPM structure may be a basic CPM structure. The CPM structure of FIG. 5 may be referred to as a first CPM structure or a first type CPM structure. The CPM having the CPM structure of FIG. 5 may be referred to as a basic CPM or a first type CPM.

As described above, the CPM may be a message exchanged between V2X communication devices in a V2X network, and may be used to generate collective perception for road users and/or other objects detected and/or recognized by the V2X communication device. That is, the CPM may be an V2X message for generating a collective perception for an object detected by the V2X communication device.

In an embodiment, the CPM may include state and attribute information of road users and objects detected by the originating V2X communication device. The content may vary according to the types of detected road users or objects and the detection performance of the originating V2X communication device. For example, in the case of a vehicle object, the state information may include at least information on the actual time, position, and motion state. Also, the attribute information may include attributes such as dimension, vehicle type, and role within road traffic.

This CPM may complement the CAM, and may act similarly to the CAM. That is, the CPM may be for increasing the cooperative awareness. The CPM may include externally observable information about the detected road user or object. On the other hand, the CP service may include a method of reducing replication or duplication of the CPMs sent by different V2X communication devices by checking the CPMs sent by the other stations.

Upon CPM reception, the receiving V2X communication device may recognize the presence, type and state of the road user or object detected by the originating V2X communication device. The received information may be used by the receiving V2X communication device to support ITS applications for increasing safety and improving traffic efficiency and travel time. For example, by comparing the received information with the state of the detected road user or object, the receiving V2X communication device may estimate the risk of collision with the road user or object. Also, the receiving V2X communication device may inform a user through a Human-Machine Interface (HM) of the receiving V2X communication device, or may automatically take corrective actions.

Hereinafter, the basic structure/format of the CPM will be described with reference to FIG. 5. This CPM format may be presented or encoding/decoding as ASN.1. Also, Data Element (DE) and Data Frame (DF), which are not defined herein, may be derived from the common data dictionary, for example, specified in ETSI TS 102 894-2.

Referring to FIG. 5, the CPM may include an ITS Protocol Data Unit (PDU) header and a plurality of containers.

The ITS PDU header is a common header including information on the protocol version, the message type, and the ITS ID of the originating V2X communication device. This ITS PDU is a common header used in the V2X message/ITS message, and exists at the starting part of the V2X message. ITS PDU header may be referred to common header, header, header part, etc.

The plurality of containers may include an Originating Vehicle Container (OVC), a Perceived (or detected) Object Container (POC), and/or a Field-of-View Container (FVC or FoVC). For example, the CPM may include an OVC as a mandator)/container, and may optionally include an FVC and a POC. Hereinafter, each container will be described with reference to Tables 1 to 3.

Table 1 shows an exemplary OVC in the CPM.

TABLE 1

| DE | TS 102 894-2 [2] CDD reference |
|---|---|
| Generation Delta Time | See CAM ETSI EN 302 637-2 [3] |
| Reference Position | A.124 |
| Heading | A.112 |
| Longitudinal Speed | A.126 |
| Lateral Speed | A.126 |
| Vehicle Length | A.131 |
| Vehicle Width | A.95 |

Specifically, Table 1 shows the Data Elements (DE) and/or Data Frames (DF) included in the exemplary OVC. Here, the DE is a data type that includes single data. The DF is a data type that includes one or more elements in a predefined order. For example, the DF may be a data type that includes one or more DEs and/or one or more DFs in a predefined order.

The DE/DF may be used to configure a facility layer message or an application layer message. Examples of the facility layer messages may include CAM, CPM, DENM, and the like. In this disclosure, these messages may be referred to as V2X messages or ITS message.

As shown in Table 1, the OVC include basic information related to the V2X communication device that disseminates the CPM. The OVC may be interpreted as a scale-down version of the CAM, but may include only the DE required for a coordination transformation process. That is, although similar to the CAM, the OVC provides basic information about the originating V2X communication device. However, the included information is focused on supporting of the coordinate transformation process.

The OVC may provide the followings.
  The latest geographic position of the originating V2X communication device obtained by the CP service at the time of CPM generation
  The lateral and longitudinal absolute velocity components of the originating V2X communication device.
  Geometric dimensions of the originating V2X communication device.

Hereinafter, each piece of information (DE or DF) will be described with reference to Table 1.

Generation delta time (or Generation time): as DE, indicates a time corresponding to the time of the reference position in the CPM. This may be considered as the time of CPM generation. In this disclosure, the generation delta time may also be referred to as a generation time.

Reference position: as DF, indicates the geographic position of the V2X communication device. This indicates a geographic point position. In an embodiment, the reference position may include information about latitude, longitude, position reliability and/or altitude. Here, the latitude represents the latitude of the geographic point, and the longitude represents the longitude of the geographic point. Also, the position confidence represents the accuracy of the geographic position, and the altitude represents the altitude and altitude accuracy of the geographic point.

Direction: as DF, indicates the direction in the coordinate system. In an embodiment, the direction includes information about direction values and/or direction reliability/confidence. Here, the direction value indicates the traveling direction based on the north, and the direction confidence indicates the accuracy of the reported direction value having a predefined confidence level.

Longitudinal velocity: as DF, longitudinal velocity and the accuracy of velocity information with respect to a moving object (e.g., a vehicle) may be described. In an embodiment, the longitudinal velocity includes information on velocity values and/or velocity accuracy. Here, the velocity value indicates the velocity value in the longitudinal direction, and the velocity accuracy indicates the accuracy of the reported velocity value.

Lateral velocity: as DF, lateral velocity and the accuracy of velocity information with respect to a moving object (e.g., a vehicle) may be described. In an embodiment, the lateral velocity includes information on velocity values and/or velocity accuracy. Here, the velocity value indicates the velocity value in the lateral direction, and the velocity accuracy indicates the accuracy of the reported velocity value.

Vehicle length: as DF, indicates vehicle length and accuracy indication. In an embodiment, the vehicle length includes information about a vehicle length value and/or a vehicle length accuracy indication. Here, the vehicle length indicates the length of the vehicle, and the vehicle length accuracy indication indicates an indication of the reported length value confidence.

Vehicle width: as DE, indicates the width of the vehicle. For example, the vehicle width may indicate the width of the vehicle, including the side mirrors. For example, when the vehicle width is equal to or greater than about 6.1 meters, the value needs to be set to 61. When this information is not available, the value needs to be set to 62.

Table 2 shows an exemplary FVC in the CPM.

TABLE 2

| DE | SI-Unit | Description |
|---|---|---|
| Sensor ID | — | Unique ID of sensor which is used to identify by which sensor an object has been perceived. The ID is a random number generated when the V2X device is activated and never changes until the V2X device is deactivated. |
| Sensor Type | — | Enumeration of sensor types: undefined (0), radar (1), lidar (2), monovideo (3), stereovision (4), nightvision (5), ultrasonic (6), fusedObject (7), pmd(8) |
| Sensor Position | | |
| Position X | m | Mounting position of the sensor in negative x-direction according to the ISO 8855 [i.15] reference frame, measured from the ETSI reference position (see Clause B.19 in EN 302 637-2 [3]) |
| Position Y | m | Mounting position of the sensor in y-direction according to the ISO 8855 [i.15] reference frame, measured from the ETSI reference position (see Clause B.19 in EN 302 637-2 [3]) |
| Radius | m | Average perception range of the sensor as defined by the manufacturer |
| Opening Angle | | |
| Begin Angle | deg | Start angle of the sensor frustum in ISO 8855 [i.15] coordinate system |
| End Angle | deg | End angle of the sensor frustum in ISO 8855 [i.15] coordinate system |
| Quality Class | — | Classification of sensor defining the quality of measured objects |

The FVC provides a description/information of at least one sensor mounted onto the originating V2X communication device. When the V2X communication device is equipped with multiple sensors, the description may be added several times. For example, the FVC provides information about the sensor capabilities of the originating V2X communication device. To this end, the generic sensor characteristics which provide the mounting position of a sensor on the disseminating V2X communication device as well as the type of sensor and the range and opening angle of the sensor (i.e., the frustum of the sensor) may be included as a part of the message. This information may be used by the receiving V2X communication device to select an appropriate prediction model according to the performance of the sensor.

Hereinafter, each piece of information (DE or DF) will be described with reference to Table 2.

Sensor ID: This indicates a unique ID of a sensor used to identify the sensor where an object is perceived (or detected). For example, the sensor ID indicates the unique ID of the sensor that detects the object. In an embodiment, the sensor ID may be a random number generated when the V2X communication device is activated, and may not be changed until the V2X communication device is deactivated.

Sensor type: This indicates the type of sensor. That is, the sensor type is enumerated. For example, the sensor type may be undefined (0), radar (1), lidar (2), monovideo (3), stereovision (4), nightvision (5), ultrasonic (6), fusedObject (7) or pmd (8).

Sensor position: Position X indicates the mounting position of the sensor in the negative x-direction, and position Y indicates the mounting position of the sensor in the y-direction.

Radius: This indicates the average recognition range of a sensor as defined by a manufacturer.

Opening angle and End angle: The opening angle indicates the start angle of the sensor frustum, and the end angle indicates the end angle of the sensor frustum.

Quality Class: This indicates classification of the sensors that define the quality of the measured objects.

Table 3 shows an exemplary POC in the CPM.

Measurement time: This indicates a time of microsecond unit from the message reference time. This may define the relative lifetime of the measured object.

Object ID: This indicates a unique random ID assigned to an object. This ID is maintained (i.e., is not changed) as long

TABLE 3

| DE | TS 102 894-2 [2] CDD reference | Mandatory | Description |
|---|---|---|---|
| Time of Measurement | | Yes | Time in micro-seconds from the message reference time. Defines the relative age of the measured object. |
| Object ID | | Yes | Unique random ID assigned to object. This ID is maintained (i.e. does not change) as long as the object is tracked (i.e. considered by the disseminating TTS-S"s data fusion processes). |
| Sensor ID | | Yes | Corresponds to the Sensor ID DE in Table 4. This DE is used to relate the object information to the sensor providing the measurement. |
| Longitudinal Distance | | Yes | |
| Distance Value | | Yes | Relative x-distance to object in originator reference frame ISO 8855 [i.15] |
| Distance Confidence | | Yes | Confidence of relative x-distance to object in originator reference frame ISO 8855 [1.15] |
| Lateral Distance | | Yes | |
| Distance Value | | Yes | Relative y-distance to object in originator reference frame ISO 8855 [i.15] |
| Distance Confidence | | Yes | Confidence of relative y-distance to object in originator reference frame ISO 8855 [1.15] |
| Longitudinal Speed | A.126 | Yes | Longitudinal speed of detected object along with confidence as described in CDD |
| Lateral Speed | A.126 | Yes | Lateral speed of detected object along with confidence as described in CDD |
| Object Heading | A.112 | No | Absolute orientation of object in WGS84 reference frame, if provided by data fusion process |
| Object Length | | No | |
| Length Value | | No | Measured length of the object |
| Length Confidence | | No | Confidence of measured length of the object |
| Object Width | | No | |
| Width Value | | No | Measured width of the object |
| Width Confidence | | No | Confidence of measured width of the object |
| Object Type | A.78 | No | Classification of object, if provided by data fusion process |

The POC is used to describe the object perceived by the sensor in terms of the transmitting V2X communication device. Upon POC reception, the receiving V2X communication device may perform the coordinate transformation process with the help of the OVC to convert the position of the object into the reference frame of the reception vehicle. In order to reduce the message size, several optional DEs may be provided, which may be used when the originating V2X communication device may provide this DE.

The POC may be configured with selection of DEs to provide an abstract description of the perceived (or detected) object. For example, relative distance and velocity information and timing information about the perceived (or detected) object related to the originating V2X communication device may be included in the POC as a mandatory DE. In addition, when the sensor of the originating V2X communication device can provide the requested data, additional optional DEs may be provided.

Hereinafter, each piece of information (DE or DF) will be described with reference to Table 3.

as the object tracks (i.e., as long as being considered by a data fusion process of the disseminating V2X communication device).

Sensor ID: This is an ID corresponding to the sensor ID DE in Table 2. This DE may be used to correlate object information with a sensor that provides measurement.

Longitudinal distance and Distance confidence for longitudinal distance: The distance value indicates a relative distance x to the object in the originator reference frame, and the distance confidence indicates the confidence of a relative distance x to the object in the originator reference frame.

Lateral distance and Distance confidence for lateral distance: The distance value indicates a relative distance x to the object in the originator reference frame, and the distance confidence indicates the confidence of a relative distance x to the object in the originator reference frame.

Longitudinal speed: This indicates the longitudinal velocity of the detected object according to the confidence.

Lateral speed: This indicates the lateral velocity of the detected object according to the confidence.

Object direction: When provided by the data fusion process, in the reference frame, this indicates the absolute direction of the object.

Object length and Length confidence for object length: The length value indicates the measured length of the object, and the length confidence indicates the confidence of the measured length of the object.

Object width and Width confidence for object width: The width value indicates the measured width of the object, and the width confidence indicates the confidence of the measured width of the object.

Object type: This indicates the classification of the object, when provided by the data fusion process.

Figure 6:
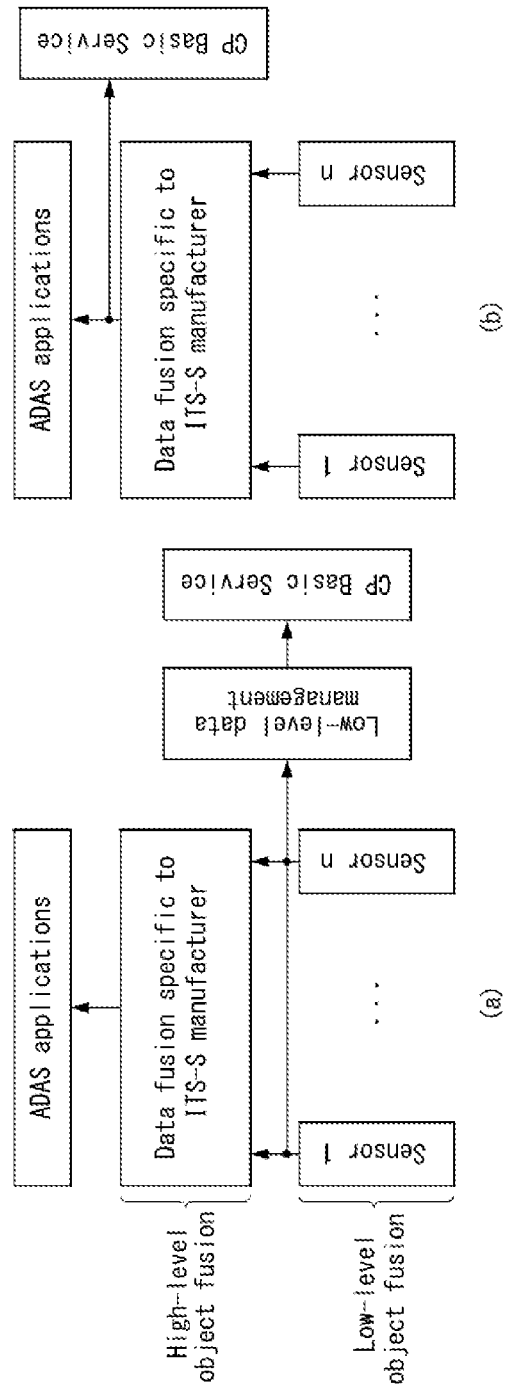
FIG. 6 illustrates a method of extracting sensor data by a V2X communication device providing a CP service according to an embodiment of the disclosure.

FIG. 6 is a view illustrating a method of extracting sensor data by a V2X communication device providing a CP service according to an exemplary embodiment of the disclosure. Specifically, FIG. 6(a) shows how the V2X communication device extracts sensor data at a low level, and FIG. 6(b) shows how the V2X communication device extracts sensor data at a high level.

The source of the sensor data to be transmitted as a part of any CPM need to be selected according to the requirements of the prospective data fusion process on the receiving V2X communication device. Generally, the transmitted data need to be as close as possible to the original sensor data. However, simple transmitting of the original sensor data, for example, raw data is not a viable solution. This is because the transmitting of the original sensor data imposes very high requirements in regard to the data rate and transmission period. FIGS. 6(a) and 6(b) show possible implementations for selecting data to be transmitted as a part of the CPM.

In the embodiment of FIG. 6(a), sensor data are obtained from different sensors, and are processed as a part of a low-level data management entity. This entity may not only select the object data to be inserted as a part of the next CPM, but also calculate the plausibility of the detected object. In the case of FIG. 6(a), since the data of each sensor are transmitted, the amount of data transmitted through the V2X network is increased, but the sensor information may be efficiently used at the receiving V2X communication device.

In the embodiment of FIG. 6(b), the sensor data or the object data provided by the data fusion process specific to a V2X communication device manufacturer are transmitted as a part of the CPM. In the case of FIG. 6(b), since the integrated sensor data collected into one through the data fusion block are transmitted, there is an advantage in that the amount of data transmitted through the V2X network is small. However, there is a disadvantage of being dependent on the collection method of the V2X communication device collecting the sensor information. In this case, since different data fusion processes can be implemented by different manufacturers, this implementation method is not generally preferred to FIG. 6(a).

On the other hand, regardless of the implementation type, whenever the object is detected by the sensor of the V2X communication device, the plausibility thereof needs to be calculated. When the plausibility of the object exceeds a given threshold PLAUS OBJ, the transmission needs to be considered. For example, when an absolute difference between the current yaw-angle of the detected object and the yaw angle included in the CPM previously transmitted by the originating V2X communication device exceeds about 4 degrees, when a relative distance between the current positions of the originating V2X communication device and the detected object and a relative position difference between the originating V2X communication device and the detected object included in the CPM previously transmitted by the originating V2X communication device exceeds about 4 meters, or when an absolute difference between the current velocity of the detected object and the velocity included in the CPM previously transmitted by the originating object exceeds about 0.5 m/s, the transmission may be considered.

A CAM is a technology of helping more stable driving by periodically transmitting, to neighboring V2X vehicles, the position and status of a vehicle in which a V2X module is installed. However, since an existing CAM has a limitation of sharing only information on a corresponding vehicle, in order to solve this problem, a collective perception service (CPS) technology is being discussed. Since vehicles using ADAS technology are continuously increasing, many vehicles are equipped with sensors such as cameras, Radars and Lidars to recognize neighboring vehicles and perform driver assistance functions. The CPS technology refers to technology for informing neighboring apparatuses of sensor data obtained by recognizing surrounding environments through V2X communication in the ADAS.

In the present disclosure, an efficient management method of CPS technology for transmitting neighboring vehicle information and a communication algorithm suitable for a V2X communication environment in order to complement a CAM for transmitting only information on a corresponding vehicle are proposed.

Figure 7:
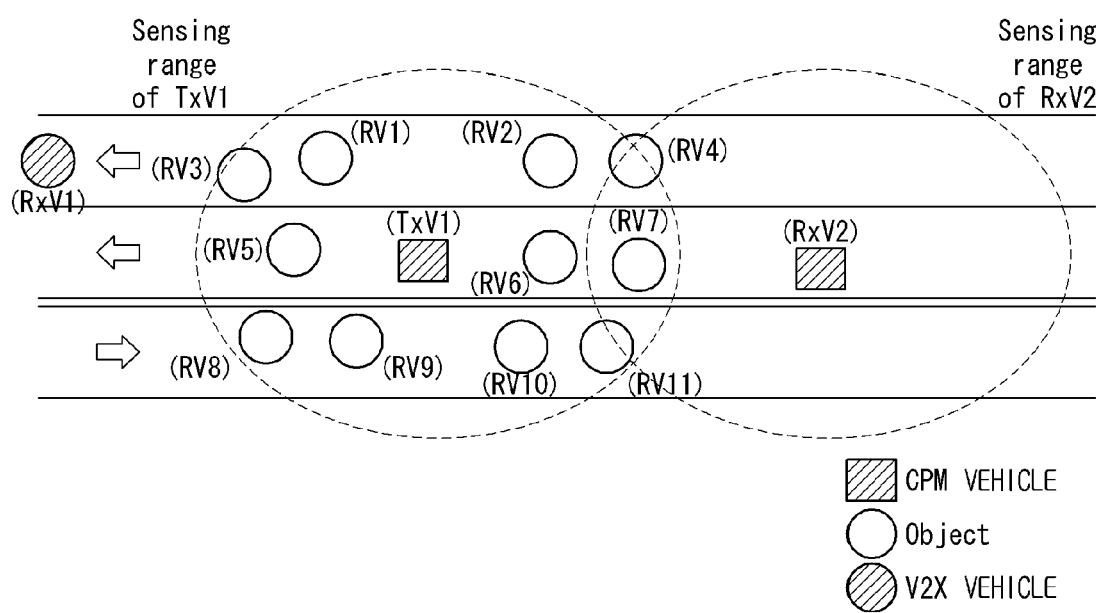
FIG. 7 is a view illustrating a CP service as an embodiment, to which the present disclosure is applicable.

FIG. 7 is a view illustrating a CP service as an embodiment, to which the present disclosure is applicable.

Referring to FIG. 7, it is assumed that each of vehicles TxV1 and RxV2 has at least one sensor and has a sensing range denoted by a dotted line.

The vehicle TxV1 having a CPS function may recognize vehicles RV1 to RV11, which are neighboring objects belonging to the sensing range, using many ADAS sensors installed therein. The obtained object information may be transmitted to neighboring vehicles respectively equipped with V2X receivers through V2X communication. For example, among neighboring vehicles which has received the CPS message, the vehicle RxV1 without a sensor may obtain information on the following vehicles and the vehicle RxV2 equipped with a sensor may also obtain information on an object outside the sensing range thereof or located in a blind spot.

As described above with reference to FIG. 3, the facility layer may provide the above-described CP service. That is, the CP service may be performed in the facility layer, and services internally present in the facility layer may be used. Here, a local dynamic map (LDM) may be a service for providing a map and map information for a CP service may be received. Position and time (POTI) may be a service for providing the position and time of a vehicle and the position of the vehicle and an accurate time may be received using corresponding information. A vehicle data provider (VDP) may be a service for providing information on a vehicle and may transmit information such as the size of a vehicle in a CPM.

ADAS vehicles are equipped with various sensors such as cameras, infrared sensors, radars and Lidars to assist drivers. Each sensor may individually recognize an object and the recognized object information may be collected, fused by a data fusion block and provided to an ADAS application. Referring to FIG. 6 again, a method of collecting (or fusing) sensor information in an existing ADAS technology for a CP service will be described.

An existing ADAS sensor or CPS sensor may always track neighboring objects and collect related data. In this case, when a sensor value for a CPS service is used, sensor information may be collected using two methods. Referring to FIG. 6(a), each sensor value may be individually provided to neighboring vehicles through a CP service. As shown in FIG. 6(a), since information is transmitted for each sensor, the amount of data transmitted through V2X increases, but each sensor information may be efficiently used in a reception system. Referring to FIG. 6(b), fused sensor information collected as one after the data fusion block may be provided to the CP service. In this case, the size of the CPM transmitted through V2X may be reduced, but is dependent on the method of collecting the sensor information at the vehicle.

Figure 8:
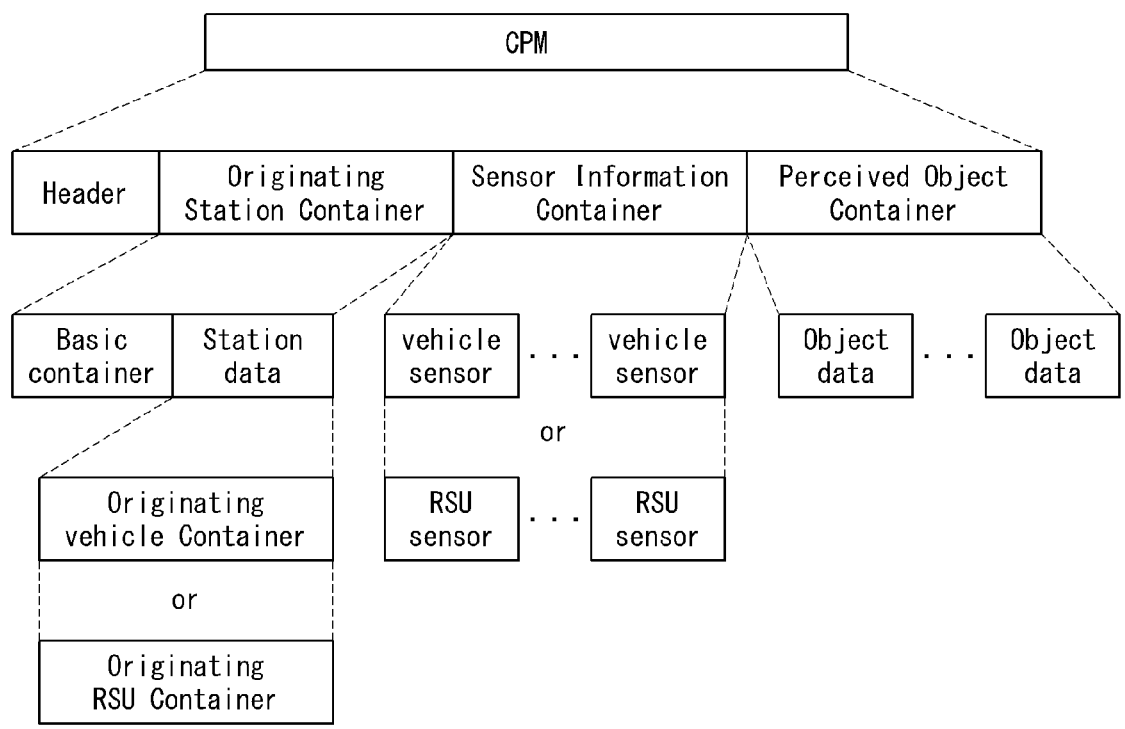
FIG. 8 is a view illustrating the structure of a CPM according to an embodiment, to which the present disclosure is applied.

FIG. 8 is a view illustrating the structure of a CPM according to an embodiment, to which the present disclosure is applied.

Referring to FIG. 8, the CPM may include a header field, an originating station container (OSC) field, a sensor information container (SCI) field, and a perceived object container (POC) field (or data, information or container).

The header may include "protocolVersion", "messageID", "stationID" and "generationDeltaTime" fields. Fields sequentially indicate a protocol version, an ID for identifying a message, an ID for identifying a station and a message generation time.

The OSC field used to transmit vehicle information may include a "BasicContainer" field and/or a "StationData" field. The station may be roughly divided into a vehicle and a road side unit (RSU), and there may be a "StationData" field suitable therefor. In addition, commonly necessary originating station information may be included in a "BasicContainer" field. The "basicContainer" field of the OSC may include a "referencePosition" field indicating the reference position of the vehicle for transmitting the CPM and a "stationType" field indicating a station type (e.g., vehicle or RSU). The "StationData" field of the OSC may be differently defined according to the type of the station. If the station is a vehicle, the "StationData" field may include an "OrignatingVehicleContainer" field, and the "OrignatingVehicleContainer" field may include a "Heading" field, a "Speed" field, an "OrientationDeltaAngle" field, a "driveDirection" field, an "Acceleration" field and/or a "trailerData" field (or data, information or container). The fields may sequentially indicate the drive direction of the vehicle, the speed, the angle between the drive direction of the vehicle and the front surface of the vehicle, the acceleration of the vehicle and the trailer information. If the station is an RSU, the "StationData" field may include an "intersectionReferenceID" field and/or a "RoadSegmentationID" field, and the fields may respectively indicate an ID for identifying an intersection and a road ID.

The SIC indicates a container used to transmit installation/function information of a sensor used to detect an object. The SIC may include a vehicle sensor field and an RSU sensor field according to the type of the station. In addition, the vehicle sensor field may include a SensorID indicating the ID of the sensor, a SensorType indicating the type of the sensor, offset data (xOffset, yOffset and zOffset; denoted by Offset based on referencePosition) indicating the position of the sensor and/or data indicating a sensor measurement range (range, horizontalFrustumStart/End, verticalFrustumStart/End, measurement distance, horizontal measurement range, and vertical measurement range). The RSU sensor field may include a SensorID indicating the ID of the sensor, offset information (xOffset, yOffset, and zOffset; denoted by Offset based on referencePosition) indicating the position of the sensor and/or data indicating a sensor measurement range (range, horizontalFrustumStart/End, verticalFrustumStart/End, measurement distance, horizontal measurement range, and vertical measurement range).

The POC is a container including information on neighboring objects collected through sensors. An "ObjectData" field including object information may be generated according to the number of measured objects. For example, when four objects are measured, four object data may be included in the POC field.

The object data may include an "ObjectID" indicating the ID of the object, data "SensorID" and "TimeOfMeasurement" indicating a sensor used for measurement and a time, position information ("xDistance", "yDistance", "zDistance", which respectively indicate x, y and z distances from "referencePosition") of the measured object, object motion information ("xSpeed", "ySpeed", "zSpeed", "xAcceleration", "yAcceleration", "zAcceleration", which respectively indicate speeds and accelerations in x-, y-, z-axes), object size information ("planarObjectDimensionl", "planarObjectDimensionl", "verticalObjectDimension", which indicate the size and height of a horizontal plane of the object) and/or object state information ("classification", "lanePosition", "intersectionTopologyPositoin", which respectively the vehicle type of the object, the lane information of the object and the intersection position information of the object).

Figure 9:
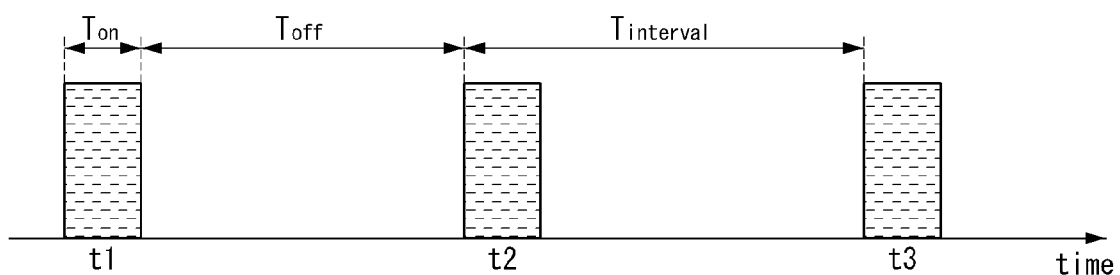
FIG. 9 is a view illustrating a method of managing a CPM according to an embodiment of the present disclosure.

FIG. 9 is a view illustrating a method of managing a CPM according to an embodiment of the present disclosure.

Referring to FIG. 9, in order to provide the CPS, the V2X vehicle may continuously track neighboring objects using sensors and manage the position and state of the object. In addition, the V2X vehicle may generate a CPM using the vehicle information and the tracked object information. The generated CPM may pass through a network and transport layer and an access layer to generate V2X packets. In addition, the object information sensed by the vehicle for providing the CPS through a radio frequency (RF) module may be transmitted to a neighboring V2X vehicle according to a predetermined (or allocated) message transmission interval.

As shown in FIG. 9, the generated V2X message may be periodically transmitted in an RF channel. When a transmission period is reached (t1 time), the V2X vehicle transmits the generated V2X message to neighboring vehicles. A time when the message is actually transmitted corresponds to $T_{on}$ and means a time occupying a channel. When the number of sensors increases or the number of sensed objects increases, the size of the CPS message increases and thus the value of $T_{on}$ may also increase. The V2X message is periodically transmitted and is transmitted at a time t1, and the V2X message may be transmitted again at times t2 and t3. At this time, the V2X message transmitted at times t2 and t3 may be generated using newly updated object information. The transmission interval of the V2X message may indicate $T_{interval}$. The transmission interval may be fixedly determined and may be adjusted according to a channel load, for example, when DCC technology is applied.

Figure 10:
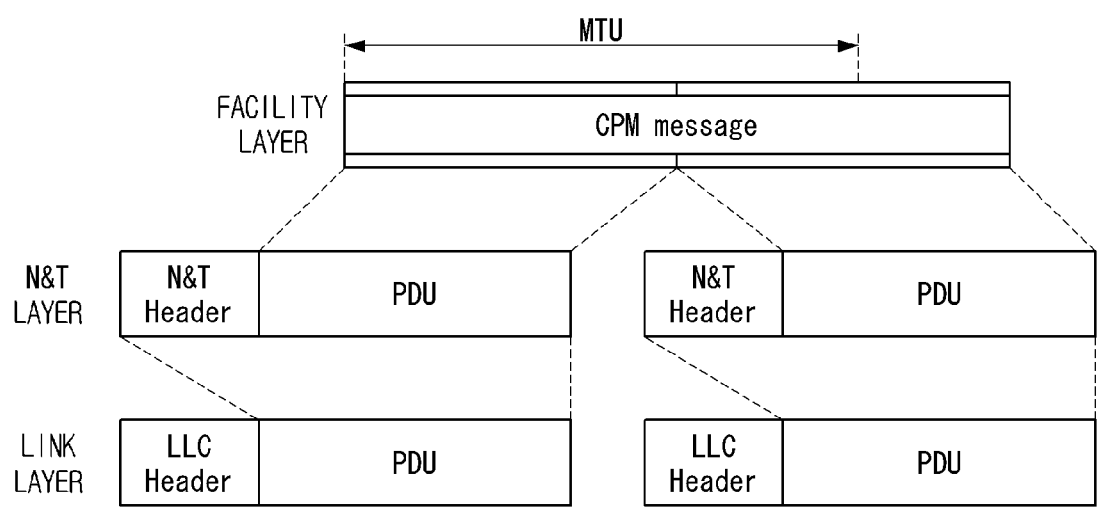
FIG. 10 is a view illustrating a method of fragmenting a CPM as an embodiment, to which the present disclosure is applied.

FIG. 10 is a view illustrating a method of fragmenting a CPM as an embodiment, to which the present disclosure is applied.

Referring to FIG. 10, the V2X message generated in the facility layer is transmitted to the PDU of the network and transport layer. As a protocol of the network and transport layer, generally, a GeoNet & BTP protocol is used in the EU and a WSMP protocol is used in the US. The PDU of the network and transport layer is attached with an N&T header while passing through the network and transport layer and is transmitted to the PDU of a link layer. In the link layer, the PDU transmitted from a higher layer is attached with a link layer header, thereby generating a link layer packet. In addition, the link layer packet is transmitted to DSRC-WAVE (IEEE 802.11P) which is an access layer.

The size of the packet which may be processed (or maximally transmitted) in DSRC-WAVE does not exceed a $MTU_{AL}$ (Maximum Transmission Unit) value defined in the access layer. In addition, in the MTU defined in a lower layer (that is, access layer) of the link layer, the PDU size excluding the header size of the link layer becomes the MTU ($MTU_{NT}$) of the N&T layer. MTU ($MTU_{facility}$) which is the maximum allowable size of the facility layer may be defined in consideration of the value excluding the header of the N&T layer from the MTU defined in the lower layer or the maximum size which may be processed in the N&T layer. That is, the message generated in a facility layer may not exceed the MTU. An existing message such as a CAM or a DENM is a message for transmitting the state or event of the vehicle and does not exceed $MTU_{facility}$ even when all optional data are included.

On the other hand, the size of the CPM may be flexibly changed according to the number of sensors or the number of sensed (or detected) objects. In a system for providing a CPS, up to 10 sensors may be represented and up to 255 objects may be represented. Accordingly, the amount of data included in the CPM according to the number of sensors and the number of objects may be very large as compared to the size of the CAM or DENM. In addition, the size of data may be changed according to the object and whether to use optional data. The number of sensors in the vehicle may increase as the technology of the ADAS vehicles or autonomous vehicles advances in the future and the number of detected objects may increase with sensor performance improvement. In addition, as the number of sensors increases and an autonomous driving level increases, functions may be added for the CPS and thus the size of the transmitted message may be further included.

In one embodiment of the present disclosure, when the size of the CPM is greater than the size of $MTU_{facility}$, the CPM message may be fragmented. Referring to FIG. 10, it is assumed that the size of the CPM is greater than $MTU_{facility}$, and, in this case, the CPM is fragmented into two messages. The two message fragmented in the facility layer are attached with headers in each layer (or layer) while passing through the N&T layer and the link layer, thereby generating packets.

In the case of an existing TCP/IP, Ack/Nack communication is possible, the message is fragmented into MTUs or lower in the network and transport layer, and an index and CRC may be included in a header. After a receiver receives all messages, the messages may be recombined and transmitted to a higher layer. However, in the case of V2X communication, since communication using Ack/Nack is impossible, it is a system which cannot request retransmission. Accordingly, when some of the fragmented message are lost, the receiver cannot synthesize the fragmented messages or request retransmission of the lost messages. In addition, V2X communication is technology that prioritizes safety and life of drivers and V2X messages need to be transmitted and received in real time.

If the message is fragmented in byte units (or simply with a specific size) regardless of the content like an existing method, a receiver may use information included in a message only when all fragmented messages are received. In contrast, when a message has an error or when some messages are lost, the other fragmented messages cannot be used and information included in the message may be obtained only when all the fragmented messages are received.

Therefore, the present disclosure proposes a method of fragmenting a generated message in units of content in order to solve this problem. In other words, when the generated CPM is greater than an MTU, the generated CPM may be fragmented in object units. In the case of a message fragmented using the method proposed in this disclosure, a receiver may immediately obtain information on the object only when some messages are received. In addition, even when the messages are not completely received or some messages are lost, the receiver may check the state of the object using only the received messages.

Figure 11:
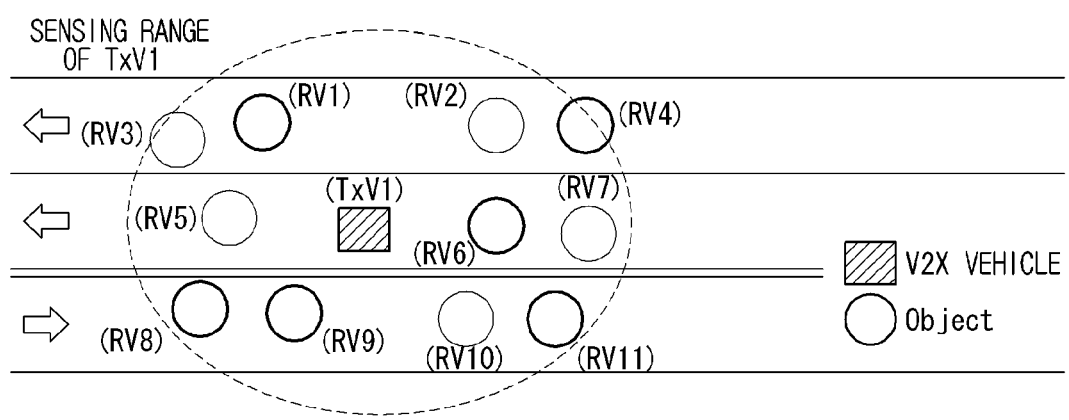
FIG. 11 is a view illustrating a method of fragmenting a CPM according to an embodiment of the present disclosure.

FIG. 11 is a view illustrating a method of fragmenting a CPM according to an embodiment of the present disclosure.

Referring to FIG. 11, a vehicle TxV1 may detect neighboring objects RV1 to RV11 in a sensing range. The vehicle TxV1 may manage a list of detected objects. Here, the list of the detected objects may be referred to as an object list, an object container, an object sequence, etc. in the present disclosure. The object list may include a plurality of detected objects and an index (or order) may be assigned to each object.

In one embodiment of the present disclosure, a vehicle may fragment a message in units of objects not to exceed an MTU. The vehicle may divide objects according to the order of objects in the object list managed internally. According to the present embodiment, the fragmented messages may be received and immediately used in a vehicle system. In addition, the present embodiment is more simply applicable. However, when the index (or order) is assigned in order of measurement (or detection), since the position of the first measured object may be continuously changed, the order of the object and the position of the object may be irrelevant.

FIG. 12 is a view illustrating a random fragmentation method of a CPM according to an embodiment of the present disclosure.

In one embodiment of the present disclosure, when the size of the CPS message exceeds the size of an MTU, the V2X vehicle may divide objects in a random manner unlike the embodiment described in FIG. 11. Referring to FIG. 12, a vehicle which generates and transmits a CPS message may randomly select and configure fragmented CPMs, when an original CPM exceeds MTU.

When the original CPM is fragmented into two fragmented CPMs in a random manner, the objects may be classified into objects to be inserted into a first packet shown in FIG. 12(a) or a second packet shown in FIG. 12(b) according to a random selection method, and a POC may be configured using to the same. The V2X vehicle may generate two fragmented CPMs by combining the configured POC with a header, an OSC and/or an SIC applied commonly.

The present embodiment may be implemented by applying a simple algorithm. In addition, since object information may be distributed and included in errors such as continuous (or periodic) errors or packet loss, this is robust to a channel environment. However, a problem may occur because the CPM is fragmented regardless of the position of the object described above. This will be described with reference to the following drawings.

FIG. 13 is a view illustrating problems of a random fragmentation method according to an embodiment of the present disclosure.

Referring to FIG. 13(a), it is assumed that a vehicle TxV1 divides objects in the random manner described in FIG. 12 and a vehicle RxV1 receives a first message among the fragmented CPMs. The vehicle TxV1 may transmit the first fragmented CPM and the vehicle RxV1 may receive the message and obtain information on RV2, RV3, RV5, RV7 and RV10. Referring to FIG. 13(b), when the vehicle RxV1 receives the second fragmented CPM, all fragmented CPMs are received and all neighboring objects belonging to the sensing range of the vehicle TxV1 may be recognized.

When the objects are divided in the above-described random manner, as shown in FIG. 13(a), information on the neighboring objects RV2, RV3, RV5, RV7 and RV10 may be partially obtained. However, for example, presence/absence of a vehicle RV4 within the area covered by the sensor of TxV1 may be recognized by receiving all fragmented (e.g., divided) messages.

Accordingly, the present disclosure provides an efficient fragmentation method of a CPM based on the position of an object in order to solve such a problem. By fragmenting the CPM based on the position information of the object, it is possible to eliminate the unknown state and to immediately use the fragmented CPMs. Specifically, the present disclosure proposes a position based fragmentation method, a distance based fragmentation method and a direction based fragmentation method.

Figure 14:
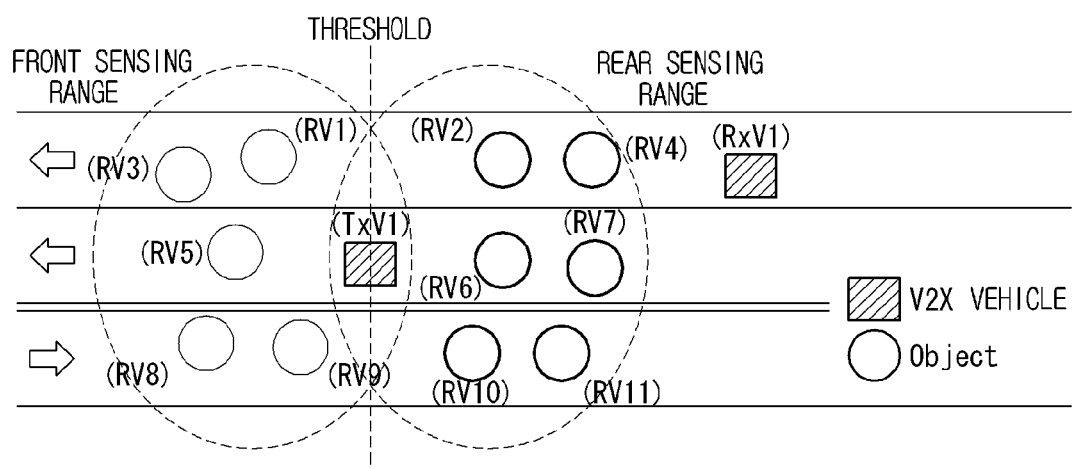

FIGS. 14 and 15 are views illustrating a method of fragmenting a CPM based on the position according to an embodiment of the present disclosure.

Referring to FIG. 14, in one embodiment of the present disclosure, the fragmented CPMs may be generated by dividing objects according to the positions of the objects determined based on the V2X vehicle. For example, as shown in FIG. 14, the objects may be divided back and forth according to the longitudinal positions of the objects determined based on the position of the vehicle TxV1.

When it is assumed that the CPM is fragmented into two fragmented CPMs and a front object is a first fragmented CPM and a rear object is a second fragmented CPM, the first CPM may include object information of vehicles RV1, RV3, RV5, RV8 and RV9 located in front of TxV1. In addition, the second CPM may include object information of vehicles RV2, RV4, RV6, RV7, RV10 and RV11 located behind TxV1.

If the vehicle RxV1 first receives the second fragmented CPM (or packet) including the objects located behind the vehicle TxV1, all the objects located behind the vehicle TxV1 may be recognized even when the other fragmented CPM is not received. That is, the unknown state of the objects located at the back of a threshold shown in FIG. 14 may be solved. According to the embodiment of the present disclosure, only some of the fragmented messages may be used for autonomous driving and neighboring vehicle recognition, by applying the position based fragmentation method.

When the CPM is fragmented as shown in FIG. 14 (that is, longitudinal fragmentation), the first fragmented CPM among the fragmented CPMs may be shown in FIG. 15(a) and the second fragmented CPM among the fragmented CPMs may be shown in FIG. 15(b).

POCs including objects distinguished by the position fragmentation method using the threshold may be configured. The two fragmented CPMs may be generated by combining the configured POCs with a header, an OSC and an SIC applied commonly.

A criterion for dividing objects may be set to divide the objects based on the position. For example, in the above-described embodiment, the vehicle TxV1 may set the front central position thereof as a reference position or a reference location. The position of the object based on the reference position (or the reference location) may be expressed by a value xDistance in a longitudinal direction and by a value yDistance in a latitudinal direction. In one embodiment, the fragmented CPMs may be transmitted by classifying objects expressed using xDistance and yDistance. At this time, in order to classify the objects expressed using xDistance and yDistance, a fragmentation criterion such as a fragmentation direction or a threshold may be transmitted, such that a receiver clearly recognizes the objects.

Figure 16:
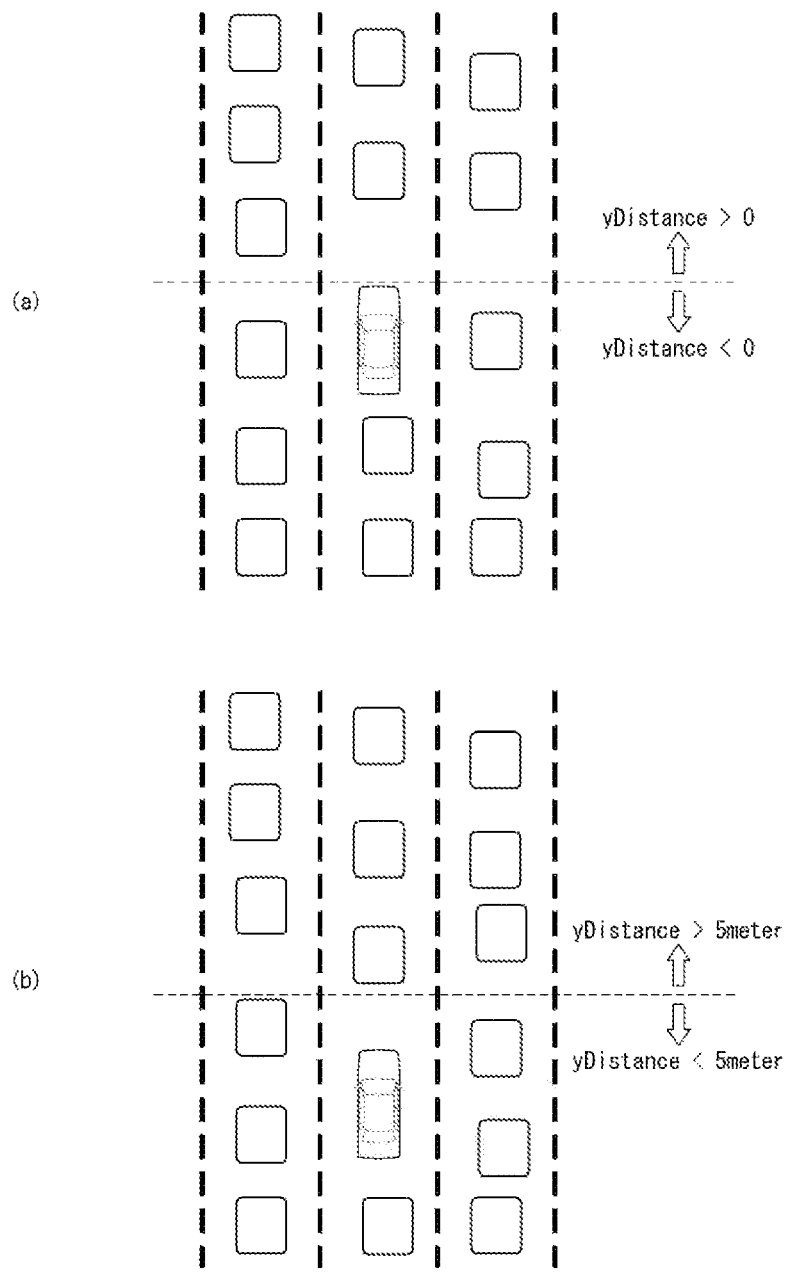
FIGS. 16 and 17 are views illustrating a method of fragmenting a CPM based on a position according to an embodiment of the present disclosure.
Figure 17:
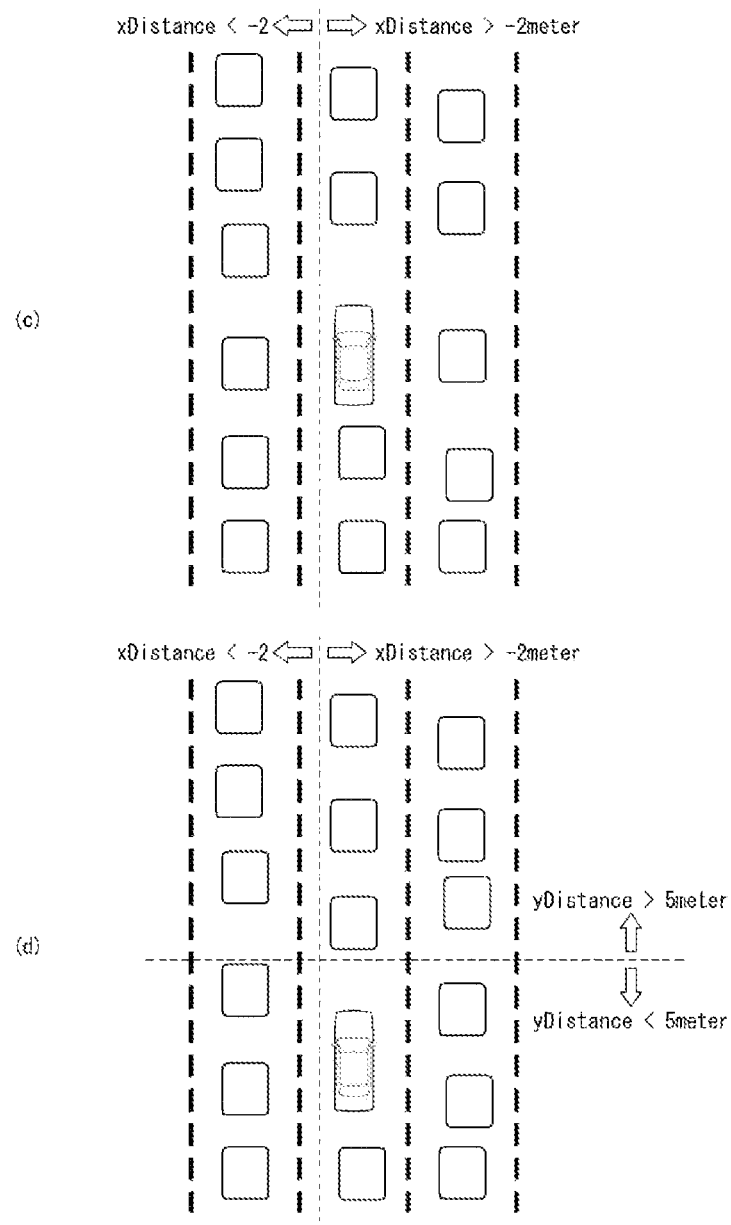

FIGS. 16 and 17 are views illustrating a method of fragmenting a CPM based on a position according to an embodiment of the present disclosure.

Referring to FIG. 16, the V2X vehicle may classify objects based on a longitudinal direction. In FIG. 16(a), it is assumed that a longitudinal threshold (or a longitudinal reference line) is 0 (meter). In one embodiment, information on objects located in front of the reference position of the front central side of the vehicle (that is, yDistance>yThreoshold) may be transmitted through the first fragmented CPM (or packet). In addition, information on objects located behind the reference position (yDistance<yThreoshold) may be transmitted through the second fragmented CPM.

Meanwhile, the number of objects may be relatively large in any one of the front or rear side of the vehicle. For example, even when many objects are present in front of the vehicle, if the reference position is equally maintained as in the above-described embodiment, the CPM may not be fragmented into MTUs or lower. In this case, if the reference position is changed from the front central side of the vehicle to another position, the CMP may be efficiently fragmented. In other words, when many neighboring vehicles are located in front of the vehicle, the reference point may be set to a non-zero value. In FIG. 16(b), it is assumed that a longitudinal threshold (or a longitudinal reference line) is 5 (meters). Referring to FIG. 16(b), the number of objects included in the fragmented CPMs may be adjusted by changing the reference position through the threshold.

Referring to FIG. 17, similarly, the V2X vehicle may classify objects based on a latitudinal direction. In FIG. 17(c), it is assumed that a latitudinal threshold (or a latitudinal reference line) is −2 meters. In one embodiment, the V2X vehicle may classify objects using values xDistance and xThreshold. The V2X vehicle may transmit a first fragmented CPM including information on objects located at the left side of the reference position (that is, xDistance<xThreoshold) and transmit a second fragmented CPM including information on objects located at the right side of the reference position (that is, xDistance>xThreoshold).

In addition, referring to FIG. 17(d), the V2X vehicle may classify objects using both two axes (longitudinal and latitudinal directions). In this case, the V2X vehicle may transmit area information of the objects, by transmitting the latitudinal threshold xThreshold and the longitudinal threshold yThreshold. FIG. 17(d) shows the case where xThreshold may be set to −2 meters and yThreshold may be set to 5 meters.

Figure 18:
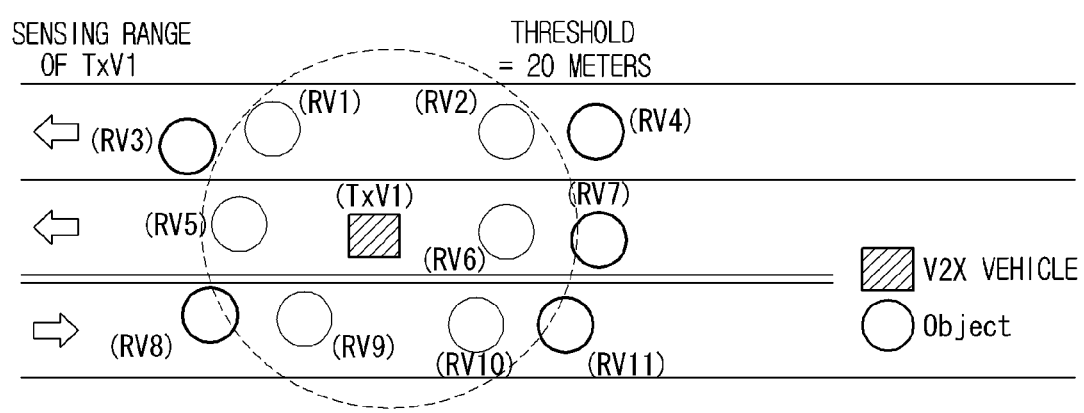
FIG. 18 is a view illustrating a method of fragmenting a CPM based on a distance according to an embodiment, to which the present disclosure is applied.

FIG. 18 is a view illustrating a method of fragmenting a CPM based on a distance according to an embodiment, to which the present disclosure is applied.

In one embodiment of the present disclosure, the V2X vehicle may fragment the CPM based on the distances of neighboring objects. For example, when the size of the CPM exceeds that of the MTU, the vehicle TxV1 may assign a first fragmented CPM (or packet) to objects having small distances from TxV1 and assign a second fragmented CPM to objects having relatively large distances. The order of fragmented CPMs may be changed. In FIG. 18, it is assumed that a distance threshold is set to 20 meters. A first fragmented CPM composed of information on objects (that is, RV1, RV2, RV5, RV6, RV9 and RV10) close to the vehicle TxV1 may be generated and a second fragmented CPM composed of information on objects (that is, RV3, RV4, RV7, RV8 and RV11) far from the vehicle may be generated.

In addition, in one embodiment, since accuracy of information on objects relatively close to the vehicle TxV1 may be high, the vehicle TxV1 may use a CP service management method of distinguishing between relatively close objects and distant objects, frequently transmitting information on the close objects and transmitting information on the distant objects at a small interval. The CP service management method will be described below in detail.

FIG. 19 is a view illustrating a method of fragmenting a CPM based on a distance according to an embodiment, to which the present disclosure is applied.

Referring to FIG. 19, when the message is fragmented according to the distance based CPM fragmentation method, among the fragmented CPMs, a POC may be configured using information on objects RV1, RV2, RV5, RV6, RV9 and RV10 in the first fragmented CPM and a POC may be configured using information on objects RV3, RV4, RV7, RV8 and RV11 in the second fragmented CPM. Two fragmented CPMs may be generated by combining the POCs configured in this manner with a header, an OSC and/or an SIC.

In one embodiment, a detailed method of dividing objects based on the distance is proposed. The V2X vehicle may set the front central position thereof as a reference position or a reference location. The position of the object based on the reference position (or the reference location) may be expressed by a value yDistance in a longitudinal direction (or a vertical direction) and by a value xDistance in a latitudinal direction (or a horizontal direction). The V2X vehicle may classify the objects expressed using xDistance and yDistance based on the distance and the distance value may be calculated using Equation 1 below.

$$\text{Distance} = \sqrt{x\text{Distance}^2 + y\text{Distance}^2} \quad \text{Equation 1}$$

Figure 20:
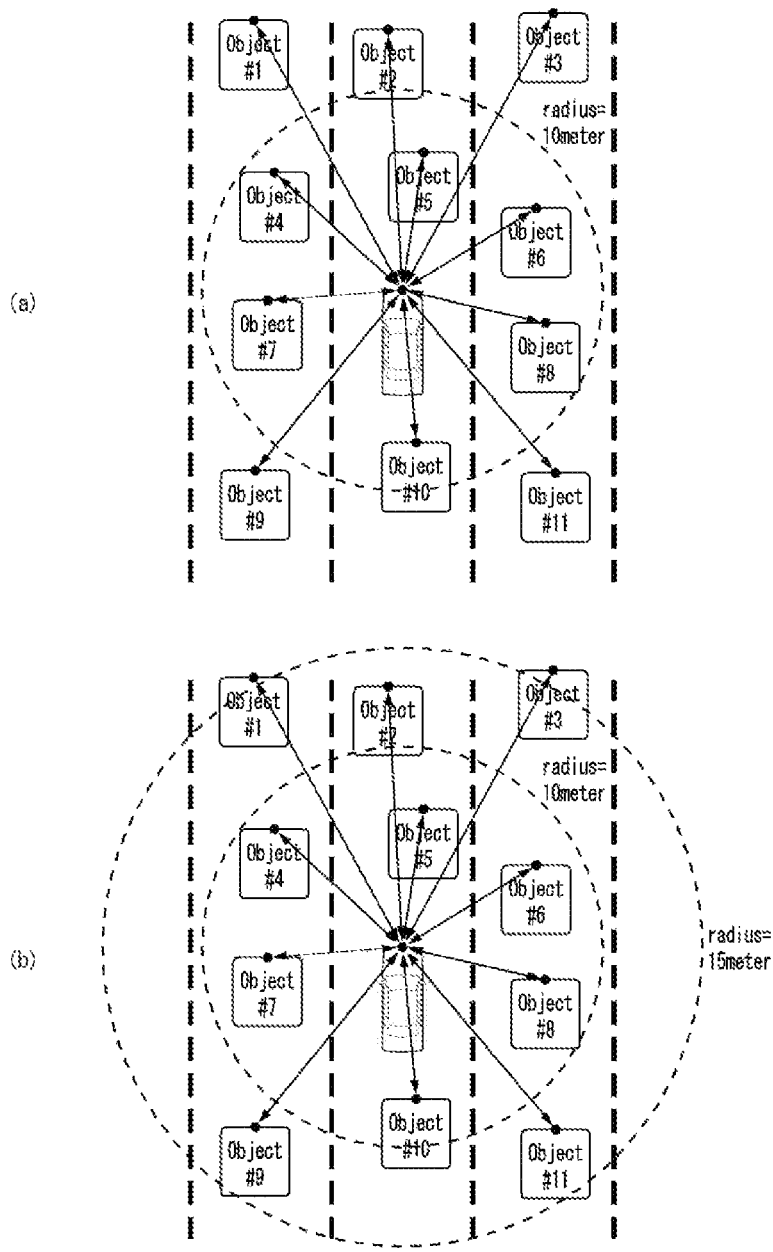
FIG. 20 is a view illustrating a method of fragmenting a CPM based on a distance according to an embodiment of the present disclosure.

FIG. 20 is a view illustrating a method of fragmenting a CPM based on a distance according to an embodiment of the present disclosure.

Retelling to FIG. 20(a), it is assumed that threshold_radius indicating a threshold radius is set to 10 meters. In this case, the V2X vehicle may transmit information objects belonging to a radius of 10 meters based on the reference position (that is, Distance<Threshold_radius) through the first fragmented CPM and transmit information on objects located outside the radius of 10 meters (that is, Distance>Threshold_radius) through the second fragmented CPM.

Referring to FIG. 20(b), when there are many neighboring objects and the objects are fragmented into three or more packets, there may be three or more areas by transmitting two or more thresholds (or threshold radii) and thus objects may be classified. In FIG. 20b, it is assumed that 10 and 15 may be set as two thresholds. In this case, objects belonging to an area within 10 meters from the vehicle TxV1, objects belonging to an area from 10 meters to 15 meters and objects within an area of 15 meters or more are fragmented into three areas and the objects belonging to each area may be divided to transmit the fragmented CPMs.

Figure 21:
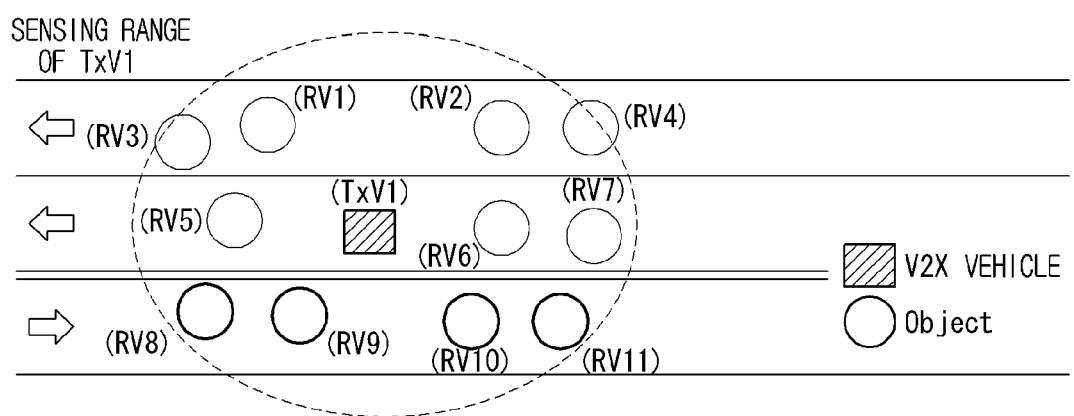
FIG. 21 is a view illustrating a method of fragmenting a CPM based on a direction according to an embodiment of the present disclosure.

FIG. 21 is a view illustrating a method of fragmenting a CPM based on a direction according to an embodiment of the present disclosure.

In one embodiment of the present disclosure, the V2X vehicle may fragment the CPM based on the movement direction of the object. Referring to FIG. 21, a vehicle TxV1 may compare the drive direction thereof with the drive direction of the object and classify objects. That is, vehicles RV1, RV2, RV3, RV4, RV5, RV6 and RV7 correspond to objects having the same drive direction and vehicles RV8, RV9, RV10 and RV11 correspond to objects having an opposite drive direction. At this time, the vehicle TxV1 may configure the objects having the same drive direction as one packet and configure the objects having the opposite drive direction as another packet.

In one embodiment, the V2X vehicle may compare the drive direction thereof with the drive direction of the object, assign objects which are traveling in the same direction to a first fragmented CPM packet, and assign objects which are traveling in the opposite direction to a second fragmented CPM packet. Of course, the order of packets is an example and may be changed.

In addition, in one embodiment, since the objects traveling in the same direction as TxV1 are continuously observed and the objects traveling in the opposite direction are temporarily observed, efficient management of the CP service using the same is possible. The CP service management method will be described below in detail.

FIG. 22 is a view illustrating a method of fragmenting a CPM based on a direction according to an embodiment, to which the present disclosure is applied.

Referring to FIG. 22, when the message is fragmented according to the above-described direction based CPM fragmentation method, among the fragmented CPMs, a POC may be configured using information on objects RV1, RV2, RV3, RV4, RV5, RV6 and RV7 in the first fragmented CPM, and a POC may be configured using information on objects RV8, RV9, RV10 and RV11 in the second fragmented CPM. Two fragmented CPMs may be generated by combining the POCs configured in this manner with a header, an OSC and/or an SIC applied commonly.

Figure 23:
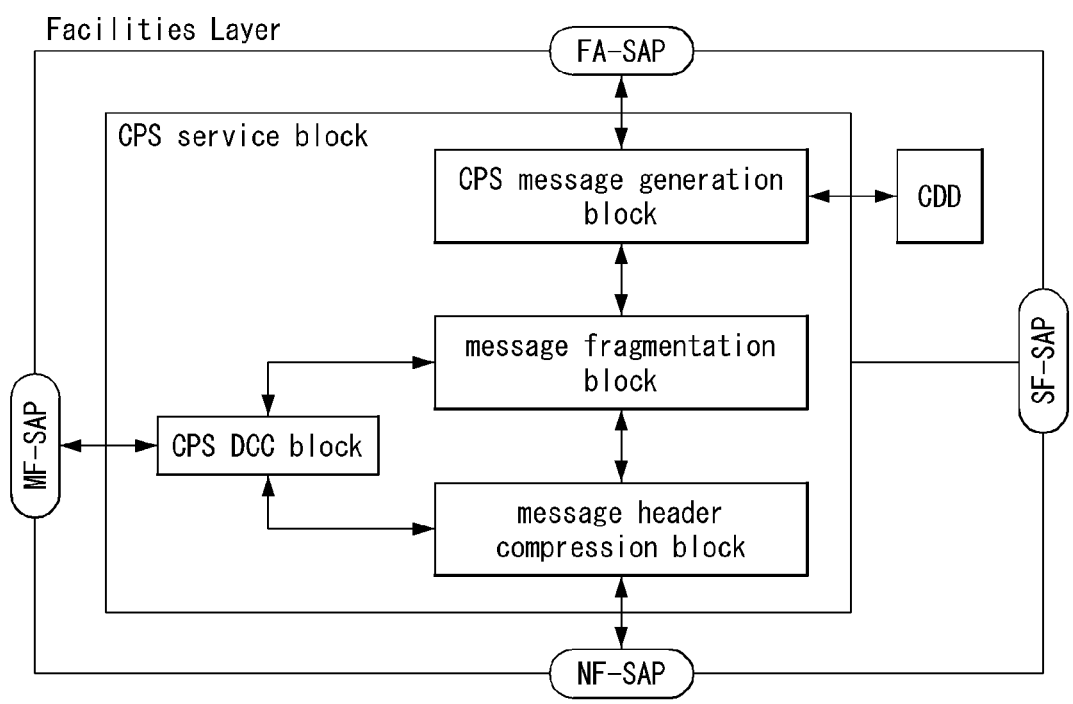
FIG. 23 is a view illustrating the structure of a facility layer according to an embodiment of the present disclosure.

FIG. 23 is a view illustrating the structure of a facility layer according to an embodiment of the present disclosure.

Referring to FIG. 23, in a transceiver, a CP service may be performed in the facility layer, and the CP service block performed in the facility layer is shown in FIG. 23. The CP service block may include a "CPS message generation block", a "message fragmentation block", a "CPS DCC block" and/or a "message header compression block". Here, the "CPS message generation block" indicates a block for generating a CPM. The "message fragmentation block" indicates a block for fragmenting the message generated by the "CPS message generation block" based on a size or environment. The "CPS DCC block" indicates a block for determining management of fragmented messages according to a channel state or a channel environment, and the "message header compression block" indicates a block for compressing the size of the finally fragmented messages.

A method of classifying objects and fragmenting a message when the CPM is fragmented has been described above. When the CPM is fragmented, information on fragmentation should be transmitted such that a receiver recognizes whether to fragment the message. A data format including fragmentation information will be described with reference to the following drawings.

FIGS. 24 and 25 are views illustrating a data format including fragmentation information, as an embodiment, to which the present disclosure is applied.

Referring to FIG. 24, parameters indicating fragmentation information may be included in a "DF Header". For example, the header of the CPM may include FragmentationID, FragmentationNumber, FragmentationIndex, FragmentationType, Threshold_x, Threshold_y, Threshold_z, Threshold_radius1, Threshold_radius2 and/or Threshold_direction.

Here, FragmentationID indicates the ID of the fragmented message, FragmentationNumber indicates the number of fragmented messages, FragmentationIndex indicates an index (or order) indicating a specific message among fragmented messages, and FragmentationType indicates a fragmentation type. In one embodiment, FragmentationType may indicate any one of a sequential fragmentation type in which the message is fragmented in order of indices assigned for each object in an object sequence, a random fragmentation type in which the message is fragmented in a random manner in the object sequence, a position based fragmentation type in which the message is fragmented based on the positions of the objects or a direction based fragmentation type in which the message is fragmented based on the movement directions of the objects.

In addition, the header of the CPM may include information on classification criterion of objects in addition to the fragmentation information. Here, Threshold_x, Threshold_y and Threshold_z indicate thresholds used for the position based fragmentation method. Threshold_radius1 and Threshold_radius2 indicate thresholds used for the distance based fragmentation method. Threshold_direction indicates a threshold used for the direction based fragmentation method. For example, each parameter may have an integer value and have a unit of 0.1 meters.

The above-described parameters may be all included or some of the above-described parameters may be omitted. In addition, the parameters may be essentially or selectively used. For example, in the case where the parameters including information on the classification criterion are selectively used, when a parameter is used, a fragmentation method corresponding thereto may be activated.

Referring to FIG. 25, signaling data indicating the fragmentation information of the CPM may be configured as a dedicated container. Such a message may be referred to as a fragmentation container fragmentationContainer in the present disclosure, and may be composed of a data frame (DF). The same parameters as described in FIG. 24 may be included, except that the signaling data is not included in a header and is recognized as a dedicated container.

Figure 26:
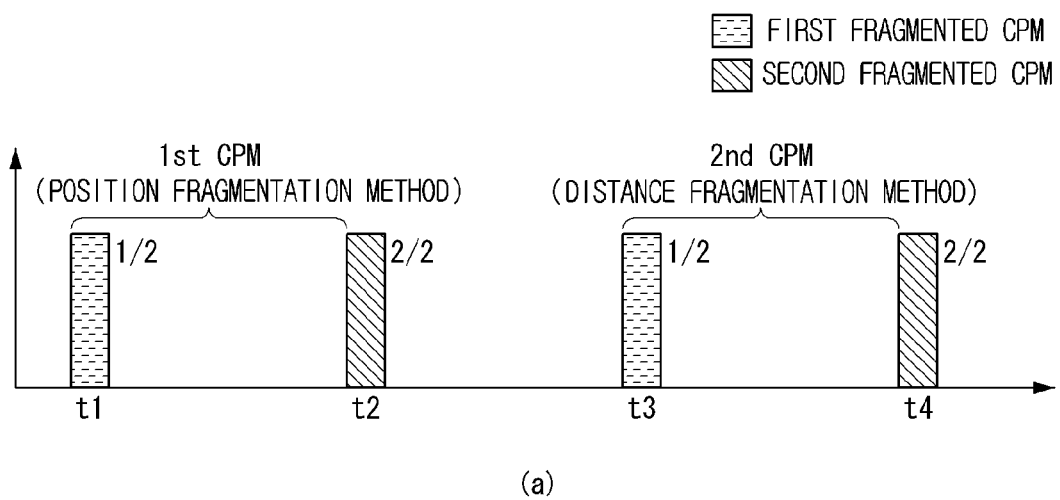
FIG. 26 is a view illustrating a method of transmitting a fragmented CPM according to an embodiment of the present disclosure.

FIG. 26 is a view illustrating a method of transmitting a fragmented CPM according to an embodiment of the present disclosure.

Referring to FIG. 26, it is assumed that each of two CPMs is fragmented into two and the fragmentation methods thereof are different from each other. A first CPM may be transmitted at times t1 and t2, FragmentationID may be set to 211 as a random value, FragmentationNumber may be set to 2 because the message is fragmented two, and FragmentationIndex may be set to 1 in the fragmented CPM transmitted at the time t1 and may be set to 2 in the fragmented CPM transmitted in at the time t2.

If fragmentation is performed 2 meters ahead of the vehicle in the longitudinal direction, the parameter Threshold_y may be used and the value thereof may be 20. At times T3 and t4, FragmentationID may be changed to 32 and FragmentationType may be set to a value of 2 indicating the distance based fragmentation method. In addition, the parameter threshold_radius1 including the threshold (or threshold radius) may be activated and a value of 60 corresponding to 6 meters may be transmitted.

The method of fragmenting the CPS message based on the object has been described above. Hereinafter, the structure of a transmitter for implementing the proposed method will be described.

The above-described message fragmentation block of FIG. 23 may receive the message generated in the CPS message generation block and determine whether to fragment the generated message and a fragmentation method, which will be described with reference to the following drawings.

Figure 27:
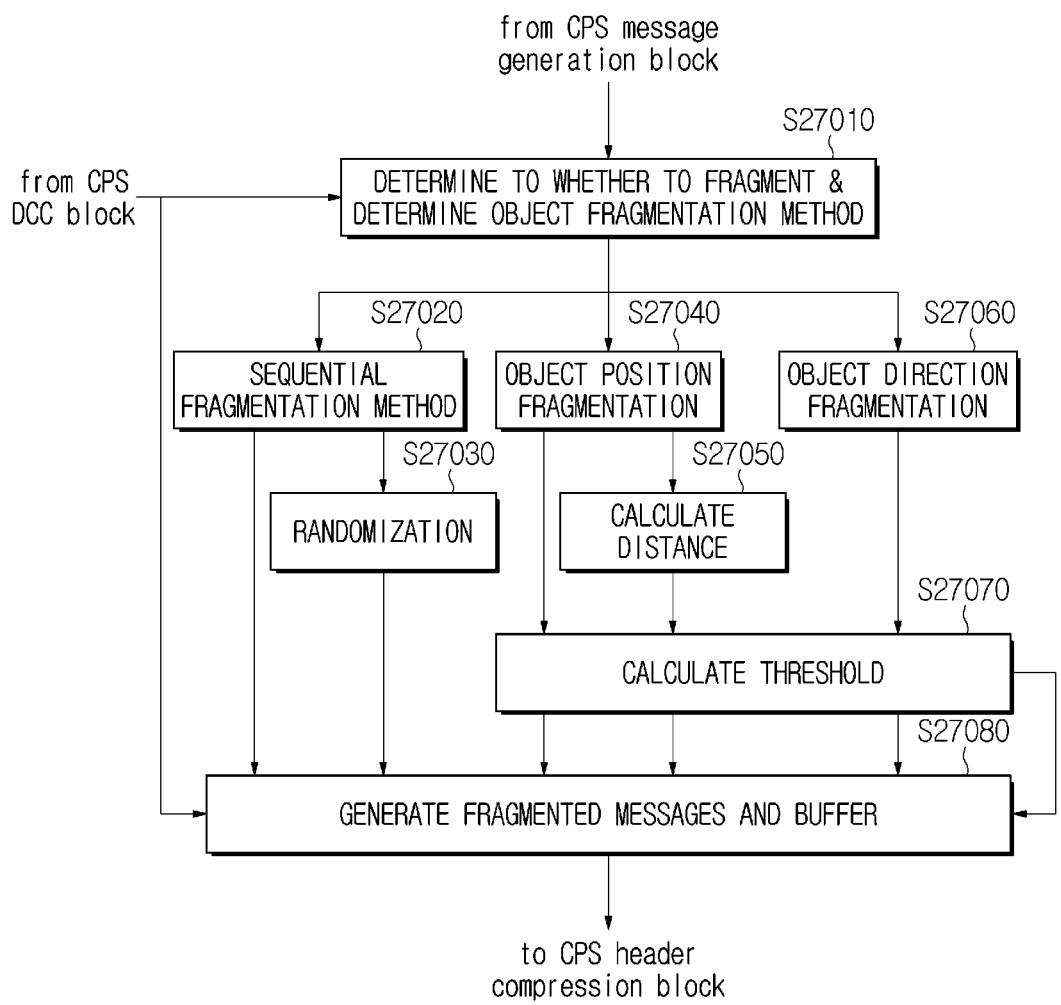
FIG. 27 is a flowchart illustrating a method of determining whether a CPM and a fragmentation method according to an embodiment of the present disclosure.

FIG. 27 is a flowchart illustrating a method of determining whether a CPM and a fragmentation method according to an embodiment of the present disclosure.

Referring to FIG. 27, the message fragmentation block described in FIG. 23 may be referred to as a V2X vehicle.

The V2X vehicle may receive the message generated in the CPS message generation block and determine whether to fragment the generated message and/or a fragmentation method (S27010). Although it is assumed that there is a plurality of fragmentation methods and the V2X vehicle determines a fragmentation method in the present embodiment, the message may be fragmented using a predetermined (or fixed) fragmentation method.

Upon determining that the CPM is fragmented and a sequential fragmentation method is determined in step S27010, the V2X vehicle performs fragmentation using a sequential method (S27020). In this case, as described above in FIG. 12, the message may be fragmented based on object numbers in an object list.

The V2X vehicle performs randomization of the object numbers when the random fragmentation method is applied in the sequential fragmentation method (S27030). As described with respect to 13, the object numbers may be shuffled through a randomization block.

Upon determining that the CPM is fragmented and an object position based fragmentation method is determined in step S27010, the V2X vehicle performs fragmentation based on the position of the object (S27040). In this case, the objects may be fragmented based on the method of fragmenting the objects based on the position and the distance. When the objects are fragmented based on the distance, the V2X vehicle may perform distance calculation (S27050).

Upon determining that the CPM is fragmented and an object direction based fragmentation method is determined in step S27010, the V2X vehicle performs fragmentation based on the movement direction (or the drive direction) of the object (S27060).

The V2X vehicle calculates a threshold for object classification (S27070). As described above, in methods other than the random method and the sequential method, a different threshold may be used for object fragmentation. Step S27070 may be performed in the threshold calculation block. The V2X vehicle generates the fragmented message based on the objects and performs buffering to transmit the CPM (S27080).

Figure 28:
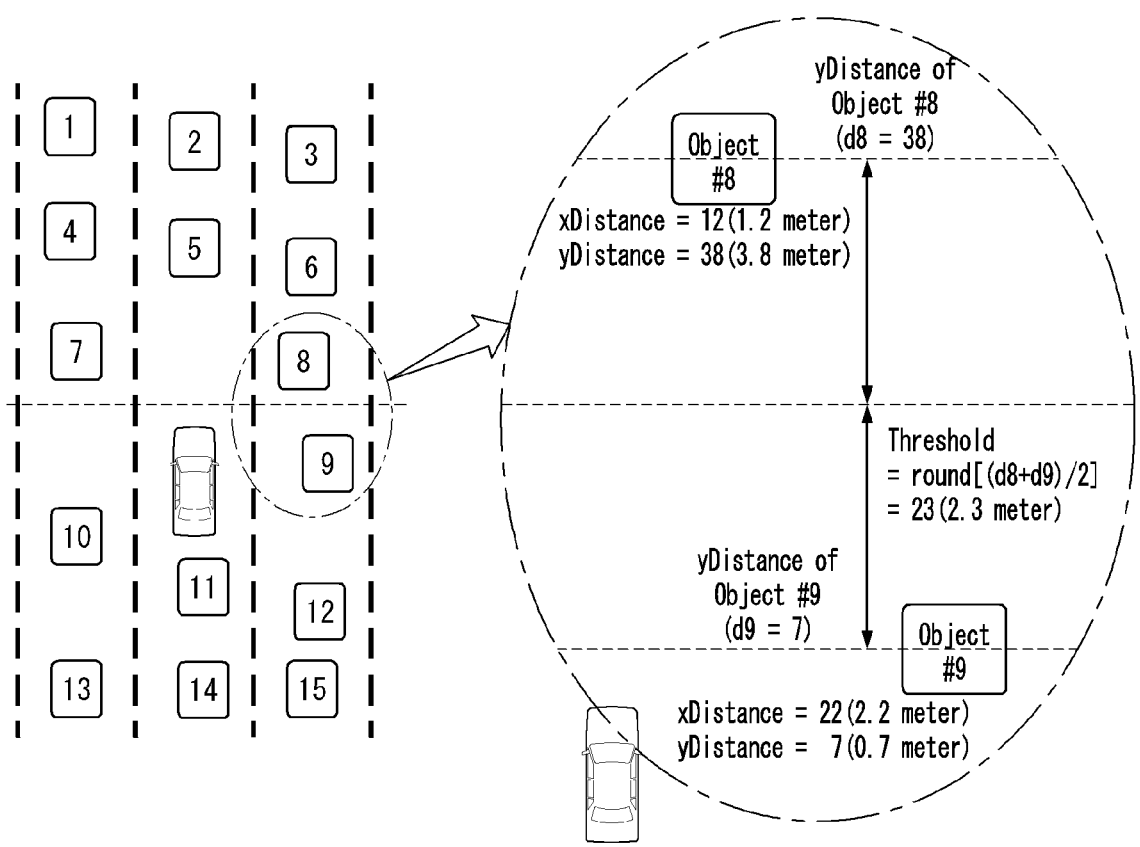
FIGS. 28 and 29 are views illustrating a method of calculating a threshold based on the position of a neighboring object, as an embodiment, to which the present disclosure is applied.
Figure 29:
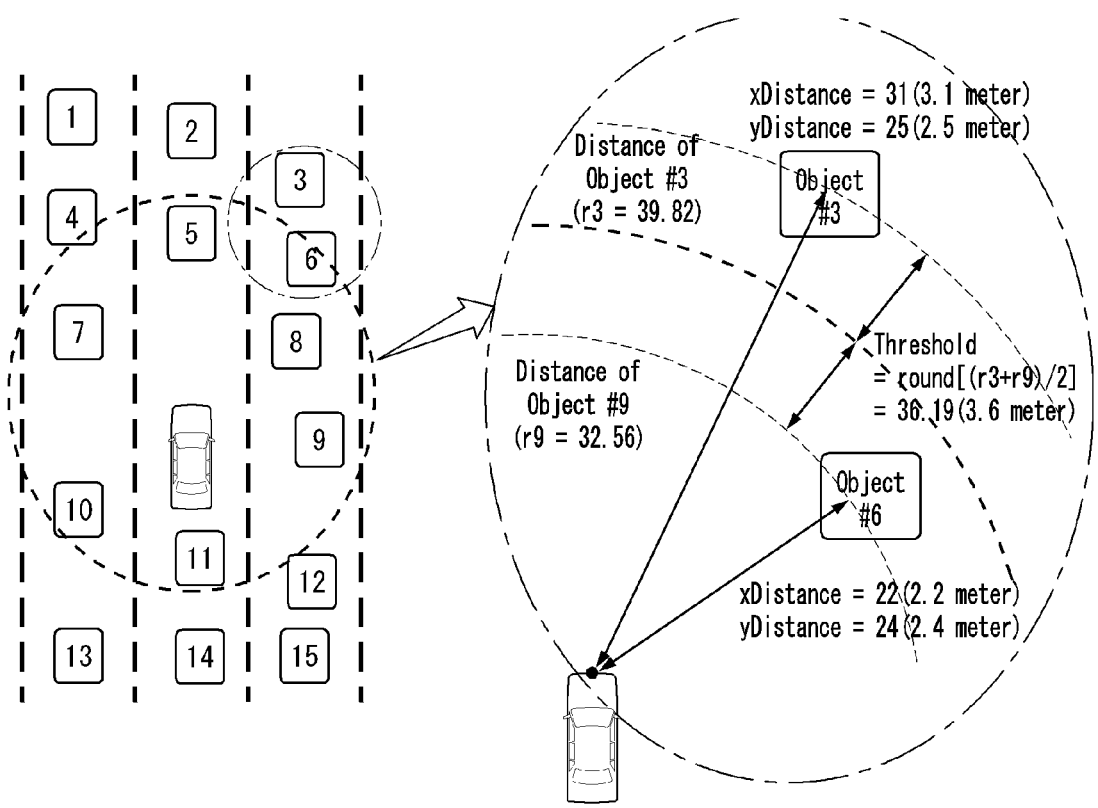

FIGS. 28 and 29 are views illustrating a method of calculating a threshold based on the position of a neighboring object, as an embodiment, to which the present disclosure is applied.

In one embodiment of the present disclosure, a method of calculating a threshold used when the position based fragmentation method and the distance based fragmentation method are applied is proposed. The position based fragmentation method may be performed by performing fragmentation based on the threshold, which is a fragmentation boundary, using xDistance indicating a latitudinal coordinate or yDistance indicating a longitudinal coordinate. FIG. 28 is a view illustrating a method of determining a threshold at the time of fragmentation using yDistance. In FIG. 28, it is assumed that a total of 15 objects is detected and a message size exceeds an MTU size. As the message size exceeds the MTU size, when fragmentation of the message is required, the V2X vehicle may set a threshold between Object 8 and Object 9 located at the fragmentation boundary.

In one embodiment, the V2X vehicle may respectively set the value yDistance d8 of Object 8 and the value yDistance d9 of Object 9 as upper and lower limits using Equation 2 below and set a value therebetween (an average value or a median value) as a threshold. In addition, in this case, round operation may be performed to finally have an integer value.

$$threshold^{12}_{position} = \left\lfloor \frac{d^1_{lower} + d^2_{upper}}{2} \right\rfloor \quad \text{Equation 2}$$

where, $d_{lower}^1$ denotes the distance d8 of Object 8 corresponding to the smallest value of the longitudinal position among the objects included in a first fragmented CPM and $d_{upper}^2$ denotes the distance d9 of Object 9 corresponding to the largest value of the longitudinal position among the objects included in a second fragmented CPM.

In one embodiment, the position based fragmentation method may be performed by performing fragmentation based on a threshold, which is a fragmentation boundary, using xDistance indicating a latitudinal coordinate or yDistance indicating a longitudinal coordinate. FIG. 29 is a view illustrating a method of determining a threshold at the time of fragmentation using a distance. In FIG. 29, it is assumed that a total of 15 objects is detected and a message size exceeds an MTU size. As the message size exceeds the MTU size, when fragmentation of the message is required, the V2X vehicle may set a threshold between Object 3 and Object 6 located at the fragmentation boundary. Accordingly, a distance value (that is, r3) of Object 3 and a distance value (that is, r6) of Object 6 may be set as upper and lower limits and a value therebetween (an average value or a median value) may be set as a threshold. In addition, in this case, round operation may be performed to finally have an integer value.

$$threshold^{12}_{distance} = \left\lfloor \frac{r^1_{lower} + r^2_{upper}}{2} \right\rfloor \quad \text{Equation 3}$$

where, $r_{lower}^1$ denotes the distance (that is, r3) of an object having a smallest distance among the objects included in a first fragmented CPM and $r_{upper}^2$ denotes the distance (that is, r6) of the largest distance among the objects included in a second fragmented CPM.

Figure 30:
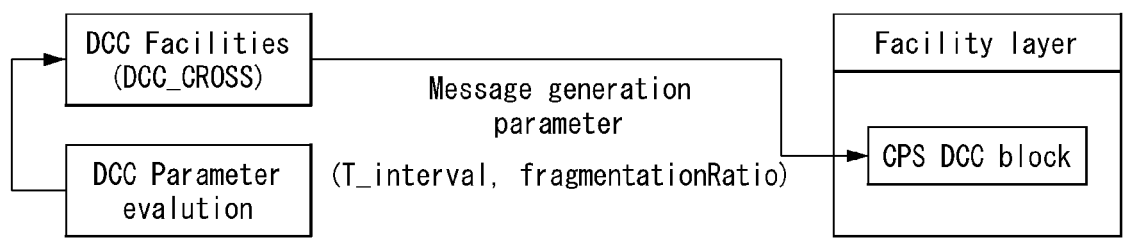
FIG. 30 is a block diagram illustrating a method of managing a fragmented CPM, as an embodiment, to which the present disclosure is applied.

FIG. 30 is a block diagram illustrating a method of managing a fragmented CPM, as an embodiment, to which the present disclosure is applied.

One embodiment of the present disclosure proposes a method of efficiently transmitting a fragmented CPM. In the above-described fragmentation method based on the position or direction of the object, it is possible to efficiently manage the fragmented message by applying a weight according to characteristics such as the position of the object and the surrounding environment. To this end, as shown in FIG. 30, the structure and operation of a DCC_CROSS block of a management layer and a CPS DCC block of a facility layer in a transmitter is proposed. In the facility layer, not only an existing message interval but also the transmission order of the fragmented messages may be determined based on a channel busy ratio (CBR). In addition, in the facility layer, the fragmented message may be managed based on this. In addition, information on fragmentationRatio indicating the weight (or the transmission interval ratio of the fragmented message) applied to the fragmented message may be added to MF_SAP for connecting the above two layers. The weight applied to the fragmented message may be referred to as a fragmentation ratio, a transmission ratio, a transmission interval ratio, a fragmentation transmission ratio, etc.

Figure 31:
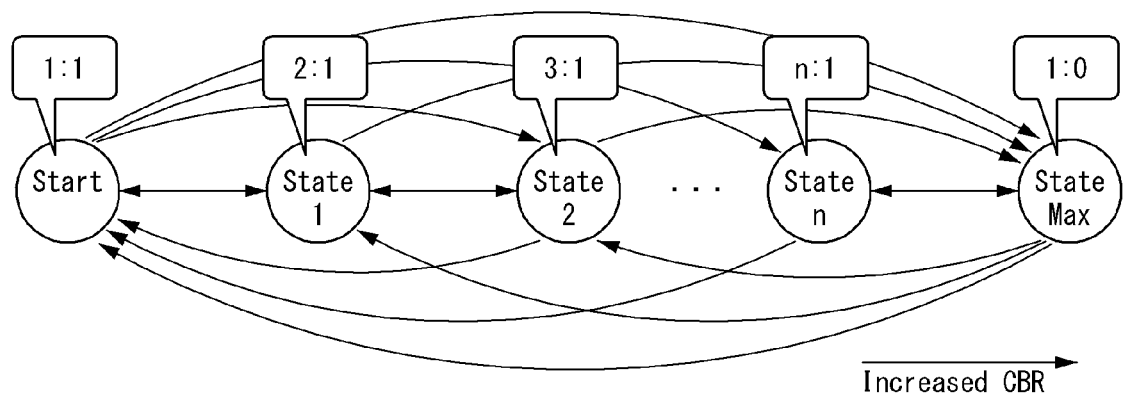
FIG. 31 is a view illustrating a method of adjusting a management interval of a fragmented message according to a channel environment according to an embodiment of the present disclosure.

FIG. 31 is a view illustrating a method of adjusting a management interval of a fragmented message according to a channel environment according to an embodiment of the present disclosure.

Referring to FIG. 31(a), the DCC_CROSS block of the management layer may adjust the management interval of the fragmented layer using channel environment information. To this end, the DCC_CROSS block may use a state-machine shown in FIG. 31(a). First, the state-machine may have a ratio of 1:1 and, in this case, the fragmented messages may be transmitted at the same interval.

Thereafter, when the channel state deteriorates and thus the CBR increases, the state may increase from 1 to n. At this time, the ratio between the first fragmented CPM and the second fragmented ratio may be adjusted and the transmission weight of the first fragmented CPM may be increased. In addition, in a special case such as a very bad channel state, state max in which only the first fragmented CPM is transmitted may be set. In one embodiment, a state-machine setting table for adjusting the transmission ratio of the fragmented message according to the CBR may be determined as shown in FIG. 31(b).

FIG. 32 is a view illustrating a method of transmitting a fragmented CPM according to an embodiment of the present disclosure.

Referring to FIG. 32, the case where the CPM is fragmented into two fragmented messages is described, but the present disclosure is not limited thereto and the CPM may be fragmented into a plurality of fragmented messages. Specifically, referring to FIG. 32(a), it is assumed that the transmission interval ratio of the fragmented message is 1:1. That is, this is a fragmentation transmission method when the same weight is applied. In this case, the messages fragmented with the same ratio may be sequentially transmitted. This corresponds to the start state of the state-machine.

Referring to FIG. 32(b), it is assumed that the transmission interval ratio of the fragmented message is 3:1. That is, the V2X vehicle may transmit a first message among the fragmented messages three times and then transmit a second message once. For example, at an intersection, to which the position based management method is applied, when the number of objects increases and thus fragmentation is necessary, more efficient system management may be possible by transmitting more fragmented messages including information on objects located ahead of the vehicle, which is being stopped. In addition, even in the distance based management method, when the message size increases and thus fragmentation is necessary, overall system performance may be improved by transmitting information on more objects adjacent to the vehicle. This corresponds to state 2 of the state-machine.

In FIG. 32(c), the case where the transmission interval ratio of fragmented messages is 1:0 will be described as an example of applying an extreme weight to the fragmented messages. This corresponds to state max of the state-machine. That is, the V2X vehicle may transmit only one message between the fragmented messages and may not transmit the other fragmented message. For example, in a high-density situation such as a downtown area, channel usage is high and the number of detected objects increases. Therefore, CPM fragmentation is required. However, in this case, the data rate of the information on the objects may decrease according to DCC management and the data rate may further decrease due to message fragmentation. Accordingly, in this case, using the direction fragmentation method, by transmitting the fragmented messages including the objects in the same direction which are continuously detected while traveling and not transmitting the fragmented message including objects, which travel in the opposite direction and are instantaneously detected, it is possible to increase system performance.

FIG. 33 is a view illustrating a method of compressing and transmitting a fragmented CPM according to an embodiment of the present disclosure.

In the case of the above-described message fragmentation, OriginatingStationContainer which is a container including the information on the vehicle and SensorinformationConatiner which is a container including sensor information were commonly included and transmitted in all fragmented messages in consideration of the PHY characteristics of DSRC-WAVE. However, for example, in a communication system in which transmission and reception are possible, such as unicast or multicast, other than a broadcast method such as C-V2X communication, the OSC and the SIC may be compressed and transmitted. Accordingly, in one embodiment of the present disclosure, compression may be performed in order to increase efficiency of the fragmented messages.

Referring to FIGS. 33(a) and 33(b), the structure of two fragmented CPMs are shown. However, when an LTE system such as C-V2X is used as PHY technology, the fragmented messages may be configured as shown in FIGS. 33(c) and 33(d). That is, as shown in FIG. 33(c), the fragmented message which is first transmitted may include an OSC and SIC container like the existing message. In contrast, as shown in FIG. 33(d), when reception is acknowledged in a communication system such as an LTE system, the fragmented message which is secondarily transmitted may not transmit the OSC and/or SIC container. FIG. 33(d) shows an embodiment of compressing the fragmented message by deleting only the SIC. By reducing the size of the message, information on more objects may be transmitted in the fragmented message which is secondarily transmitted or information on objects may be repeatedly transmitted.

Figure 34:
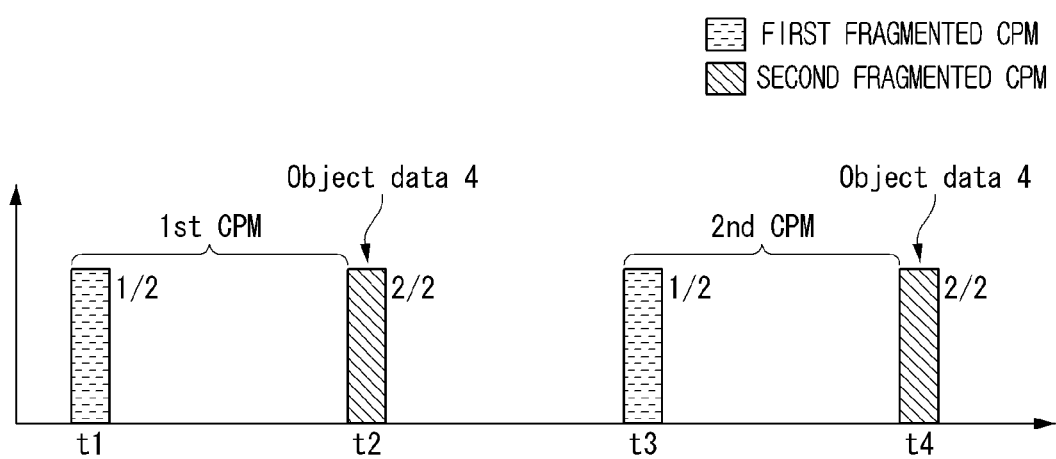
FIG. 34 is a view illustrating the problems of a method of fragmenting and transmitting a CPM based on an object according to an embodiment of the present disclosure.

FIG. 34 is a view illustrating the problems of a method of fragmenting and transmitting a CPM based on an object according to an embodiment of the present disclosure.

Referring to FIG. 34, when the size of the CPS message exceeds that of the MTU, an original CPS message (or an initial CPS message) may be fragmented into two or more and transmitted. At this time, since fragmentation transmission is performed in a state of fixing the packet transmission rate, the transmission rate of the information is reduced. When the message is fragmented into two messages, the information transmission rate of the object may be reduced to ½ and, when the message is fragmented into three messages, the transmission rate may be reduced to ⅓. Specifically, referring to FIG. 34, an embodiment in which the original CPM size exceeds the MTU size and fragmented packets are transmitted is shown. For example, Object 4 may be included in any one fragmented packet between two fragmented CPMs. In this case, the transmission rate is reduced to ½.

As described above, the packet fragmentation method based on the object decreases information transmission rate of the object. Accordingly, the present disclosure proposes a method of increasing the transmission rate of a specific object according to the state of the object when the packet fragmentation method is applied.

Figure 35:
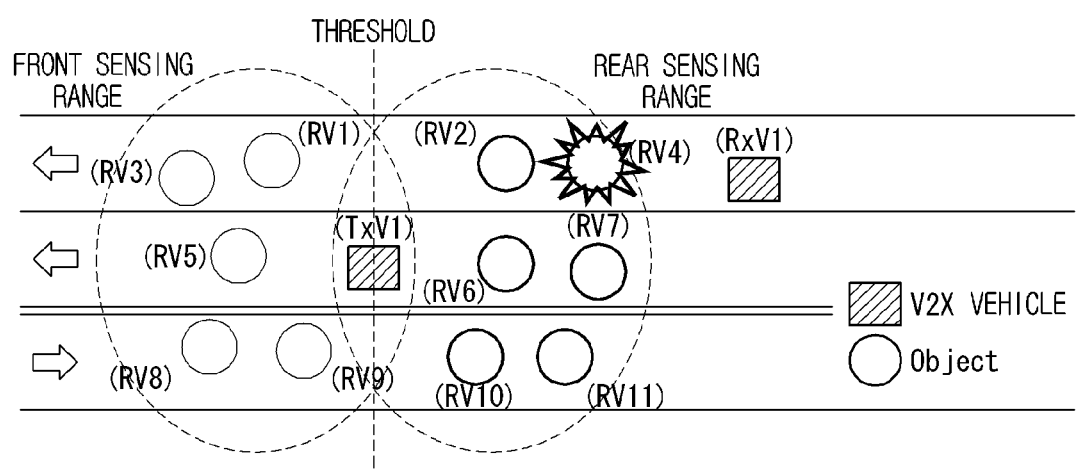
FIG. 35 is a view illustrating a repeated transmission method of an object, in which emergency has occurred, according to an embodiment of the present disclosure.

FIG. 35 is a view illustrating a repeated transmission method of an object, in which emergency has occurred, according to an embodiment of the present disclosure.

Referring to FIG. 35, an embodiment in which a CPM is fragmented based on the position of an object is shown. It is assumed that the size of the CPS message exceeds that of the MTU and the message is fragmented into two. At this time, object data of RV1, RV3, RV5, RV8 and RV9 may be transmitted in a first fragmented packet and object data of RV2, RV4, RV6, RV7, RV10 and RV11 may be transmitted in a second fragmented packet.

As shown in FIG. 35, when a vehicle RV4 brakes quickly while traveling, a vehicle RxV1 may obtain the state of the vehicle RV4 relatively later according to the transmission rate lowered due to fragmentation. In order to solve such a problem, when there is an object in an emergency situation, the information on the object may be included in all fragmented packets regardless of the position or state of the object. In this case, the vehicle RxV1 may receive a danger signal from the vehicle TxV1 as before regardless of whether to fragment the message.

Figure 37:
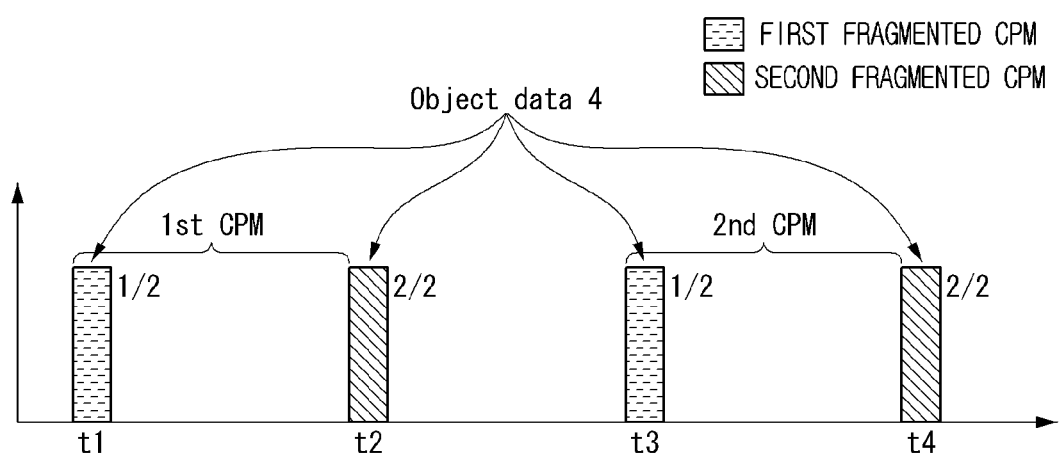

FIGS. 36 and 37 are views illustrating a repeated transmission method of an object, in which emergency has occurred, according to an embodiment of the present disclosure.

Referring to FIG. 36(a), it is assumed that emergency occurs in Object 4. According to the embodiment previously described with respect to FIG. 33, data on the objects RV1, RV3, RV5, RV8 and RV9 ahead of TxV1 and data on an object RV4 which is not located ahead of TxV may be transmitted together. In addition, referring to FIG. 36(b), information on the vehicle RV4 as a vehicle located behind TxV1 may be transmitted in the second fragmented packet as before.

As such, the transmitter may confirm the state or emergency of the object and transmit data on a specific object through application and exception of the fragmentation method. Referring to FIG. 37, data on Object 4 in which emergency has occurred may be included in all fragmented packets, unlike the existing method described in FIG. 34.

FIG. 38 is a view illustrating a data format of an object, in which emergency has occurred, according to an embodiment of the present disclosure.

In one embodiment of the present disclosure, for exceptional transmission of the object, in which emergency has occurred, the receiver may be informed of information on the object in the CPS message. Referring to FIG. 38, to this end, EmergencyObjectIDList including the ID information of the object, in which emergency has occurred, and/or a EmergencyObjectCodeList parameter indicating in which situation the object, in which emergency has occurred, is, may be added to FragmentationContainer which is a container including fragmentation information.

EmergencyObjectIDList may be defined through DE EmergencyObjectIDList. In EmergencyObjectIDList, ObjectIDs of objects in emergency situations may be listed. EmergencyObjectIDList may use a sequence and may include up to 10 object IDs. In addition, EmergencyObjectCodeList may be defined through DE EmergencyObjectCodeList. In addition, in EmergencyObjectCodeList, the emergency states of the objects in the emergency situations may be listed using CauseCode. A sequence may be used and up to 10 emergency object codes may be included.

Figure 39:
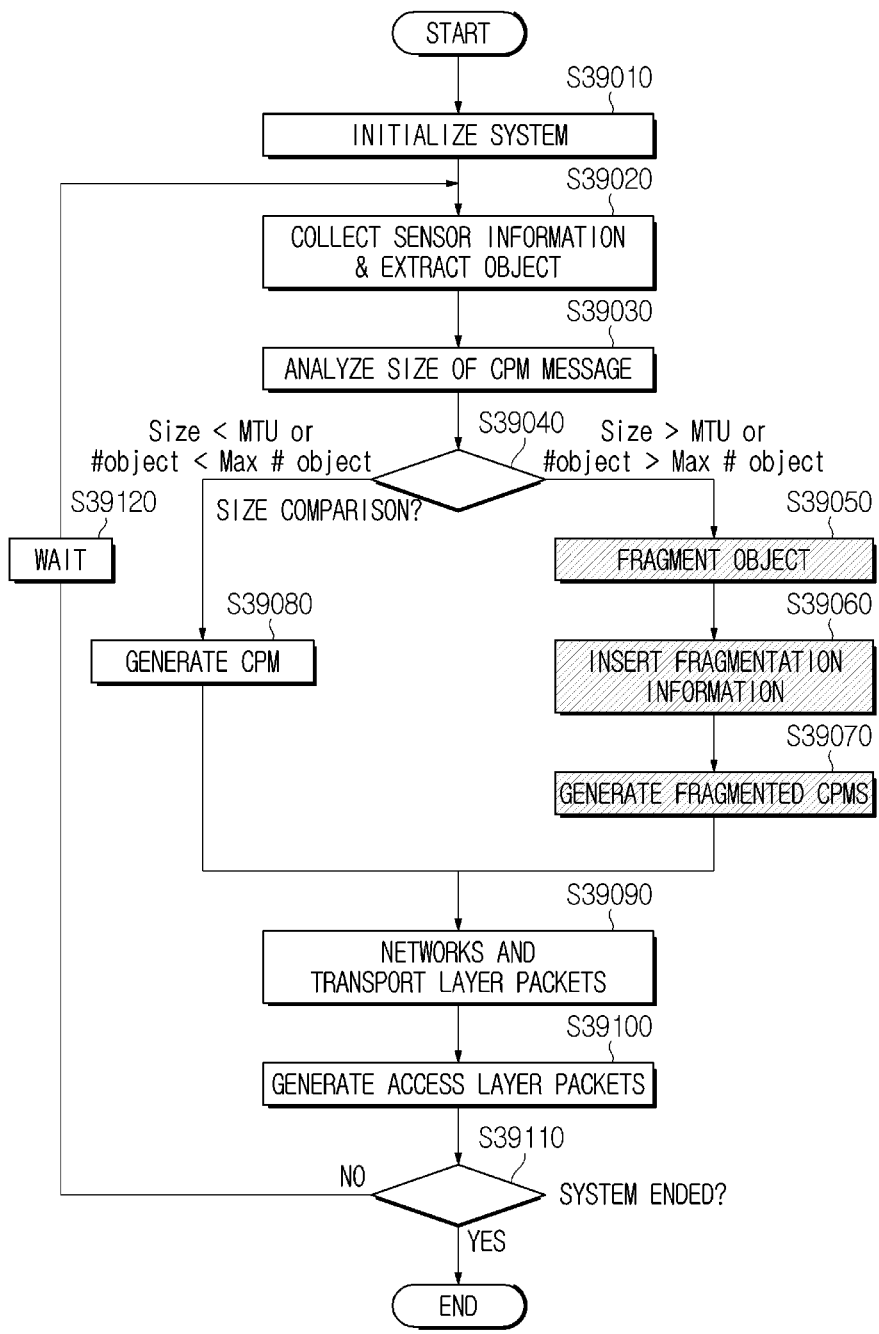
FIG. 39 is a flowchart illustrating a method of transmitting a CPM at a transmitter according to an embodiment of the present disclosure.

FIG. 39 is a flowchart illustrating a method of transmitting a CPM at a transmitter according to an embodiment of the present disclosure.

Referring to FIG. 39, the V2X vehicle performs system initialization (S39010). When the system operates, the fragmentation method may be predetermined. The V2X vehicle collects surrounding information through sensors and extracts objects (S39020), in order to provide a CP service. In addition, using them, the size of the CPM is measured (S39030).

If the size is less than that of the MTU of the facility layer, the CPM is transmitted through the N&T layer and the access layer, like the existing CPS method (S39040 and S39080). Thereafter, when the system is not finished, the vehicle waits for a predetermined message transmission interval Tinterval and S39110 and S39120. The CPM is generated again.

If the size of the CPM is greater than that of the MTU or the number of objects exceeds a maximum number of objects, the V2X vehicle fragments the CPM based on the objects (S39050). First; a preset object fragmentation method is applied to perform fragmentation to have fragmented CPMs having a smaller size than the MTU. In addition, the V2X vehicle finally generates fragmented CPMs, by inserting fragmentation information used in the fragmentation process, inserting threshold information if necessary, generating a header field of the CPM and then generating a POC using the classified objects (S39070). The fragmented CPMs are transmitted through the N&T layer and the access layer like the existing CPM (S39090 and S39100).

Figure 40:
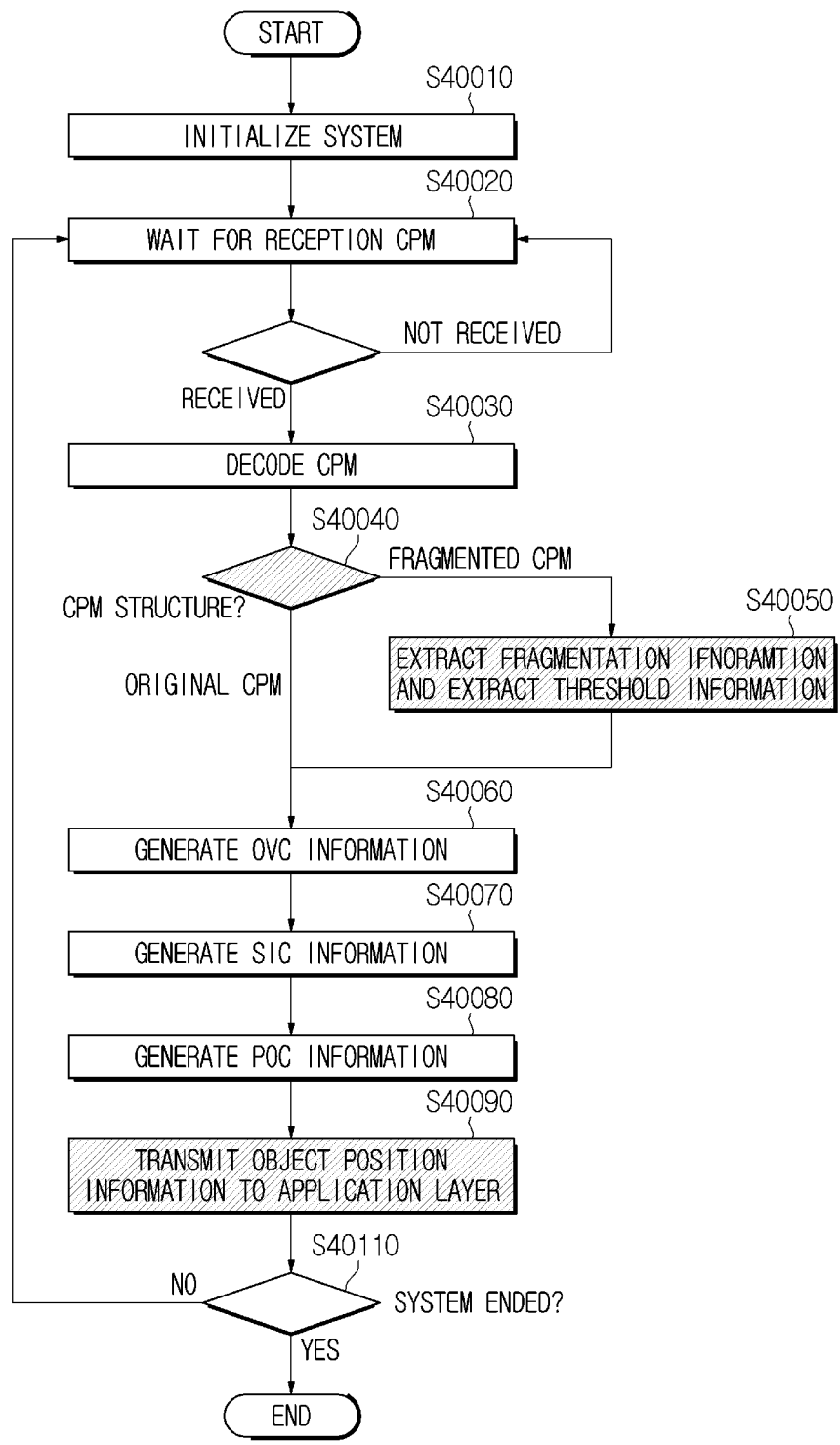
FIG. 40 is a flowchart illustrating a method of receiving a CPM at a receiver according to an embodiment of the present disclosure.

FIG. 40 is a flowchart illustrating a method of receiving a CPM at a receiver according to an embodiment of the present disclosure.

Referring to FIG. 40, the V2X vehicle performs system initialization when the system starts (S40010). Through initialization, the V2X system and the communication module may be prepared to start. Thereafter, the V2X vehicle waits for the CPM through a connected V2X communication modem (S40020). In addition, when the V2X signal is received through a V2X receiver, the signal may pass through the access layer and the networks & transport layer such that data is input through NF-SAP, and data input through the facility layer, that is, the CPM, is decoded (S40030).

When the received CPM is not fragmented, the V2X vehicle may extract/generate and transmit OVC, SIC and/or POC information to the application layer, in the same manner as the existing method. Meanwhile, if the received CPM is a fragmented message, the V2X vehicle extracts fragmentation information and threshold information from a header or an independent fragmentation information container (S40050). Thereafter, in the same manner as the existing method, OVC, SIC and/or POC information is extracted/generated and transmitted to the application layer (S40060 to S40090).

FIG. 41 is a view illustrating a method of using fragmentation information and threshold information according to an embodiment, to which the present disclosure is applied.

Referring to FIG. 41(a), a method of receiving and using a CPM fragmented based on a position in the application of the receiver is shown. It is assumed that a vehicle RxV1 receives information in which the value of FragmentationNumber is 2, the value of FragmentationIndex is 1, a threshold is 0, and the number of objects is 6 in the fragmented message. In this case, as shown in FIG. 41(a), the vehicle RxV1 may recognize an area, in which objects are present, using the threshold (or the reference line) and the sensor coverage of SIC and obtain the positions of the objects in the area and other information, thereby securing autonomous driving or driving safety.

Referring to FIG. 41(b), an embodiment of receiving and using the CPM fragmented based on the distance at a receiver is shown. Similarly, the receiver may recognize an area, in which objects are present, using fragmentation information and threshold information and obtain positions of the objects in the area and the other information, thereby immediately managing a driver assistance algorithm.

Figure 42:
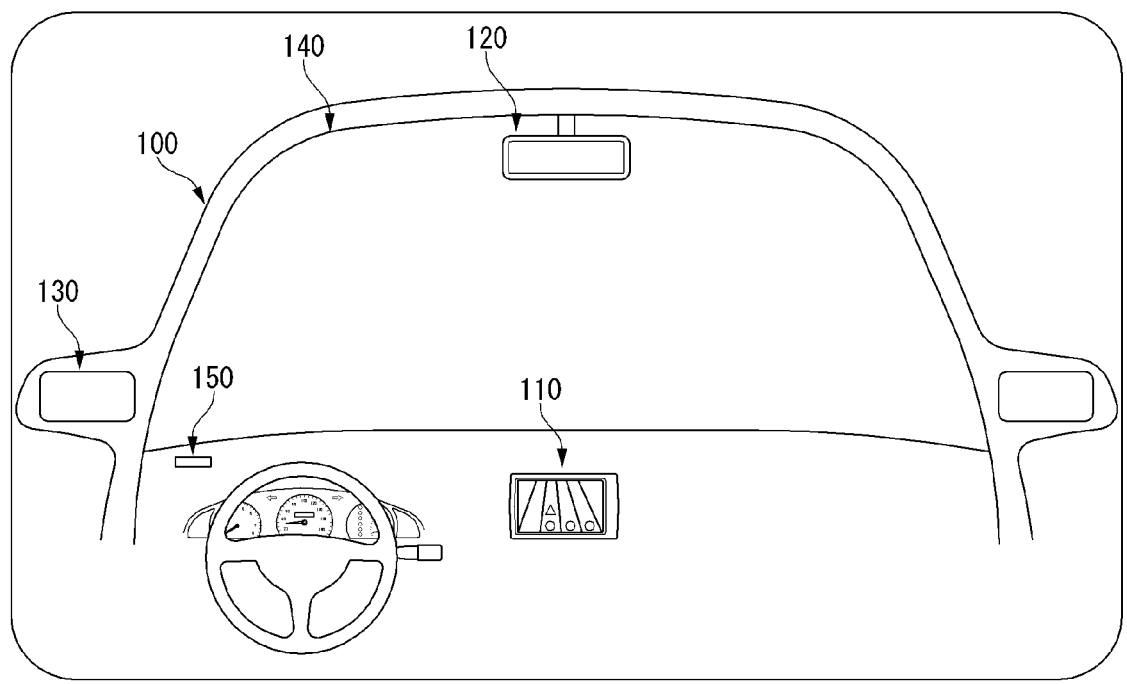
FIG. 42 is a view illustrating a user interface, to which the present disclosure is applicable.

FIG. 42 is a view illustrating a user interface, to which the present disclosure is applicable.

In one embodiment of the present disclosure, object information, fragmentation information and threshold information included in the fragmented CPM may be received and the object information from the fragmented message may be immediately displayed on a human interface apparatus.

Specifically, referring to FIG. 42, a human interface present in a vehicle is shown. Reference numeral 100 indicates a vehicle in which a V2X module and a human interface (HIF) are installed. Reference numeral 110 is a navigation apparatus, which may display video information such as a map and the position of the vehicle on a screen. Reference numeral 120 indicates a room minor, which is an apparatus capable of outputting an image to overlap a rearview minor or representing summarized information through an LED. Reference numeral 130 indicates a sideview mirror, which is an apparatus capable of outputting an image to overlap a minor or representing summarized information through an LED. Reference numeral 140 indicates an apparatus capable of outputting an image on a windshield and an apparatus for displaying a message and an image based on the driver's view. Reference numeral 150 is a head up display (HUD), which is an apparatus capable of reflecting and displaying image and display information on a windshield and to a driver. The embodiments proposed in this disclosure are applicable to the components illustrated in FIG. 42, thereby assisting the driver in driving.

Figure 43:
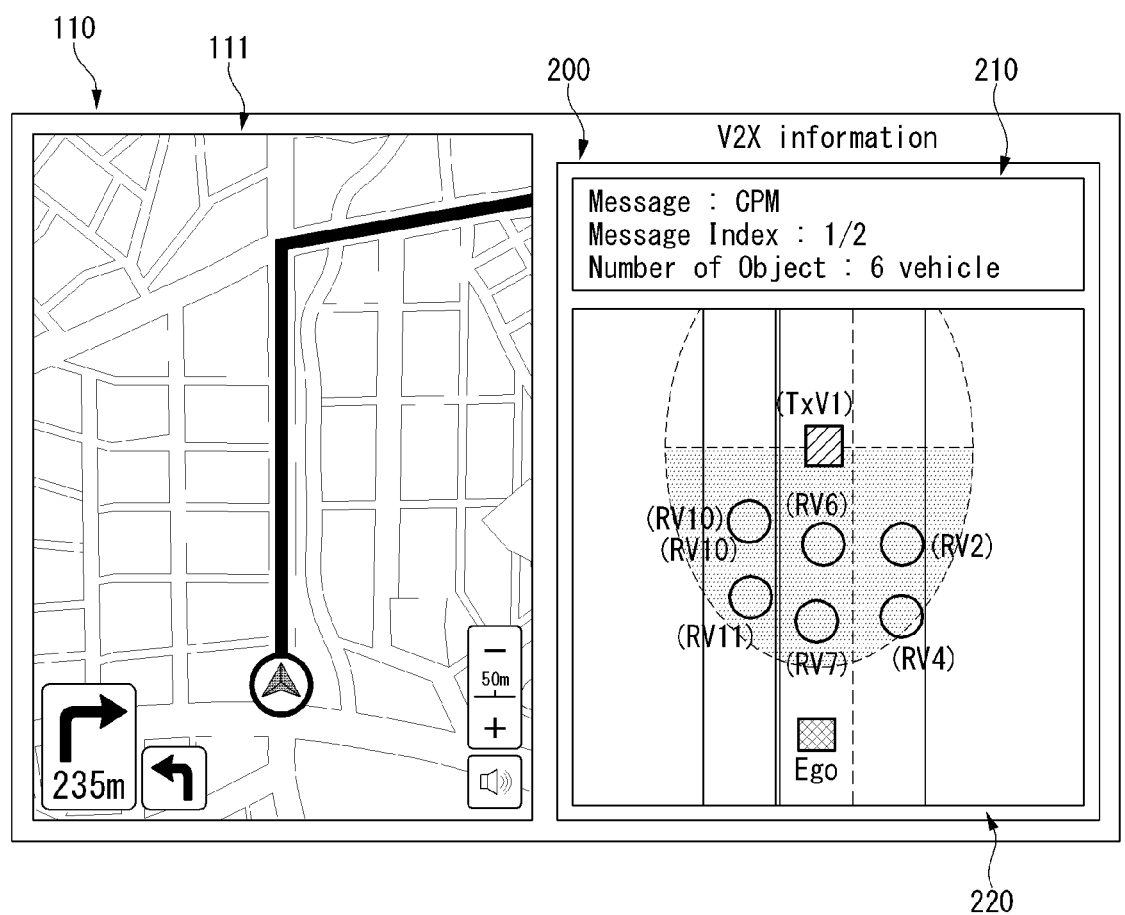
FIG. 43 is a view illustrating a user interface, to which the present disclosure is applicable.

FIG. 43 is a view illustrating a user interface, to which the present disclosure is applicable.

Referring to FIG. 43, an embodiment in which CPS information and a fragmented CPM are displayed on the navigation apparatus of the HIF is shown. The existing navigation apparatus displays the position of the vehicle thereof and a traveling route and surrounding information on a map, thereby assisting the driver in safety and traveling. If information is received through V2X, a function for displaying the received information is necessary. In the present embodiment, the corresponding function may be supported through v2X information 200 layer. The V2X information layer may include a text block 210 and/or a graphics block 220. The text block 210 and/or the graphics block 220 may be displayed from side to side or up and down as shown in FIG. 43, may be displayed on dual monitor or may be displayed to overlap the existing map.

When the fragmented messages are received according to the method proposed in this disclosure, information on the CPS transmission vehicle and the positions of the neighboring objects may be displayed on the screen based on the vehicle through the text block and the graphics block of the navigation apparatus. If the message is fragmented based on the position, the threshold may be displayed together and an area in which the obtained object is present is displayed in another color to be identified by the driver, thereby assisting the driver in accurate determination.

Figure 44:
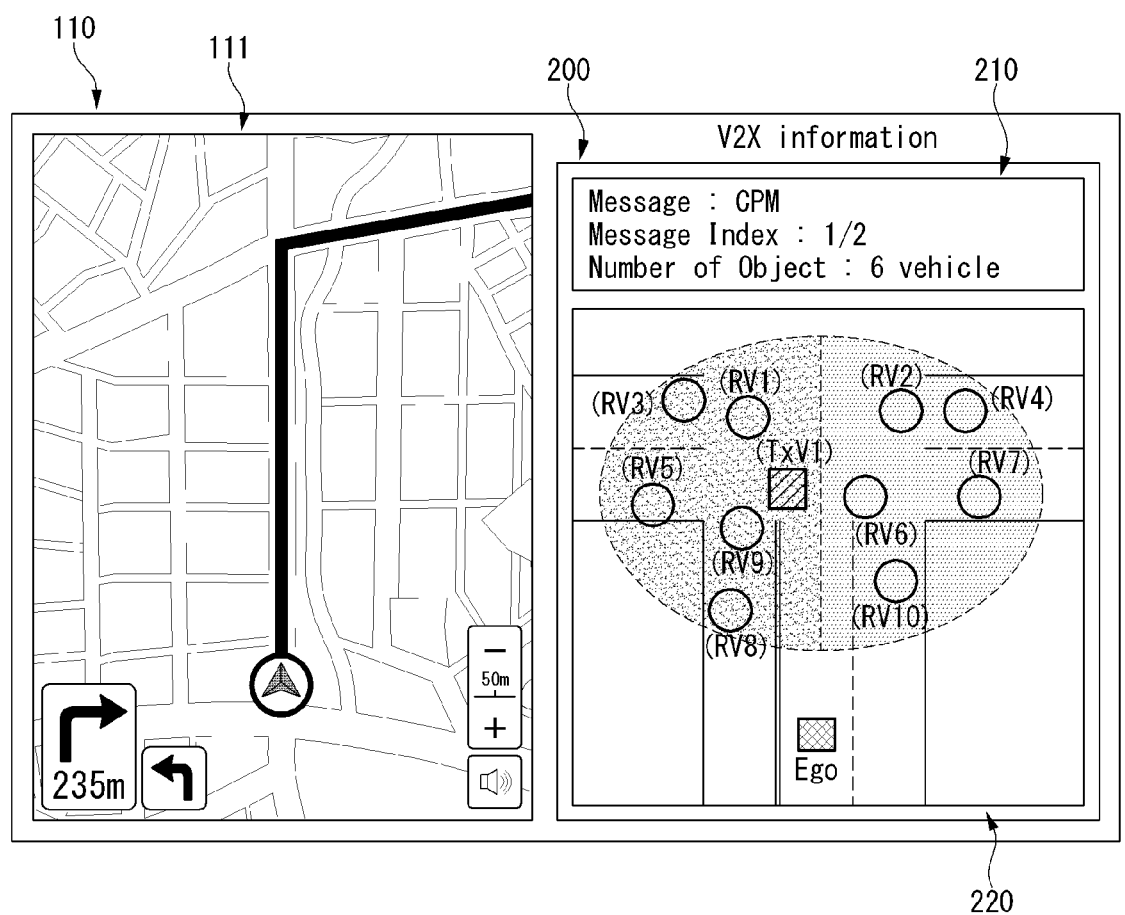
FIG. 44 is a view illustrating a user interface, to which the present disclosure is applicable.

FIG. 44 is a view illustrating a user interface, to which the present disclosure is applicable.

Referring to FIG. 44, it is assumed that fragmented CPMs are continuously received at an intersection. In this case, the objects may be displayed on the screen based on the threshold and the fragmentation area as before. In addition, the driver may be informed of newly updated objects through flicker or color change. Even when the position of the object is dynamically displayed using information such as a speed, a direction or an acceleration, the position of the object may be updated using the object of the fragmented CPM received newly. Even in this case, the driver may be informed of whether to perform updating in real time through flicker or color/shape change.

In addition, when the HUD 150 or the windshield 140 having an electronic display installed therein is used, the driver's view may be calculated and CPS information may be displayed on a front monitor or the HUD and objects included in the fragmented CPM may also be displayed in real time.

Figure 45:
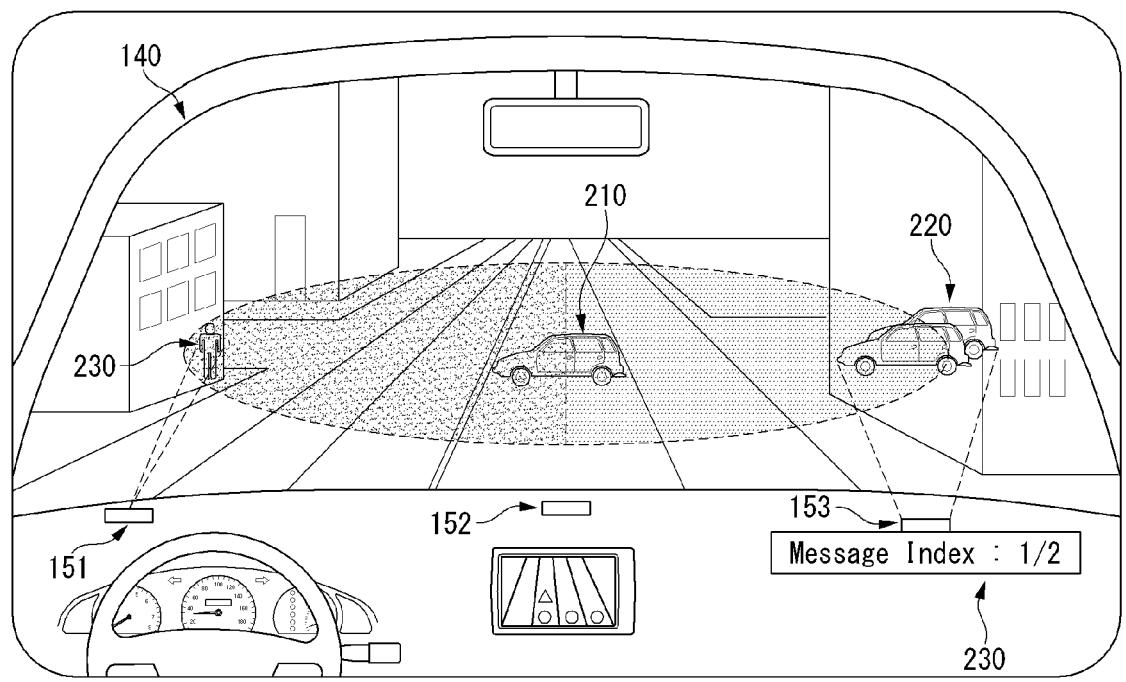
FIG. 45 is a view illustrating a user interface, to which the present disclosure is applicable.

FIG. 45 is a view illustrating a user interface, to which the present disclosure is applicable.

Referring to FIG. 45, when the fragmented messages are received from the V2X vehicle 210 for transmitting the CPS, the driver may know the presence and position of a pedestrian 230 and a traveling vehicle 220, both of which are outside the field of view of the vehicle. According to the method proposed in this disclosure, even if some of the fragmented messages are received, the messages may be immediately displayed on the human interface apparatus and a situation in which the field of view is not secured may be immediately recognized. In addition, an area in which an object is present may be accurately recognized by receiving the fragmented threshold information together.

In one embodiment, when the object information is updated due to reception of the fragmented CPMs, the driver may be notified of the update information through flicker or color or shape change. By displaying information on an update interval, a received CPS message and/or a lost message using a text block like 230, it is possible to provide more information to the driver.

Figure 46:
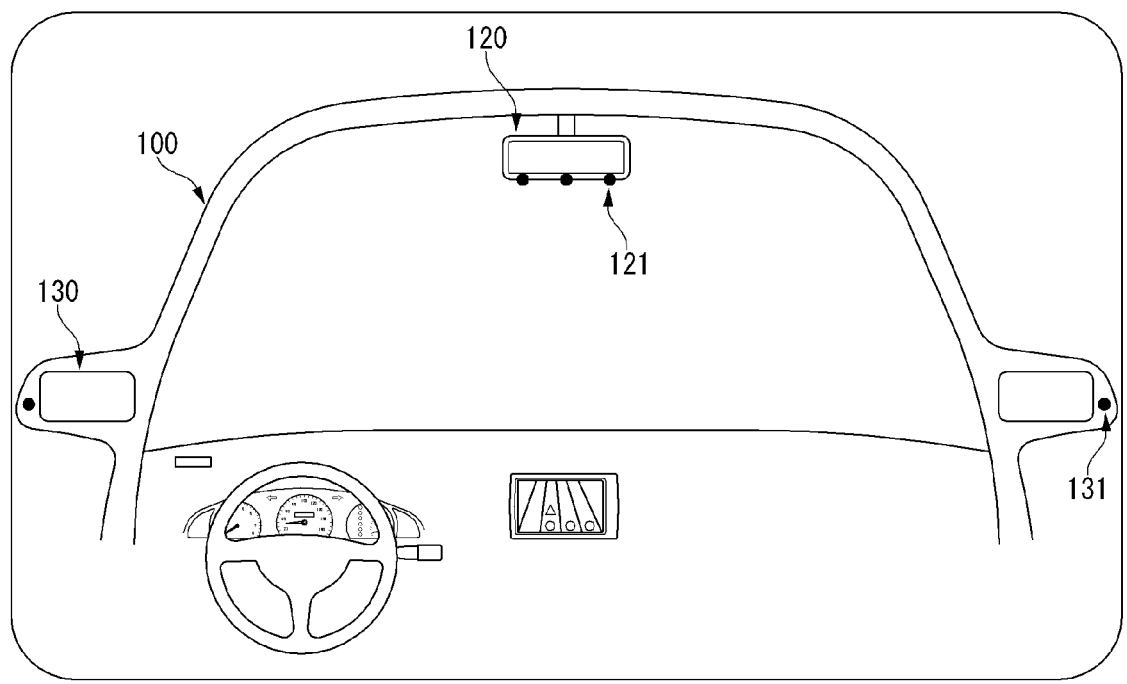
FIG. 46 is a view illustrating a user interface, to which the present disclosure is applicable.

FIG. 46 is a view illustrating a user interface, to which the present disclosure is applicable.

Referring to FIG. 46, in the case of information on a rear object, it is possible to provide object information to the driver through a room mirror 120, the side-view mirror 130, etc. An electric display may be installed on a windshield to display information on the mirror or the positions of the objects may be displayed using separate information transmission apparatuses 121 and 131, such as an LED and an LCD.

According to the method proposed in this specification, even if some of the fragmented messages are received, the messages may be immediately displayed and a situation in which the field of view is not secured may be immediately recognized. In addition, an area in which an object is present may be accurately recognized by receiving the fragmented threshold information together.

Figure 47:
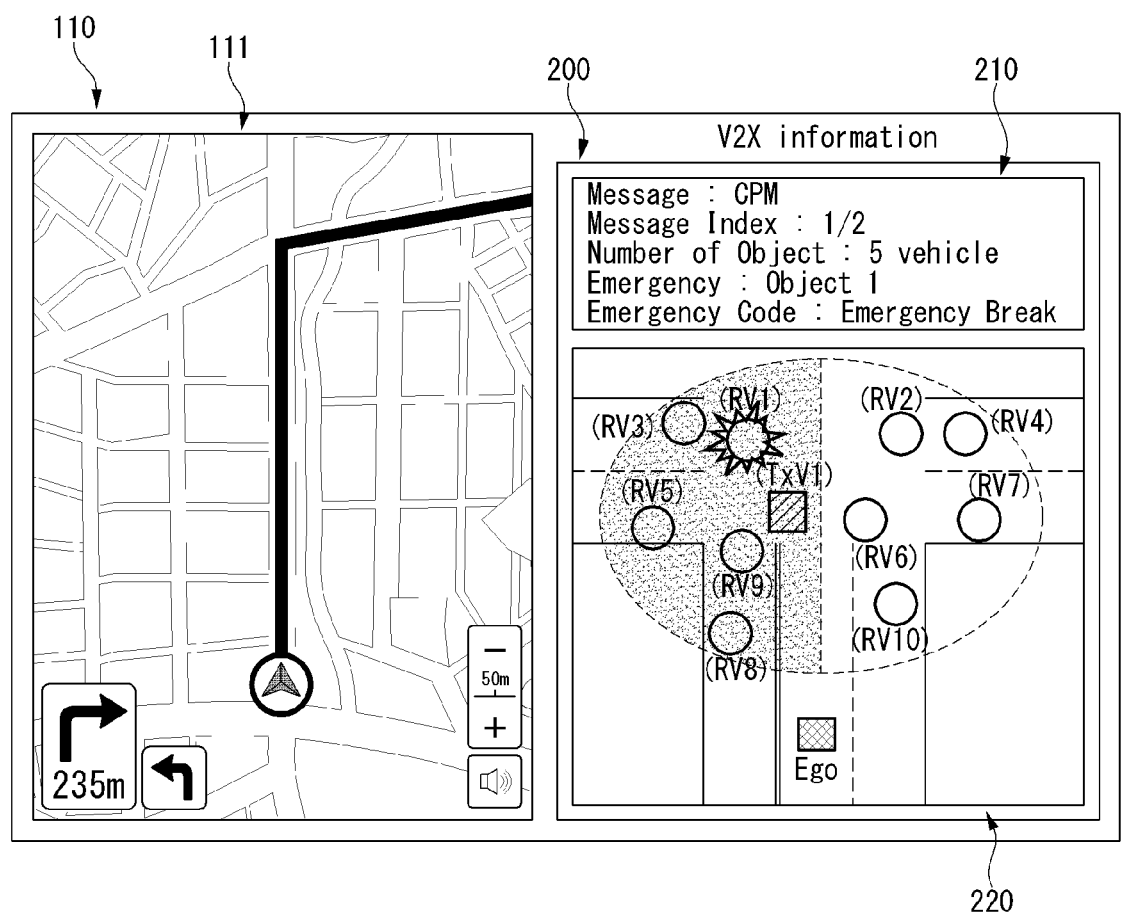
FIGS. 47 and 48 are views illustrating a user interface, to which the present disclosure is applicable.
Figure 48:
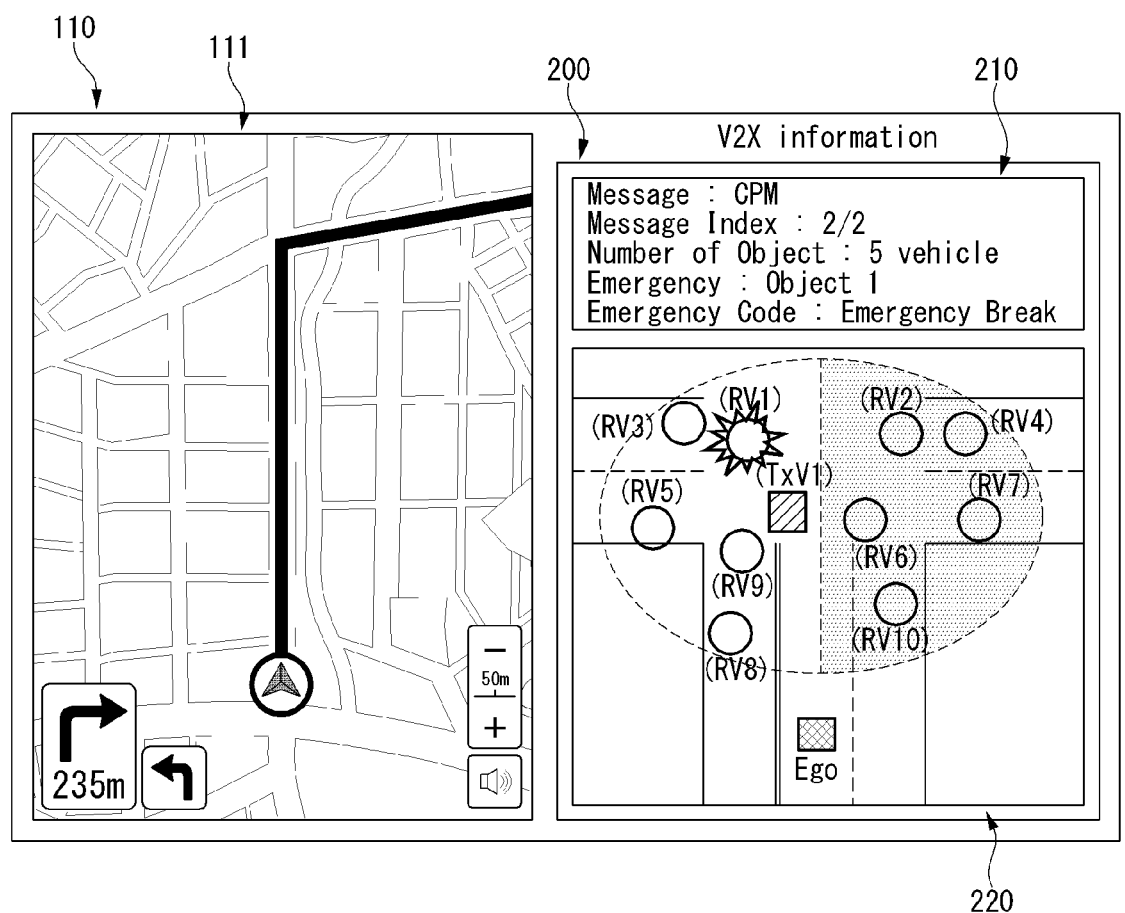

FIGS. 47 and 48 are views illustrating a user interface, to which the present disclosure is applicable.

Referring to FIGS. 47 and 48, it is assumed that fragmented CPMs are continuously received at an intersection. In this case, the object centering on a threshold and a fragmented area may be displayed on the screen. In particular, the object RV1 in which emergency has occurred may be displayed on the screen through a text display apparatus 210 and/or a lane display apparatus 220, as shown in FIG. 47.

In particular, the object in the emergency situation may be included in all fragmented CPMs, as described in FIGS. 35 to 38. In this case, even if a packet including objects in an area which are not transmitted due to fragmentation, is received, since data on the object RV1 may be received, as shown in FIG. 48, the object in the emergency situation may be displayed. Therefore, the driver may recognize the emergency situation faster.

Figure 49:
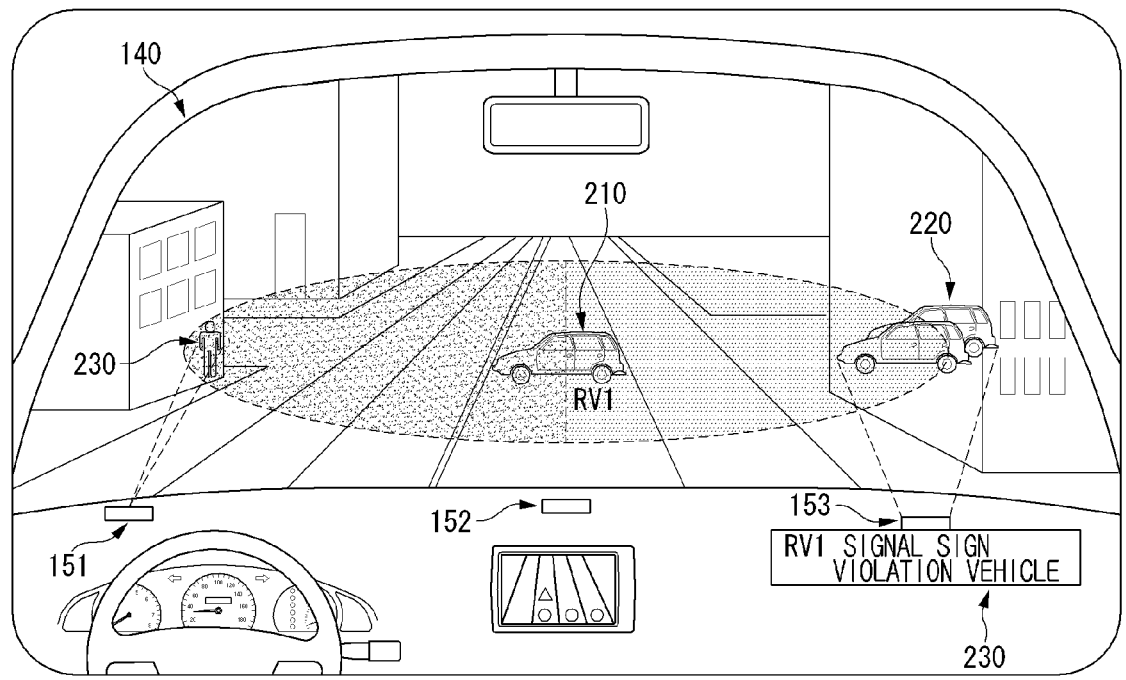
FIG. 49 is a view illustrating a user interface, to which the present disclosure is applicable.

FIG. 49 is a view illustrating a user interface, to which the present disclosure is applicable.

Referring to FIG. 49, when the HUD 150 or the windshield 140 equipped with the electronic display is used, the driver's view may be calculated and CPS information may be displayed on a front monitor or the HUD. In this case, by applying the method proposed in this disclosure, even if only some of the fragmented messages are received, the objects may be displayed in real time. In particular, when there is an object in which emergency has occurred, the receiver may continuously receive information on the vehicle RV1 in which emergency has occurred regardless of message fragmentation. Accordingly, an overlapping graphic expression 210 on the windshield 140 of the vehicle which is traveling is possible and the emergency situation may be displayed even in the text expression area 230. Therefore, the driver may recognize the state of the object through the V2X signal at every interval regardless of whether to fragment the message, thereby securing driving safety.

FIG. 50 is a view illustrating a method of transmitting fragmented CPMs according to an embodiment of the present disclosure.

In the above-described embodiments, when the size of the original CPM exceeds that of the MTU, a method of fragmenting the message in units of objects was proposed. However, in the proposed method, the transmission interval of the messages is reduced by the number of fragmented messages and performance may deteriorate when the messages are transmitted. Therefore, in order to further improve the proposed methods, in one embodiment of the present disclosure, a method of improving performance when a message is fragmented using characteristics is proposed.

Referring to FIG. 50, an embodiment of improving performance using a static/dynamic structure when a message is fragmented is shown. As shown in FIG. 50(a), when an existing message is fragmented into two, the transmission interval halves. That is, three CPM packets transmitted during 300 msec are fragmented when the size of the CPM exceeds the size of the MTU and thus 600 msec which is twice 300 msec is necessary. However, as shown in FIG. 50(b), in all CPS messages, if a message having a static characteristics, which is not changed and is commonly transmitted, is transmitted only once at the first time and then only information having dynamic characteristics is transmitted, it is possible to reduce a time required to transmit all fragmented messages. Accordingly, as shown in FIG. 50(b), when CPM static is transmitted once, the subsequent messages may be transmitted according to the existing original CPM transmission interval without fragmentation.

FIGS. 51 to 53 are views illustrating a CPM fragmentation structure according to an embodiment of the present disclosure.

Referring to FIG. 51, in one embodiment, the V2X vehicle may fragment a sensor information container having static characteristics. Specifically, FIG. 51(a) shows original CPM data, the size of which is greater than the size of the MTU. Therefore, message fragmentation is required. FIG. 51(b_1) shows a fragmented static message having the same header and OSI as the original CPM. In addition, the sensor information container which is not changed and has static characteristics may be transmitted during first, second and third CPMs. In FIG. 51(b_2), only the header, the OSI and the POC except for the sensor information container which the previously transmitted static CPM may be transmitted.

Referring to FIG. 52, in one embodiment, the V2X vehicle may fragment the sensor information container having static characteristics. However, for performance improvement, as shown in FIG. 52(b_1), the V2X vehicle may transmit the POC in a range exceeding the MTC when the static CPM is transmitted. According to the present embodiment, object information may be received even at a time when the static CPM is transmitted.

In the two methods described above with reference to FIGS. 51 and 52, by using the method of transmitting the SIC having the static characteristics at the first time only once, it is possible to reduce the size of the message and to solve a problem that the transmission rate is reduced due to message fragmentation. Both the two methods may be performed when the size of the original CPM satisfies the condition shown in Equation 4 below. When the size of the message is greater than that of the MTU, message fragmentation is required and, when the size of the message is less than a value obtained by adding the sizes of the MTU and the SIC field, the message may be generated using a static/dynamic structure without message fragmentation.

$$\mathrm{MTU} + \mathrm{SIZE}_{SIC}^{CPM} \geq \mathrm{SIZE}_{original}^{CPM} > \mathrm{MTU} \quad \text{Equation 4}$$

Referring to FIG. 53, the last method is technology of obtaining maximum efficiency through static/dynamic management, and an embodiment in which the static part of the object is fragmented and transmitted is shown. In FIG. 53(b_1), the fragmented static message may have the same header and OSC as the original CPM, and the static fields of the SIC and the POC having the static characteristics, which are not changed, may be transmitted during first, second and third CPMs. In FIG. 53(b_2), only the dynamic fields of the header, the OSC and the POC except for the static fields of the SIC and the POC which are the previously transmitted static CPMs may be transmitted.

The method described in FIG. 53 may be performed when the size of the original CPM satisfies the condition of Equation 5 below, thereby obtaining effects. When the size of the message is greater than that of the MTU, message fragmentation is required and, when the size of the message is less than a value obtained by adding the sizes of the MTU and the SIC field and the size of the static field of the POC, the message may be generated using a static/dynamic structure without message fragmentation.

$$\mathrm{MTU} + \mathrm{SIZE}_{SIC}^{CPM} + \mathrm{SIZE}_{POC\_dynamic}^{CPM} \geq \mathrm{SIZE}_{original}^{CPM} > \mathrm{MTU} \quad \text{Equation 5}$$

FIG. 54 is a view illustrating the data format of a header according to an embodiment of the present disclosure.

Referring to FIG. 54, in order to improve performance in a message fragmentation situation using the static/dynamic structure provided by the present disclosure, the transmitter may signal information related to data fragmentation. Specifically, as shown in FIG. 54, "StaticDynamicType" may be added to a header data frame. It is possible to indicate whether the message has static characteristics or dynamic characteristics through the StaticDynamicType field.

Figure 55:
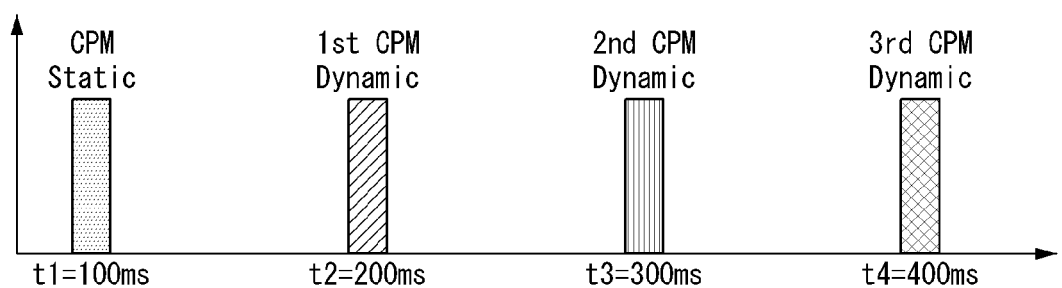
FIG. 55 is a view illustrating a message management method using a static/dynamic structure according to an embodiment of the present disclosure.

FIG. 55 is a view illustrating a message management method using a static/dynamic structure according to an embodiment of the present disclosure.

Referring to FIG. 55, an embodiment according to the added "staticDynamicType" value is shown. A CPM static message may be transmitted at a time T1 and a CPM dynamic message may be transmitted after a time t2. StaticDynamicType of the transmitted message may have a value of "1" indicating static at a time t1 and have a value of "2" meaning dynamic at times t2 to t4. The receiver may receive and store a static message at a time t1 and apply the static message to a dynamic CPM received later, thereby receiving a complete message.

Figure 56:
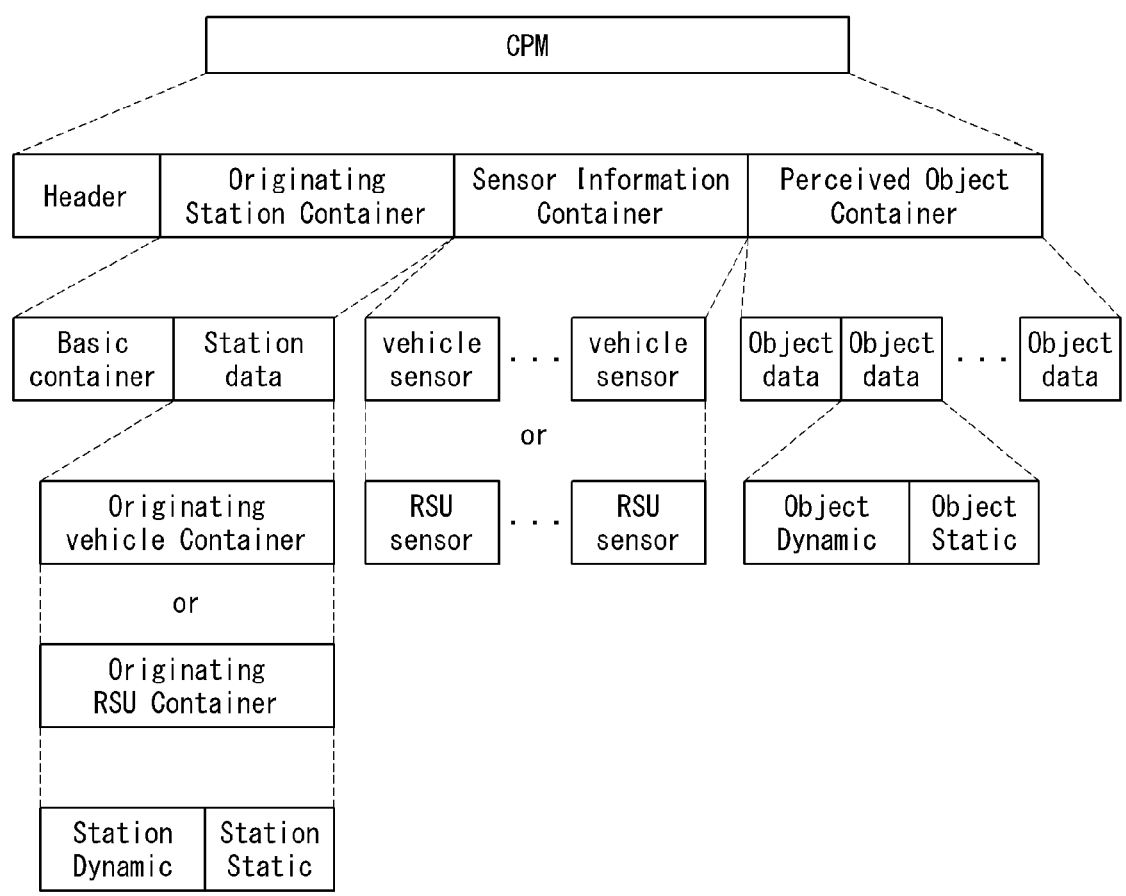
FIG. 56 is a view illustrating a CPM structure for static/dynamic message transmission according to an embodiment of the present disclosure.

FIG. 56 is a view illustrating a CPM structure for static/dynamic message transmission according to an embodiment of the present disclosure.

Referring FIG. 56, as described above with reference to FIG. 8, an originating station container may include a station data. In addition, the station data may be classified into stationStatic and stationDynamic and the message may be classified. The object data of the POC may be classified into objectDynamic and objectStatic and managed. The message structure proposed newly in FIG. 56 may be classified into static/dynamic to help efficient message management.

Figure 57:
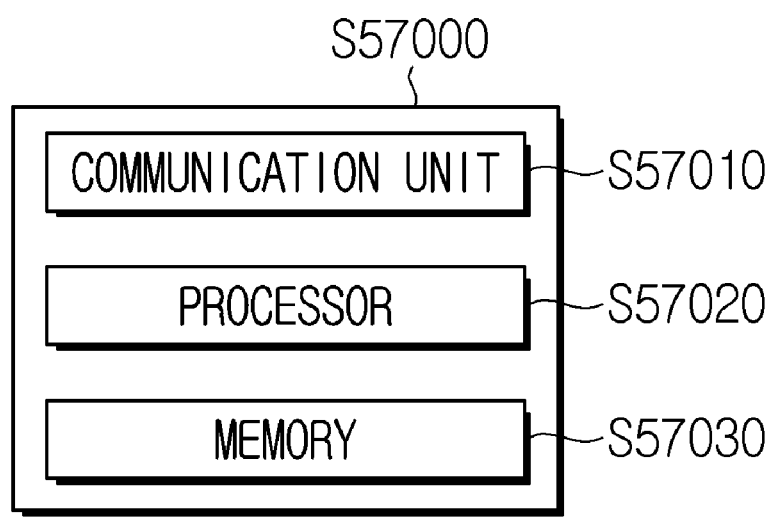
FIG. 57 is a view illustrating the configuration of a V2X communication apparatus according to an embodiment of the present disclosure.

FIG. 57 is a view illustrating the configuration of a V2X communication apparatus according to an embodiment of the present disclosure.

In FIG. 57, the V2X communication apparatus may include a communication unit 57010, a processor 57020 and a memory 57030.

The communication unit 57010 may be connected to the processor 57020 to transmit/receive a radio frequency signal. The communication unit 57010 may up-convert data received from the processor 57020 into a transmission/reception band to transmit a signal or down-convert a received signal. The communication unit 57010 may implement operation of at least one of a physical layer or an access layer.

The communication unit 57010 may include a plurality of sub radio frequency (RF) units to perform communication according to a plurality of communication protocols. In an embodiment, the communication unit 57010 may perform data communication based on Dedicated Short Range Communication (DSRC), ITS-G5 wireless communication technology based on physical transmission technology of the IEEE 802.11 and/or the 802.11p standard, IEEE 802.11 and/or 802.11p standard, 2G/3G/4G(LTE)/5G wireless cellular communication technology including satellite/broadband wireless mobile communication, broadband terrestrial digital broadcast technology such as DVB-T/T2/ATSC, GPS technology, or IEEE 1609 WAVE technology. The communication unit 57010 may include a plurality of transceivers for implementing each communication technology.

The processor 57020 may be connected to the RF unit 57030 to implement operation of the layers of the V2X communication apparatus. The processor 57020 may be configured to perform operation according to various embodiments of the present disclosure described above with reference to the drawings. In addition, at least one of modules, data, programs or software for implementing operation of the V2X communication apparatus 57000 according to the various embodiments of the present disclosure may be stored in the memory 57030 and may be executed by the processor 57020.

The memory 57030 is connected to the processor 57020 to store a variety of information for driving the processor 57020. The memory 57030 may be included in the processor 57020 or may be provided outside the processor 57020 and connected to the processor 57020 by a well-known unit.

The processor 57020 of the V2X communication apparatus 57000 may generate and transmit the CPM described in the present disclosure. The method of generating and transmitting the CPM at the V2X communication apparatus 57000 will be described below.

Figure 58:
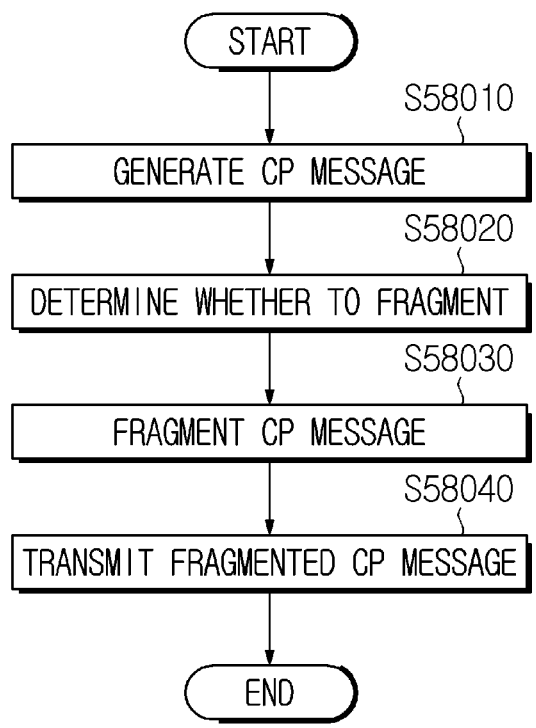
FIG. 58 is a flowchart illustrating a method of transmitting an ITS message at a V2X communication apparatus according to an embodiment of the present disclosure.

FIG. 58 is a flowchart illustrating a method of transmitting an ITS message at a V2X communication apparatus according to an embodiment of the present disclosure. In the embodiment of FIG. 58, the V2X communication apparatus may be the V2X communication apparatus of a vehicle. This vehicle may be equipped with a sensor to detect neighboring objects using this sensor.

The V2X communication apparatus generates a CP message including information on a plurality of objects detected by the vehicle (S58010). The CP message generated in step S58010 may be referred to as an original CPM or an initial CPM.

The V2X communication apparatus determines whether to fragment the CP message depending on whether the size of the CP message is greater than a predefined size (S58020). As described with reference to FIG. 10, the predefined size may be the size of the MTU of the facility layer.

Upon determining that the CP message is fragmented, the V2X communication apparatus fragments the CP message based on the plurality of detected objects (S58030). Here, each of the fragmented CP messages may include at least one of header information, vehicle information, sensor information used to detect the plurality of objects, which are included in the CP message. That is, as described above, the CP message may be fragmented based on the position, distance or direction of the object and each fragmented message may include header information, an OSC and an SIC.

In an embodiment, step S58030 may be performed by fragmenting the CP message based on the positions or distances of the plurality of objects.

In an embodiment, step S58030 may be performed by fragmenting the CP message according to the longitudinal or latitudinal positions of the plurality of objects determined based on the specific position of the vehicle. In addition, fragmentation may be performed by comparing the latitudinal or longitudinal positions of the plurality of objects determined based on the specific position of the vehicle with a specific threshold. In this case, as described above with reference to FIG. 28, the specific threshold may be determined as a median value of the latitudinal or longitudinal positions of two objects located at a fragmentation boundary of the CP message among the plurality of objects.

In an embodiment, step S58030 may be performed by comparing distances between the vehicle and the plurality of objects with a specific threshold and fragmenting the CP message. In addition, as described above with reference to FIG. 29, the specific threshold may be determined as a median value of the latitudinal or longitudinal positions of two objects located at a fragmentation boundary of the CP message among the plurality of objects.

In an embodiment, step S58030 may be performed by comparing the movement directions of the vehicle and the plurality of objects and fragmenting the CP message.

In an embodiment, step S58030 further includes step of determining the fragmentation type of the CP message, and the fragmentation type may include at least one of sequential fragmentation in which fragmentation is performed in order of indices assigned for each object within an object sequence, random fragmentation in which fragmentation is performed in a random manner within the object sequence, position based fragmentation in which fragmentation is performed based on the positions of the objects or direction fragmentation in which fragmentation is performed based on the movement directions of the objects.

In an embodiment, the fragmented CP messages may include information related to fragmentation, and the information related to fragmentation may include at least one of fragmentation ID information indicating fragmentation from the same CP message, fragmentation number information indicating the number of fragmented messages, fragmentation index information indicating a specific fragmented CP message, or fragmentation type information.

The V2X communication apparatus transmits the fragmented CP messages (S58040).

According to the embodiments of the present disclosure, by fragmenting a CPM in object units, only some of the fragmented messages may be efficiently used for autonomous driving and neighboring vehicle recognition.

According to the embodiments of the present disclosure, by classifying CPM data included in the CPM into static CPM data and dynamic CPM data and transmitting the dynamic CPM data at a shorter interval than the static CPM data, it is possible to more frequently transmit more suitable data as compared to a conventional method while the same channel resources are used.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), Digital signal processors (DSPs), digital signal processing devices (DSPDs), programmable logic devices (PLDs), field programmable gate arrays (FPGAs), processors, controllers, microcontrollers, microprocessors, etc.

If operations or functions of the present disclosure are implemented by firmware or software, the present disclosure can be implemented in the form of a variety of formats, for example, modules, procedures, functions, etc. The software codes may be stored in a memory so as to be driven by a processor. The memory may be located inside or outside of the processor, so that it can communicate with the aforementioned processor via a variety of well-known parts.

It will be apparent to those skilled in the art that the present disclosure may be embodied in other specific forms without departing from the essential features of the present disclosure. Therefore, the above detailed description should not be construed as limiting in all respects, but should be considered illustrative. The scope of the disclosure should be determined by rational interpretation of the appended claims, and all changes within the equivalent scope of the disclosure are included in the scope of the disclosure.

It is understood by those skilled in the art that various changes and modifications are possible in the present disclosure without departing from the spirit or scope of the present disclosure. Accordingly, the present disclosure is intended to cover modifications and variations of the disclosure provided within the scope of the appended claims and their equivalents.

In this specification, both the apparatus and method are mentioned, and the descriptions of both the device and method can be applied to complement each other.

Various embodiments have been described in the best mode for practicing the present disclosure.

The present disclosure is used in a series of V2X communication fields.

It is apparent to those skilled in the art that various changes and modifications are possible in the present disclosure without departing from the spirit or scope of the present disclosure. Accordingly, the present disclosure is intended to cover modifications and variations of the disclosure provided within the scope of the appended claims and their equivalents.

What is claimed is:

1. A method of transmitting a vehicle-to-everything (V2X) message of a vehicle, the method comprising:
    detecting a plurality of objects using at least one sensor;
    generating a collective perception (CP) message including information related to the plurality of objects detected by the vehicle,
    wherein the plurality of objects includes a first object set and a second object set;
    determining the first object set and the second object set from the plurality of objects based on a size of the CP message being greater than a predefined size;
    generating a first fragmented CP message that includes information related to the first object set and a second fragmented CP message that includes information related to the second object set; and
    transmitting the first fragmented CP message and the second fragmented CP message,
    wherein each of the first fragmented CP message and the second fragmented CP message comprises at least one of header information, information on the vehicle or sensor information used to detect the plurality of objects, which is included in the CP message,
    wherein the first object set and the second object set are classified based on at least one of:
        positions or distances of the plurality of objects,
        a latitudinal or longitudinal directions of the plurality of objects determined based on a specific position of the vehicle,
        comparison distances between the vehicle and the plurality of objects with a specific threshold and fragmenting the CP message, or
        movement directions of the vehicle and the plurality of objects,
    wherein the vehicle is capable of performing a V2X communication,
    wherein the vehicle is included in an intelligent transport system (ITS),
    wherein the V2X communication comprises communication between the vehicle and another vehicle, or between the vehicle and a road side unit (RSU), and
    wherein the vehicle is implemented based on an architecture that includes an application layer, a facilities layer, an access layer, a network and a transport layer.

2. The method of claim 1,
    wherein the generating the first fragmented CP message and the second fragmented CP message comprises, determining a fragmentation type for the CP message, and
    wherein the fragmentation type comprises sequential fragmentation in which fragmentation is performed in order of indices assigned for each object within an object sequence of the CP message, random fragmentation in which fragmentation is performed in a random manner within the object sequence, position based fragmentation in which fragmentation is performed based on the positions of the objects or direction fragmentation in which fragmentation is performed based on the movement directions of the objects.

3. The method of claim 2,
    wherein each of the first fragmented CP message and the second fragmented CP message comprises information related to fragmentation, and
    wherein the information related to fragmentation comprises at least one of fragmentation ID information indicating fragmentation from the same CP message, fragmentation number information indicating the number of fragmented messages, fragmentation index information indicating a specific fragmented CP message, or fragmentation type information.

4. A vehicle-to-everything (V2X) communication apparatus of a vehicle, the V2X communication apparatus comprising:
    a transceiver; and
    a processor coupled to the transceiver and configured to:
    detect a plurality of objects using at least one sensor;
    generate a collective perception (CP) message including information on the plurality of objects detected by the vehicle, wherein the plurality of objects includes a first object set and a second object set;
    determine the first object set and the second object set from the plurality of objects based on a size of the CP message being greater than a predefined size;
    generate a first fragmented CP message that includes information related to the first object set and a second fragmented CP message that includes information related to the second object set; and
    transmit the first fragmented CP message and the second fragmented CP message,
    wherein each of the first fragmented CP message and the second fragmented CP message comprises at least one of header information, information on the vehicle or sensor information used to detect the plurality of objects, which is included in the CP message,
    wherein the first object set and the second object set are classified based on at least one of:
        positions or distances of the plurality of objects,
        a latitudinal or longitudinal directions of the plurality of objects determined based on a specific position of the vehicle, comparison distances between the vehicle and the plurality of objects with a specific threshold and fragmenting the CP message, or movement directions of the vehicle and the plurality of objects, wherein the vehicle is capable of performing a V2X communication, wherein the vehicle is included in an intelligent transport system (ITS), wherein the V2X communication comprises communication between the vehicle and another vehicle, or between the vehicle and a road side unit (RSU), and wherein the vehicle is implemented based on an architecture that includes an application layer, a facilities layer, an access layer, a network and a transport layer.

5. The V2X communication apparatus of claim 4, wherein the processor determines a fragmentation type for the CP message, and wherein the fragmentation type comprises sequential fragmentation in which fragmentation is performed in order of indices assigned for each object within an object sequence of the CP message, random fragmentation in which fragmentation is performed in a random manner within the object sequence, position based fragmentation in which fragmentation is performed based on the positions of the objects or direction fragmentation in which fragmentation is performed based on the movement directions of the objects.

6. The V2X communication apparatus of claim 5, wherein each of the first fragmented CP message and the second fragmented CP message comprises information related to fragmentation, and wherein the information related to fragmentation comprises at least one of fragmentation ID information indicating fragmentation from the same CP message, fragmentation number information indicating the number of fragmented messages, fragmentation index information indicating a specific fragmented CP message, or fragmentation type information.

* * * * *